(12) United States Patent
Schmeling

(10) Patent No.: US 6,670,003 B1
(45) Date of Patent: Dec. 30, 2003

(54) METHOD AND DEVICE FOR PROCESSING TIRES

(76) Inventor: Burkhard Schmeling, Am Marienberg 18, D-15344 Strausberg (DE)

( * ) Notice: Subject to any disclaimer, the term of this patent is extended or adjusted under 35 U.S.C. 154(b) by 0 days.

(21) Appl. No.: 09/508,317
(22) PCT Filed: Sep. 10, 1998
(86) PCT No.: PCT/DE98/02758
§ 371 (c)(1), (2), (4) Date: Apr. 14, 2000
(87) PCT Pub. No.: WO99/12717
PCT Pub. Date: Mar. 18, 1999

(30) Foreign Application Priority Data

Sep. 10, 1997 (DE) .......................................... 197 40 413

(51) Int. Cl.$^7$ ......................... B29D 22/00; B29D 23/00; B32B 1/08
(52) U.S. Cl. .................... 428/35.7; 428/36.1; 428/36.2; 428/36.8
(58) Field of Search .............................. 428/36.8, 35.7, 428/36.1, 36.2

(56) References Cited

U.S. PATENT DOCUMENTS

| | | | | |
|---|---|---|---|---|
| 4,142,821 A | * | 3/1979 | Doring | 405/258 |
| 4,801,217 A | * | 1/1989 | Goldberg | 404/28 |
| 5,044,057 A | * | 9/1991 | Meagher | 29/241 |
| 5,482,215 A | * | 1/1996 | Veres | 241/1 |
| 5,709,049 A | * | 1/1998 | Baird | 47/21.1 |

FOREIGN PATENT DOCUMENTS

| | | | |
|---|---|---|---|
| DE | 33 08 651 | * | 9/1984 |
| DE | 38 29 615 | * | 3/1990 |
| DE | 3933729 | | 8/1991 |
| DE | 42 00 949 | * | 7/1993 |
| DE | 4200949 | | 1/1994 |
| JP | 07186142 | * | 7/1995 |
| WO | 90/05219 | * | 5/1990 |
| WO | 97/21870 | * | 6/1997 |
| WO | 97/26122 | * | 7/1997 |

* cited by examiner

Primary Examiner—Kenneth R. Rice
(74) Attorney, Agent, or Firm—Norris, McLaughlin & Marcus, P.A.

(57) ABSTRACT

A method for processing tires and providing a product made form the tire material, by cutting each tire by a sequence of cuts to form two side walls and several tire rings of the running tread, separating the two side walls from the tire rings of running tread, combining the tire rings together to form the product by looping a first tire rings directly to a second tire rings, the second tire rings is looped directly to the third tire rings until the n−1 tire rings is looped to the last tire rings to form an interwoven mesh product, which may be formed to provide a flat product or a hollow product.

11 Claims, 61 Drawing Sheets

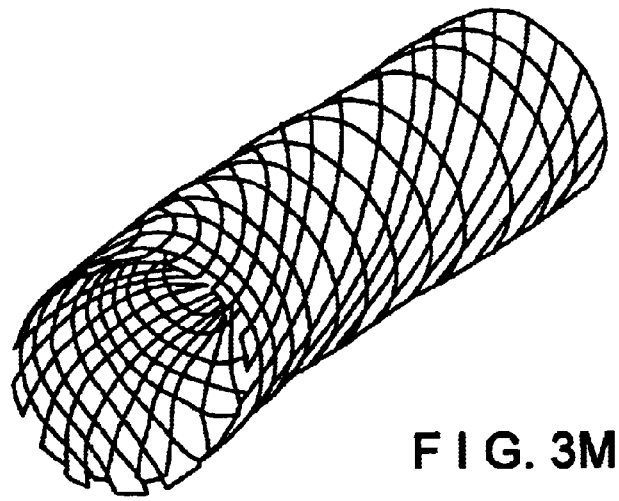
F I G. 3M
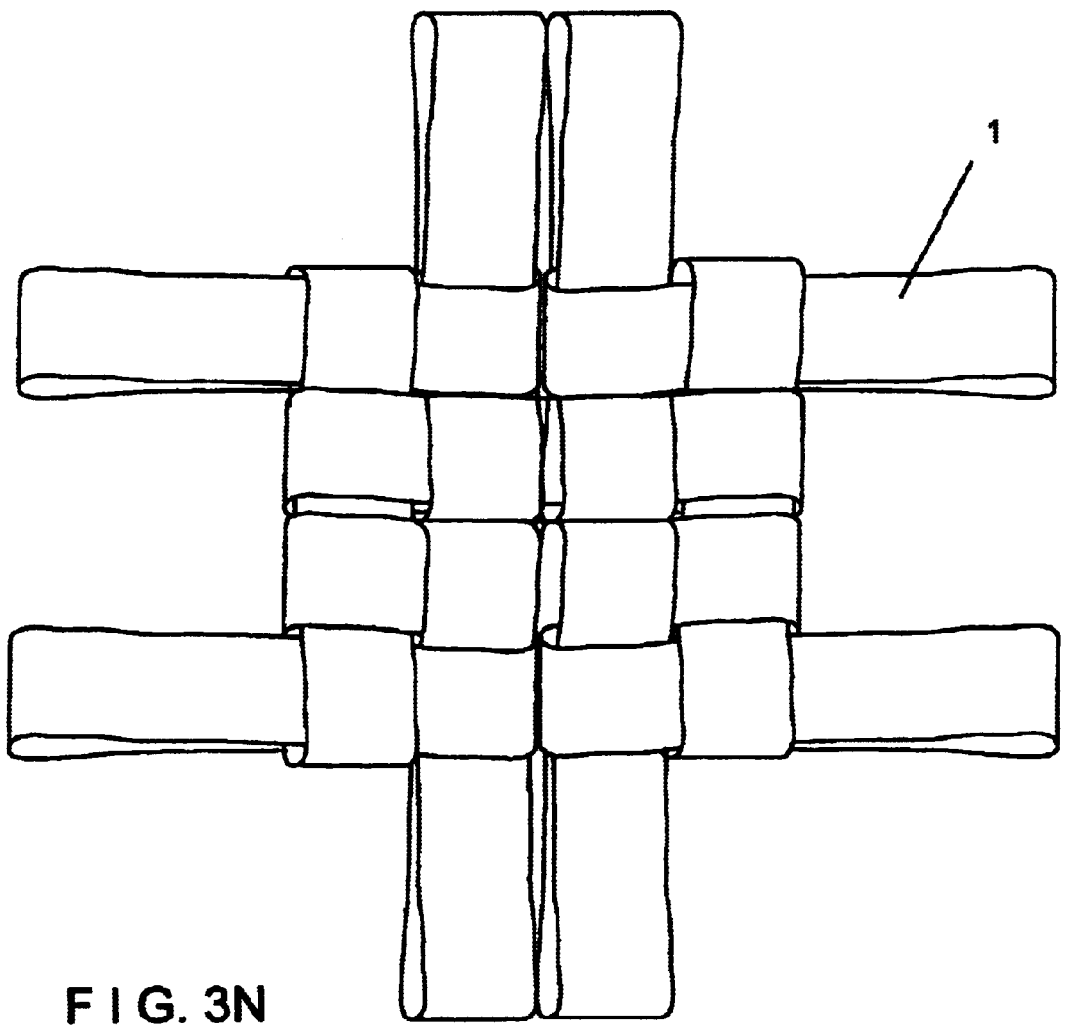
F I G. 3N

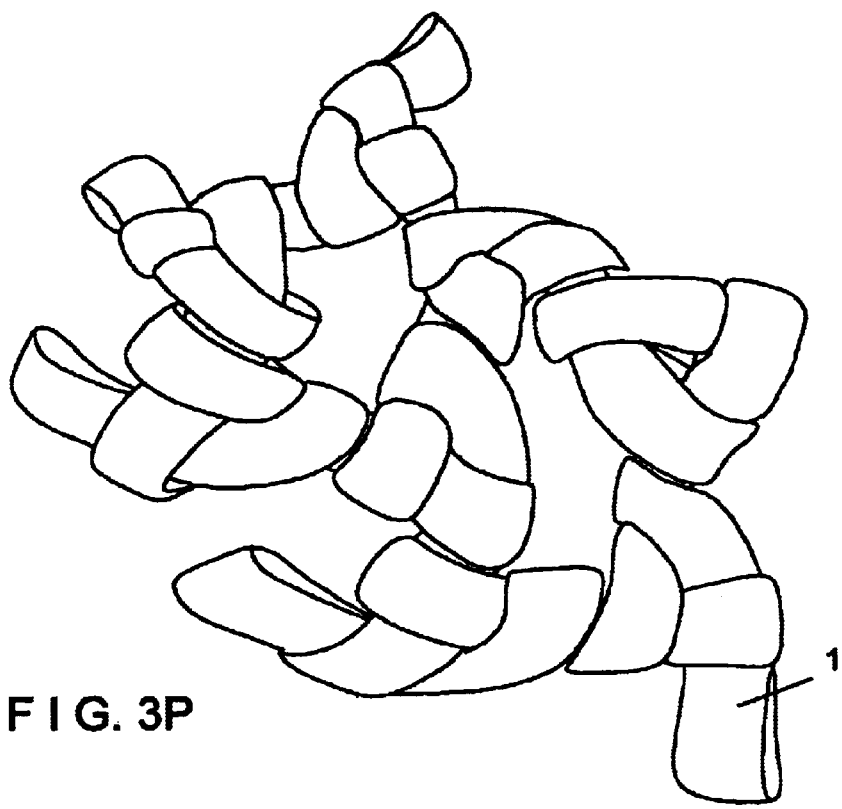
F I G. 3P
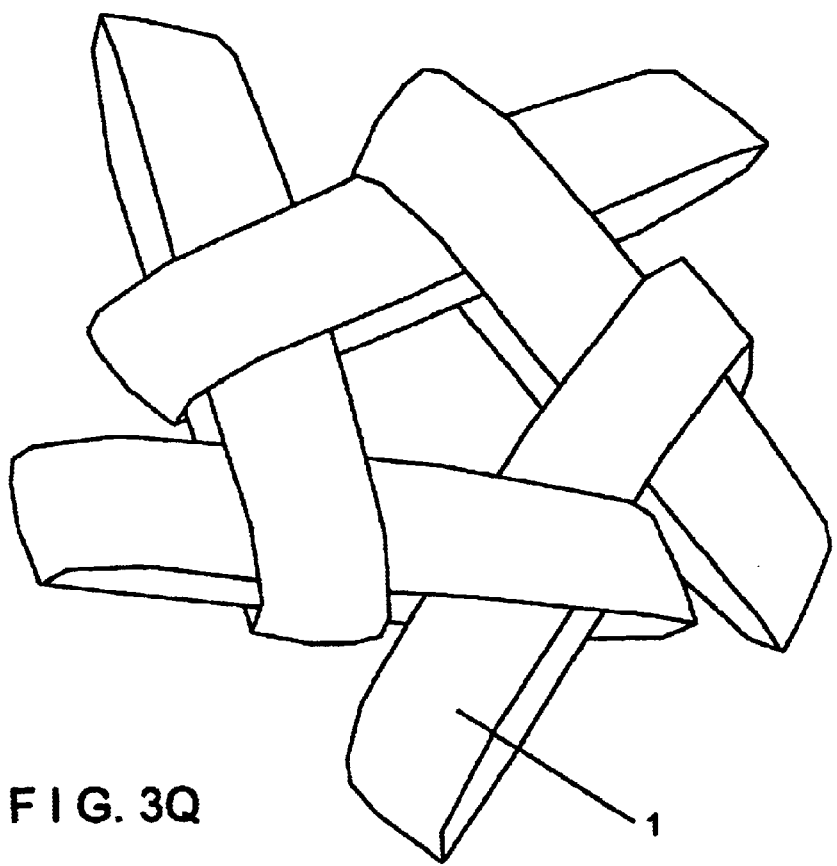
F I G. 3Q

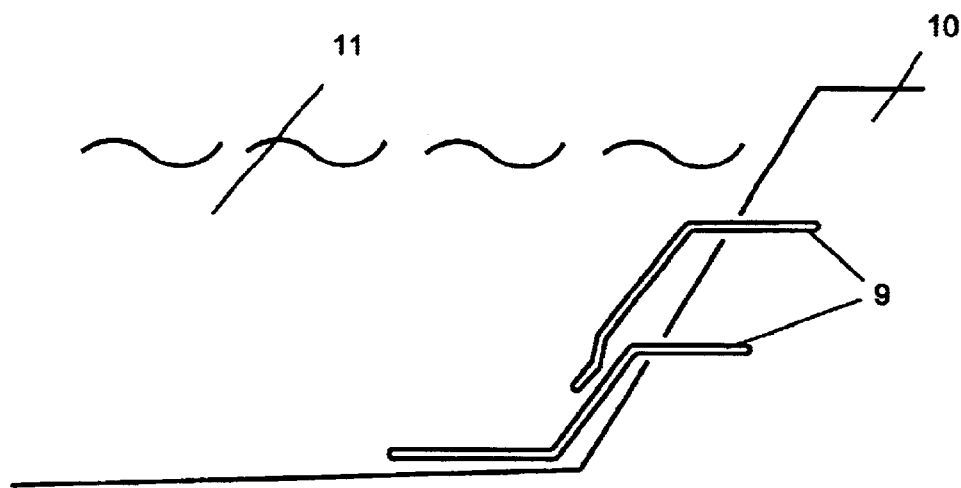
F I G. 5
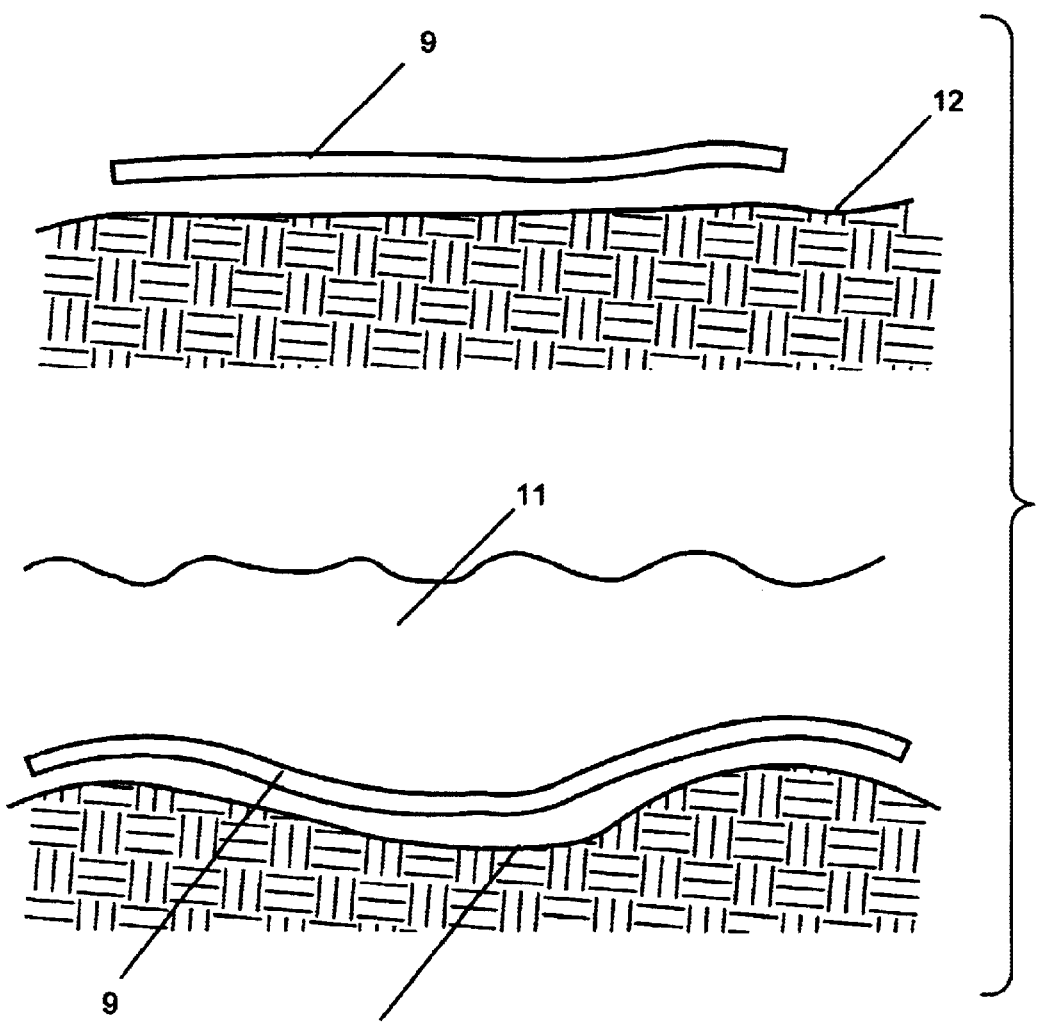
F I G. 6

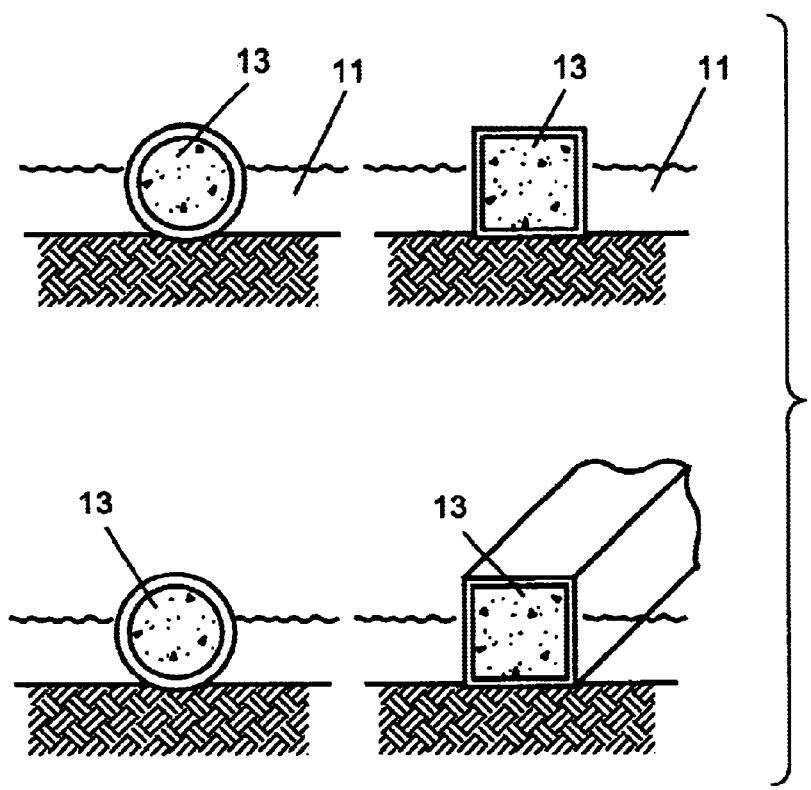
F I G. 7
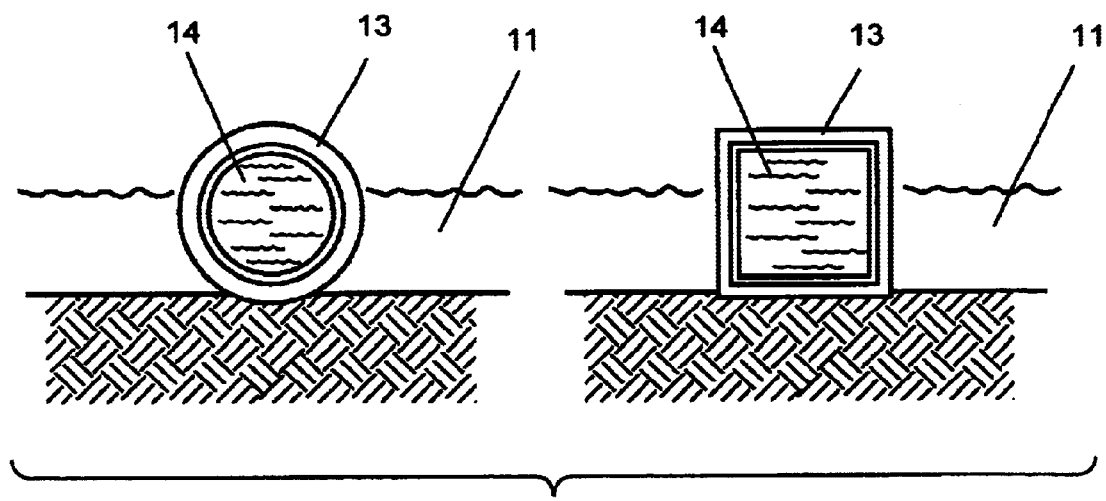
F I G. 8

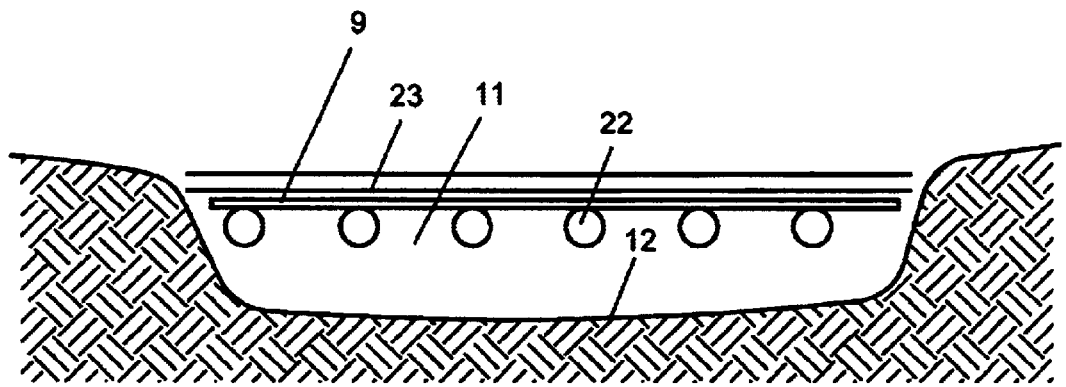
F I G. 18
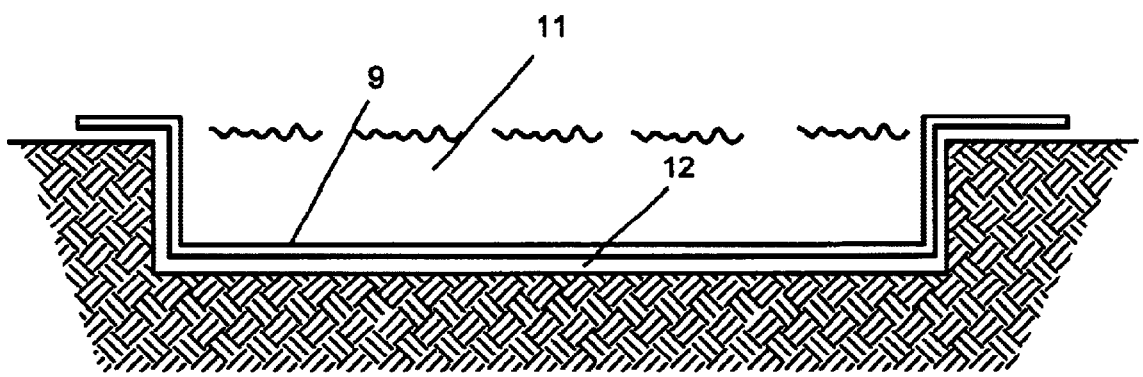
F I G. 19

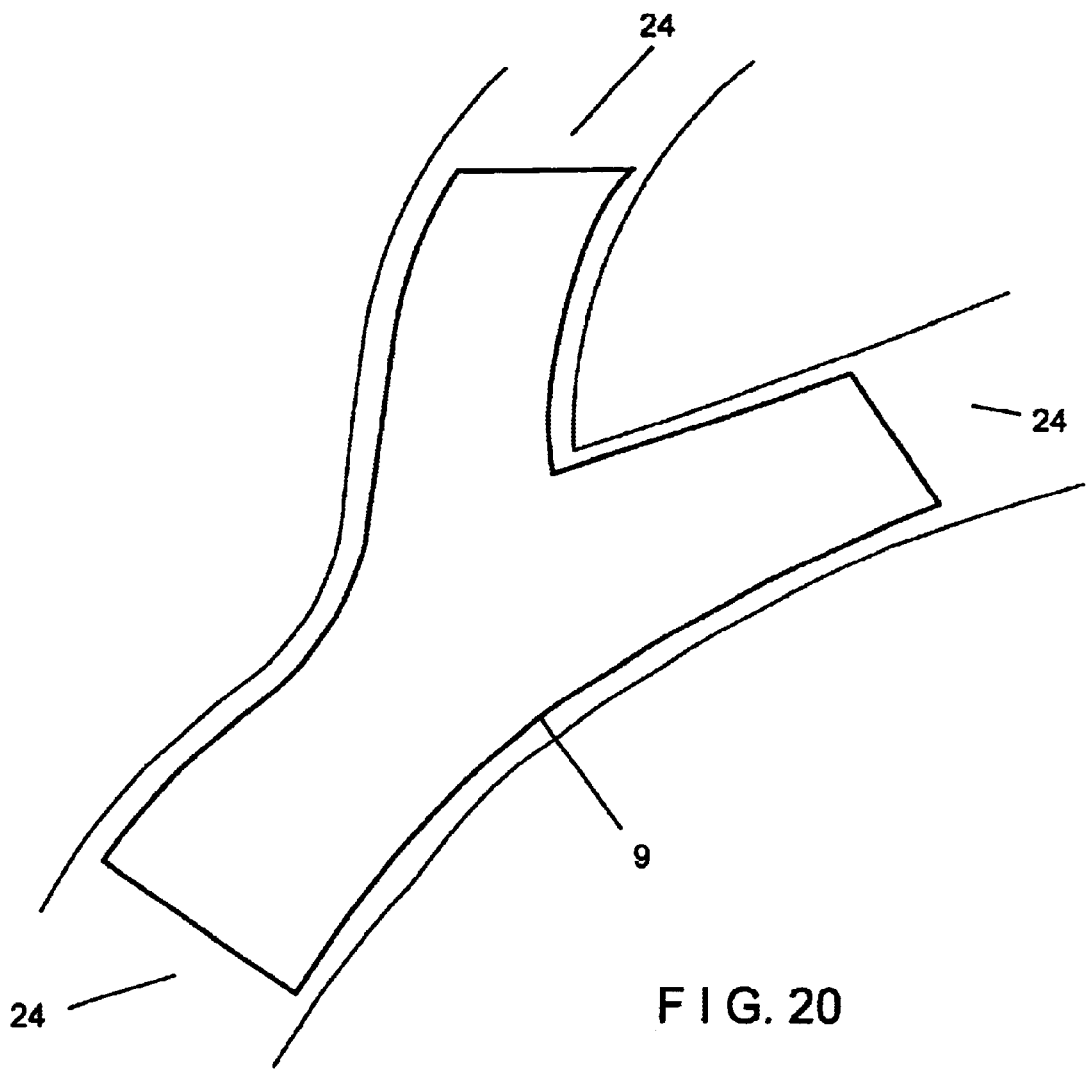
F I G. 20
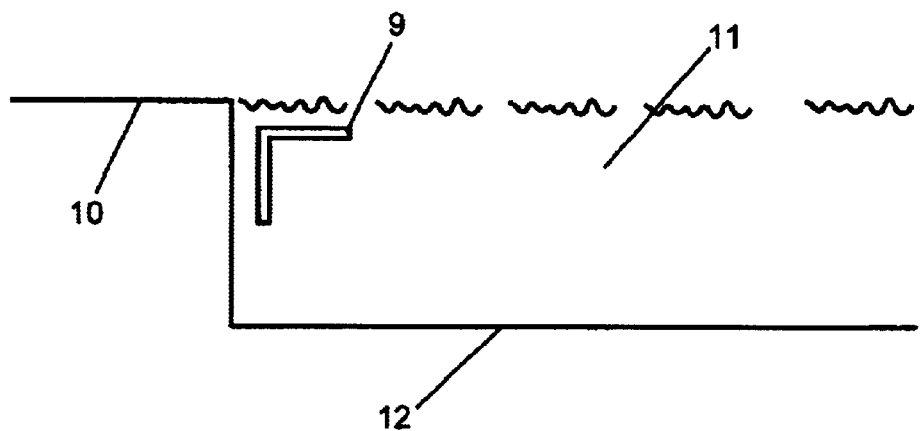
F I G. 21

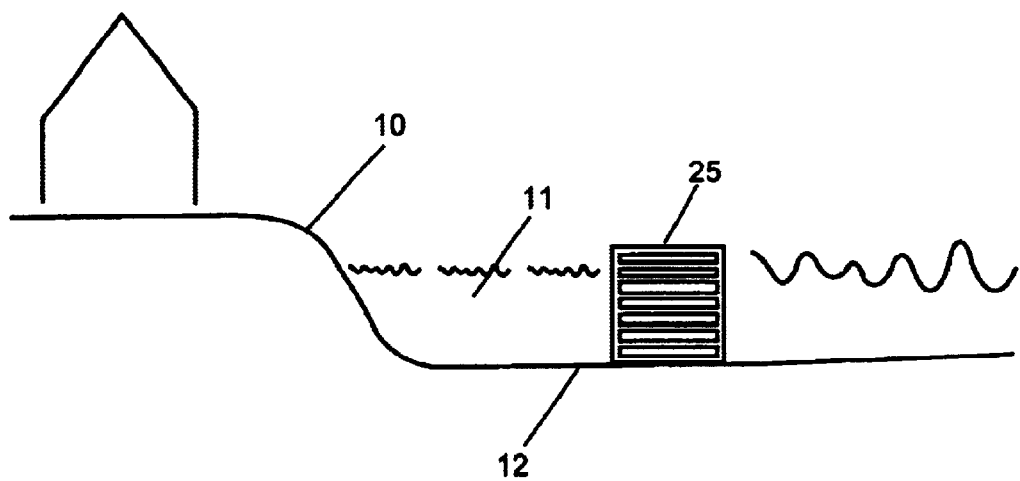
F I G. 22
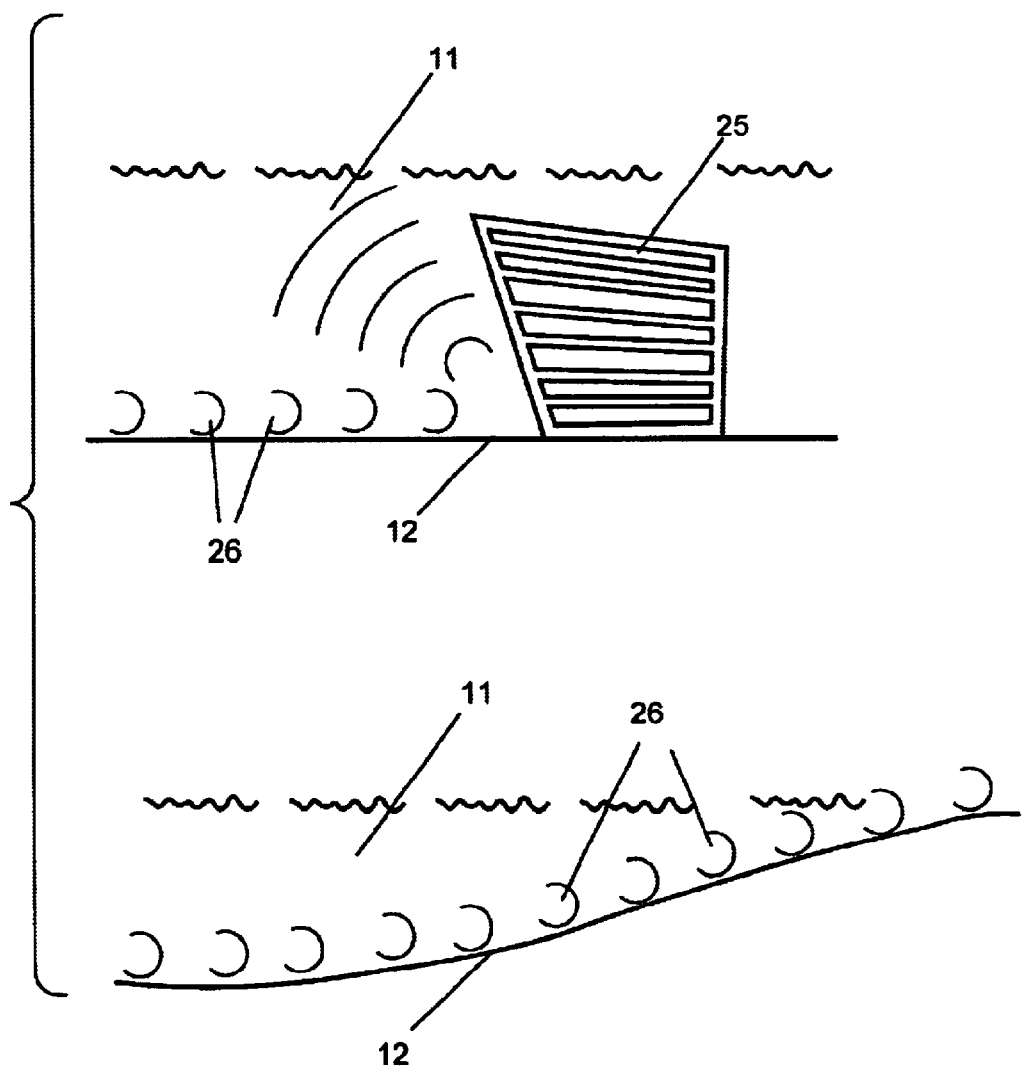
F I G. 23

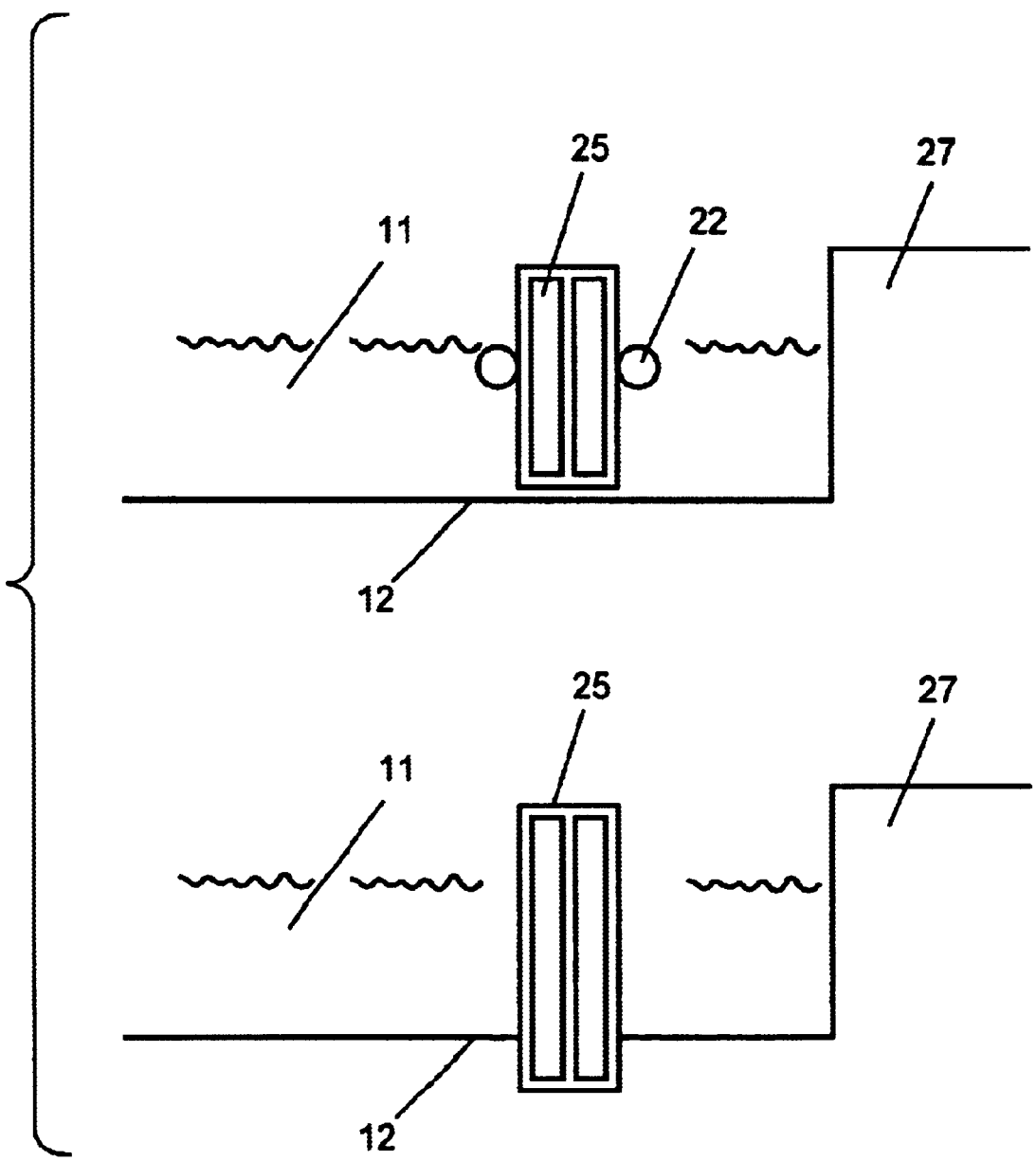
F I G. 24

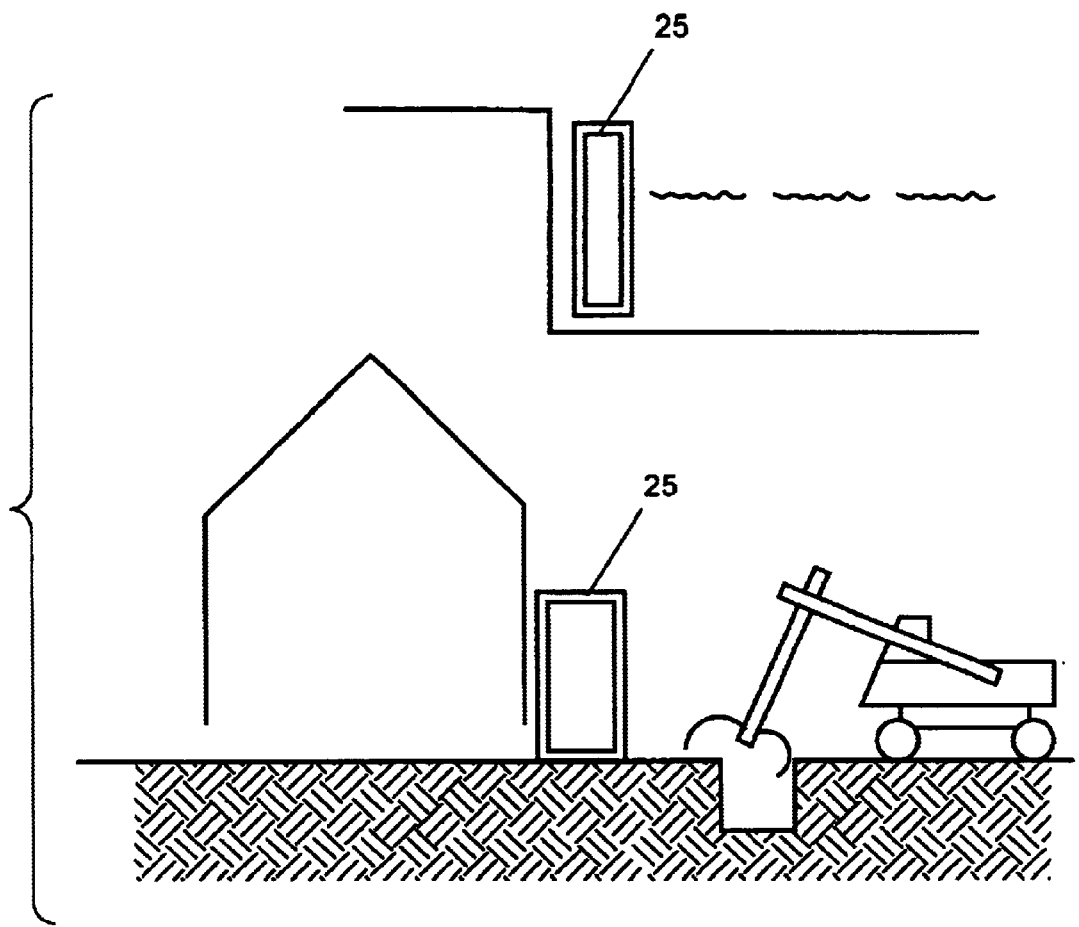
F I G. 25
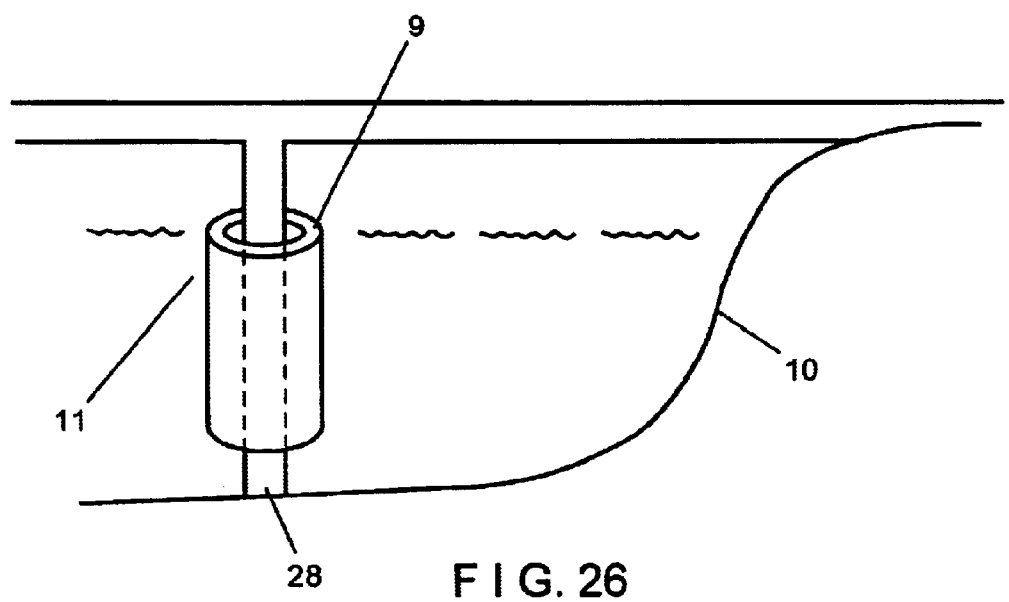
F I G. 26

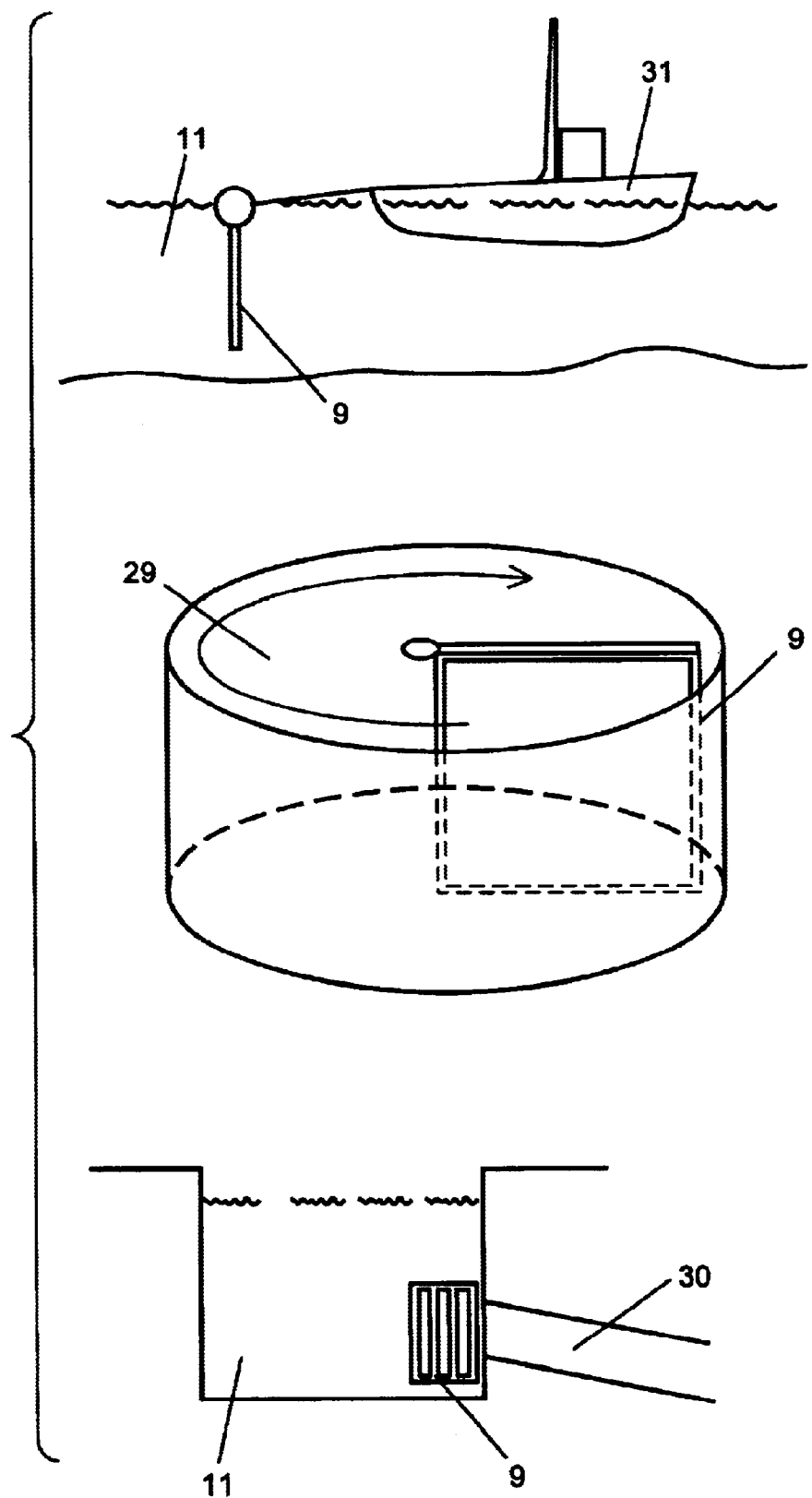
F I G. 29

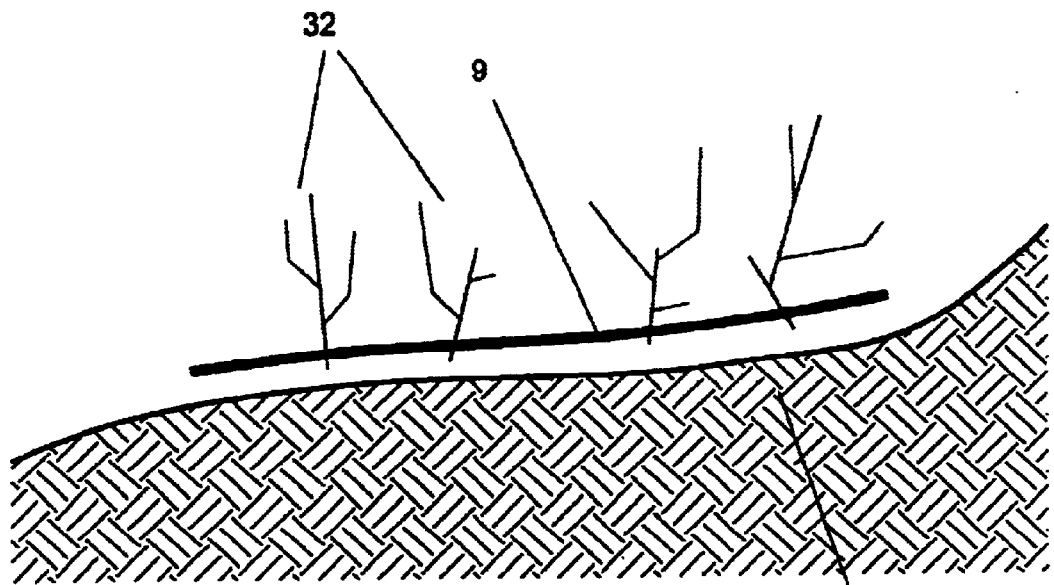
F I G. 33
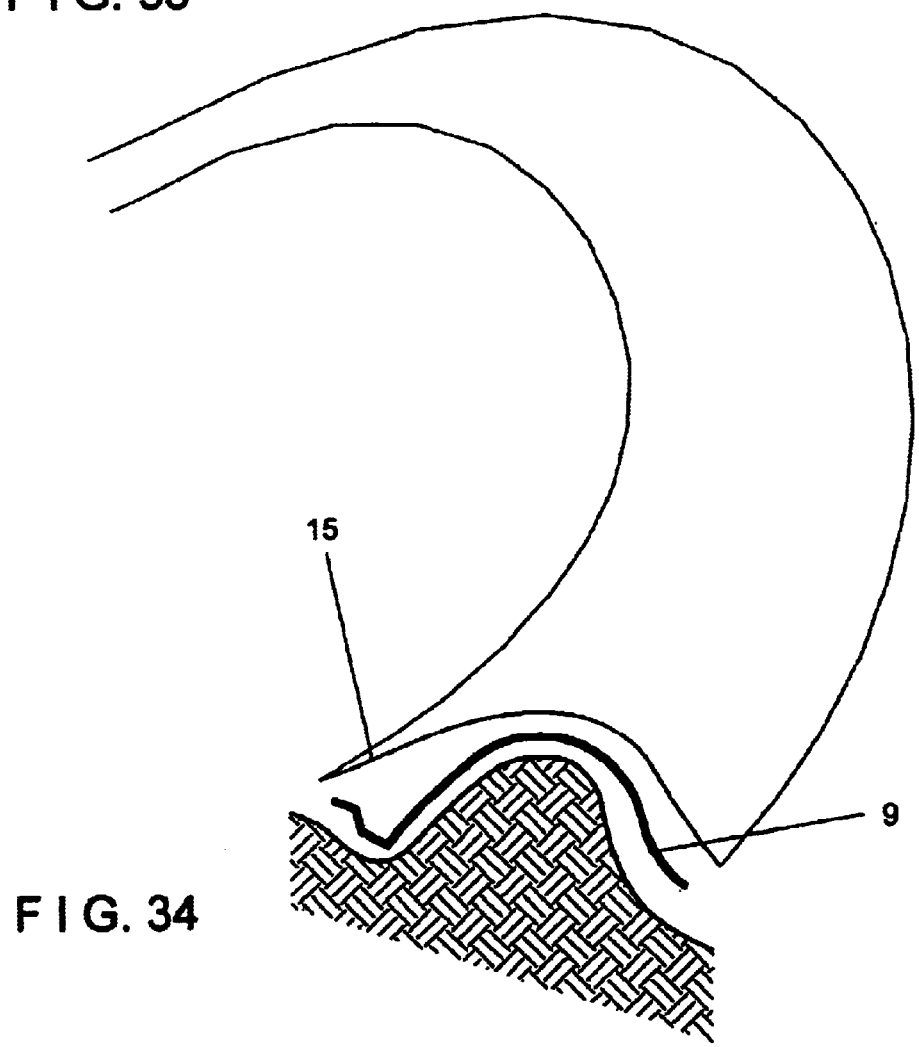
F I G. 34

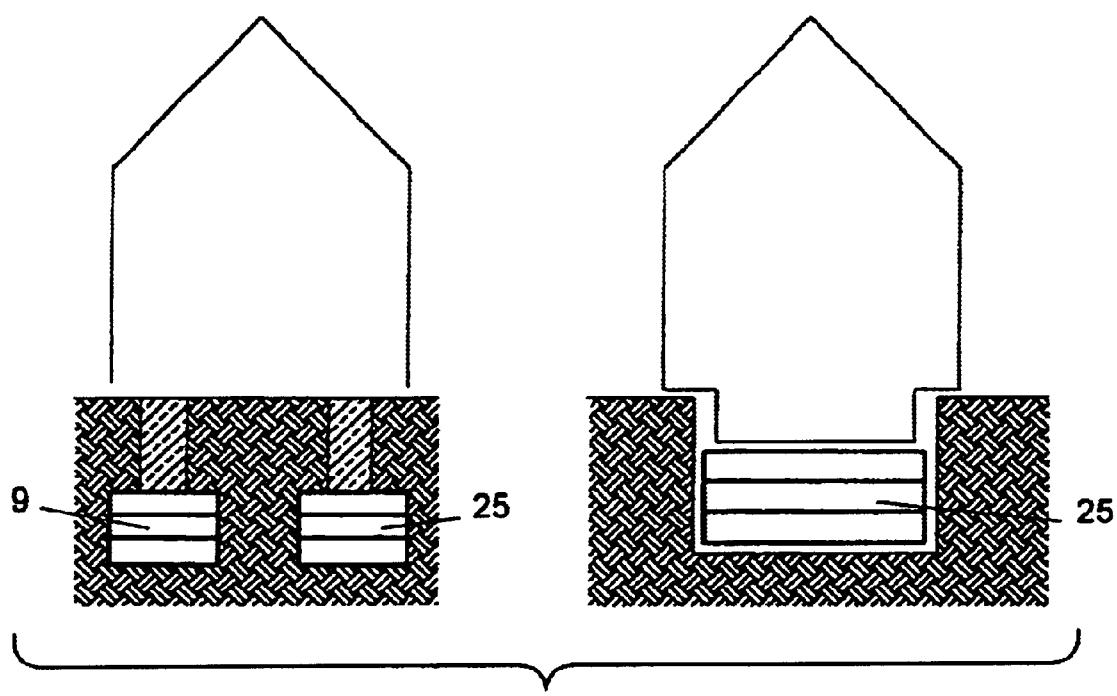
F I G. 36

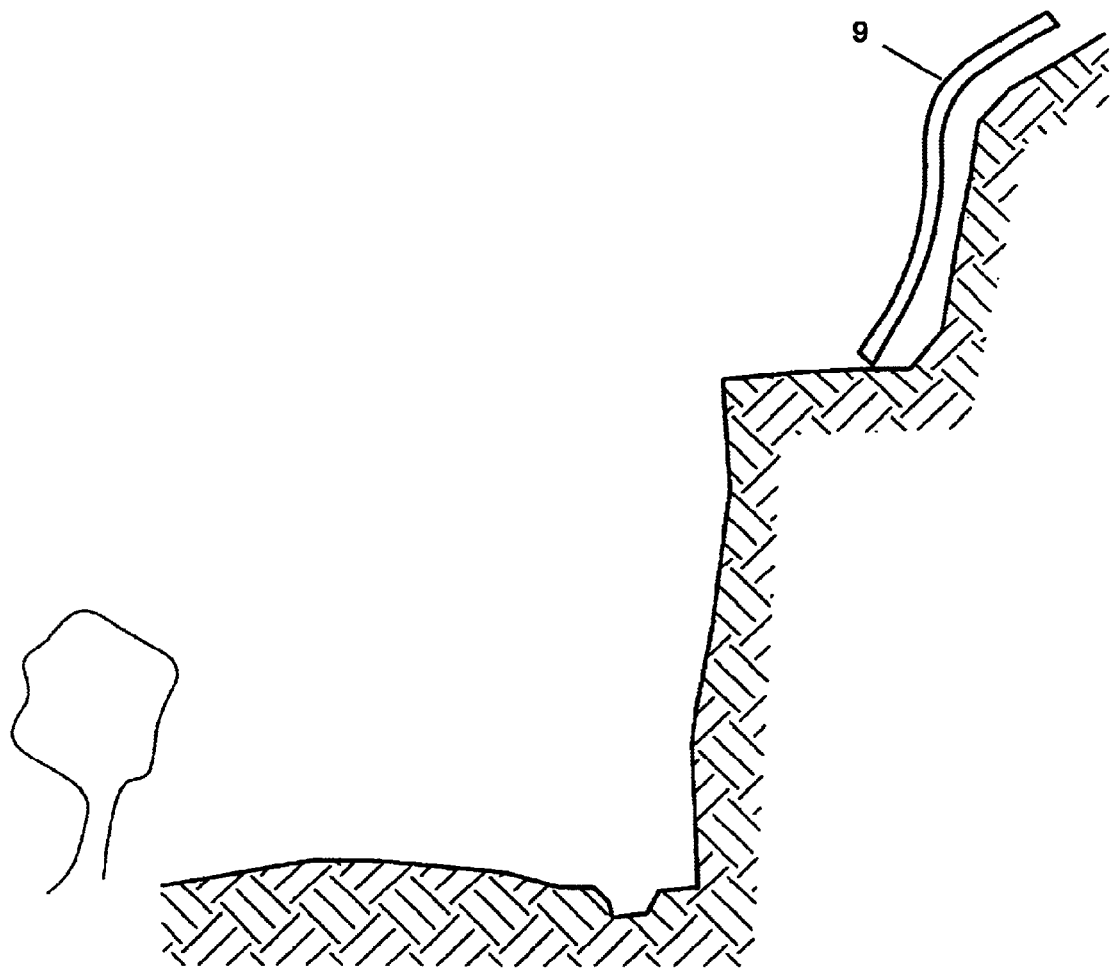
F I G. 40

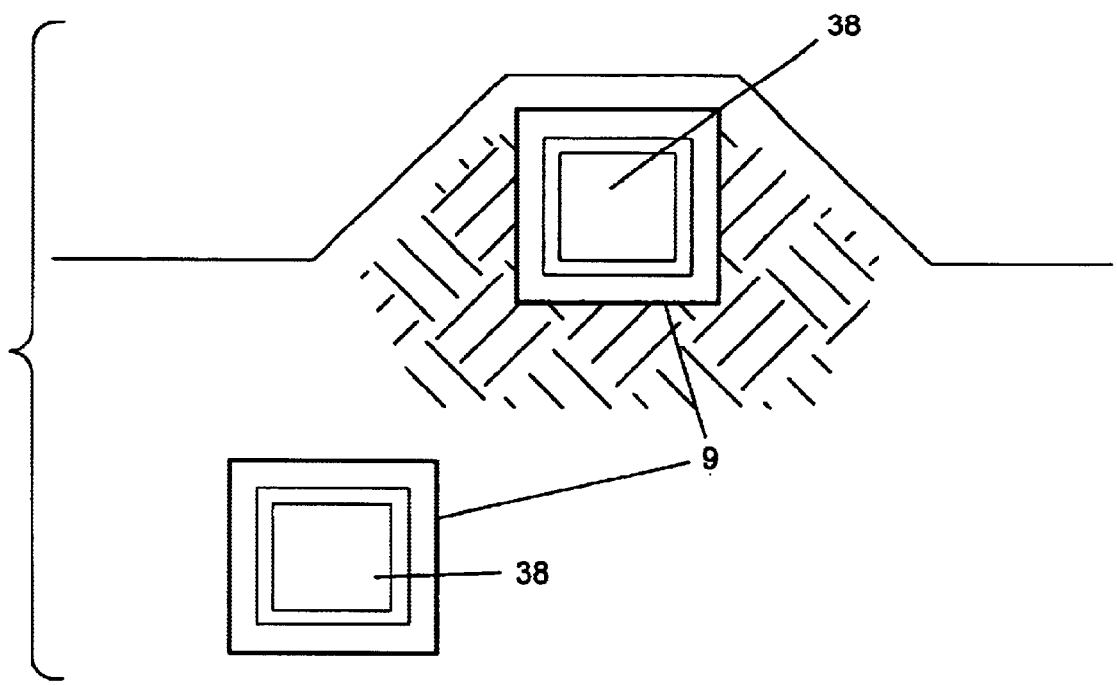
F I G. 42
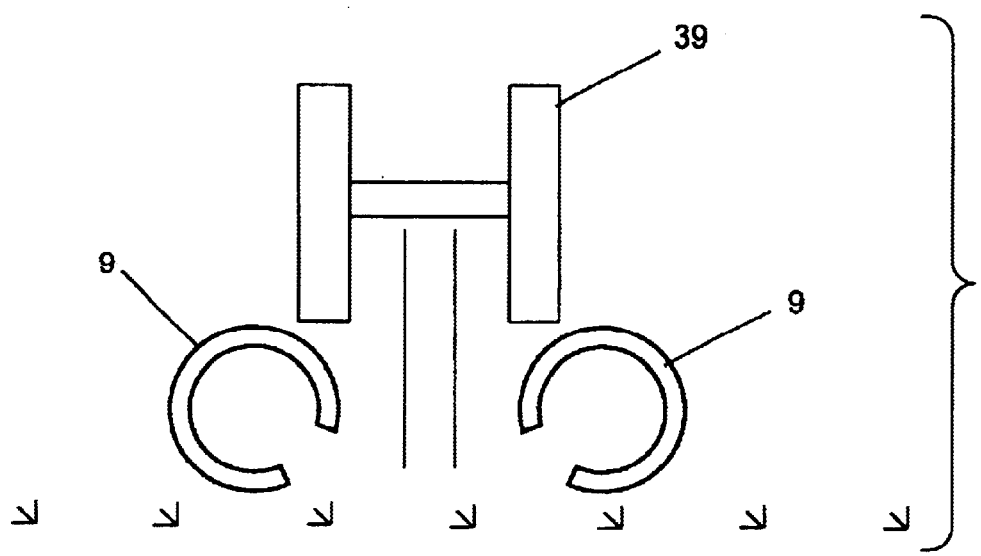
F I G. 43

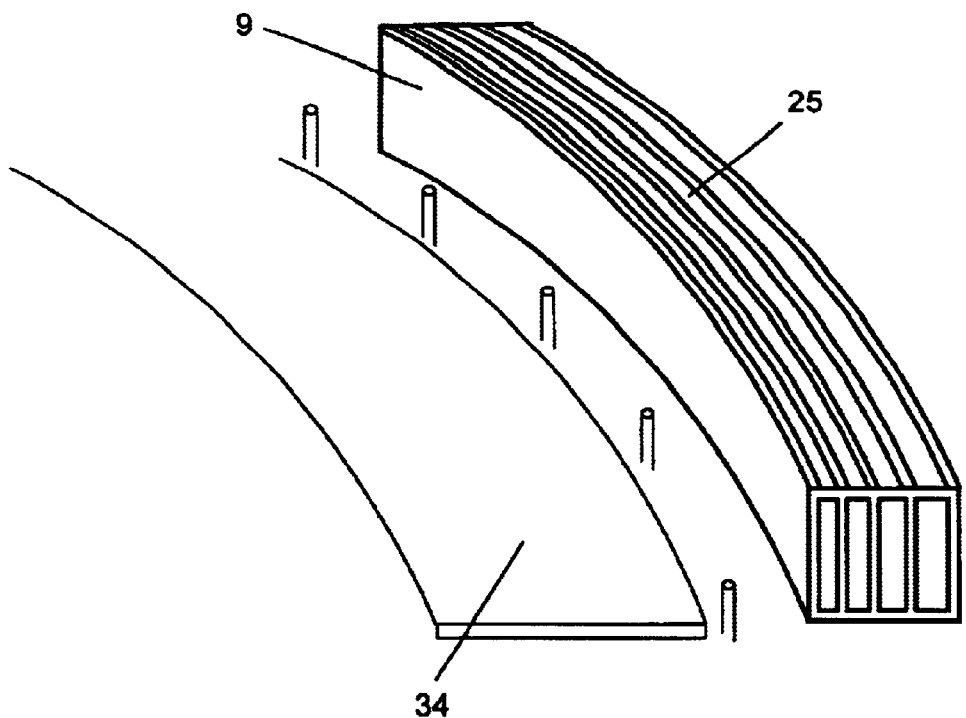
F I G. 44
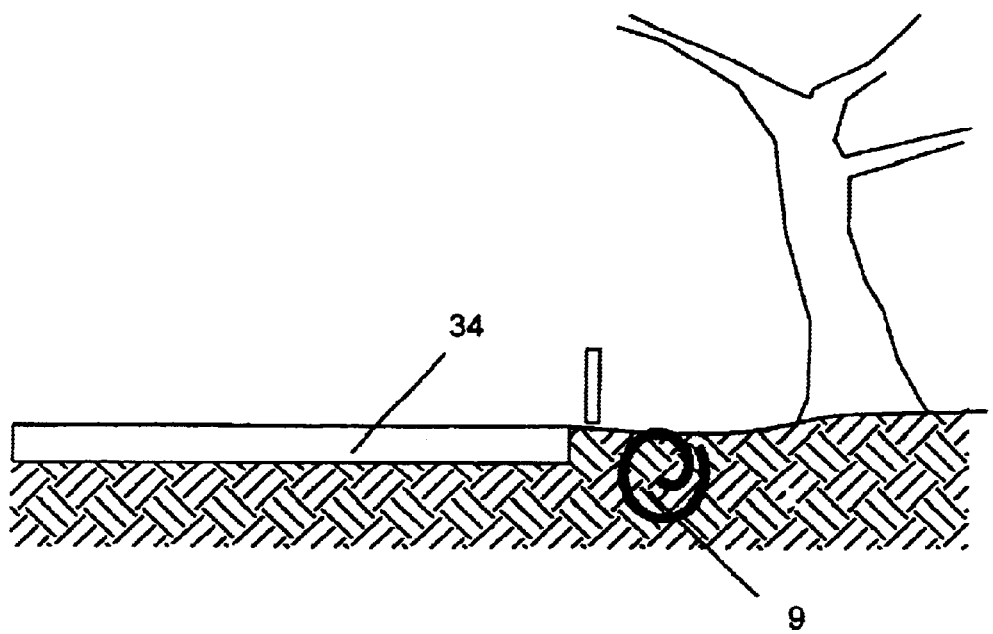
F I G. 45

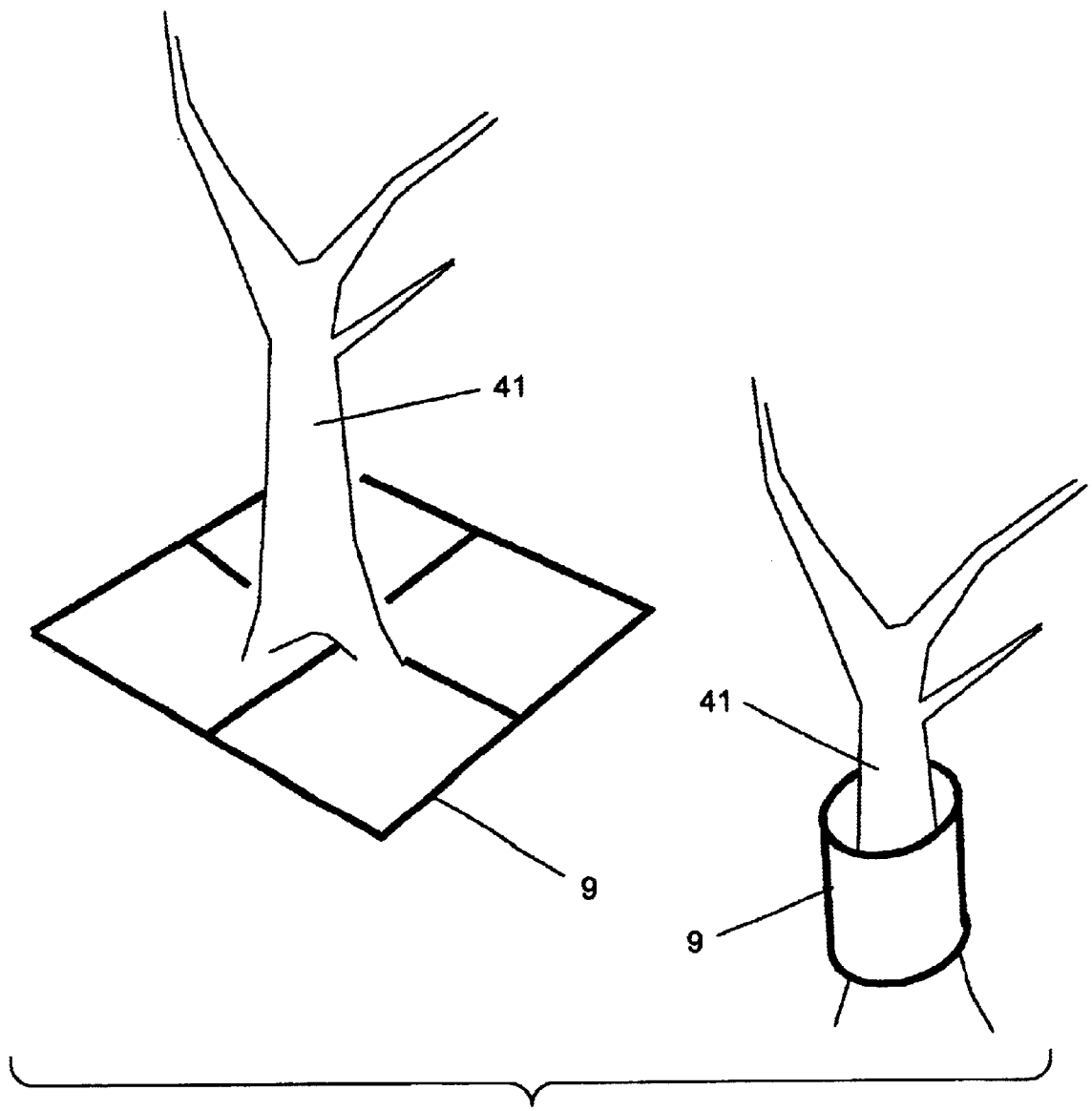
F I G. 48

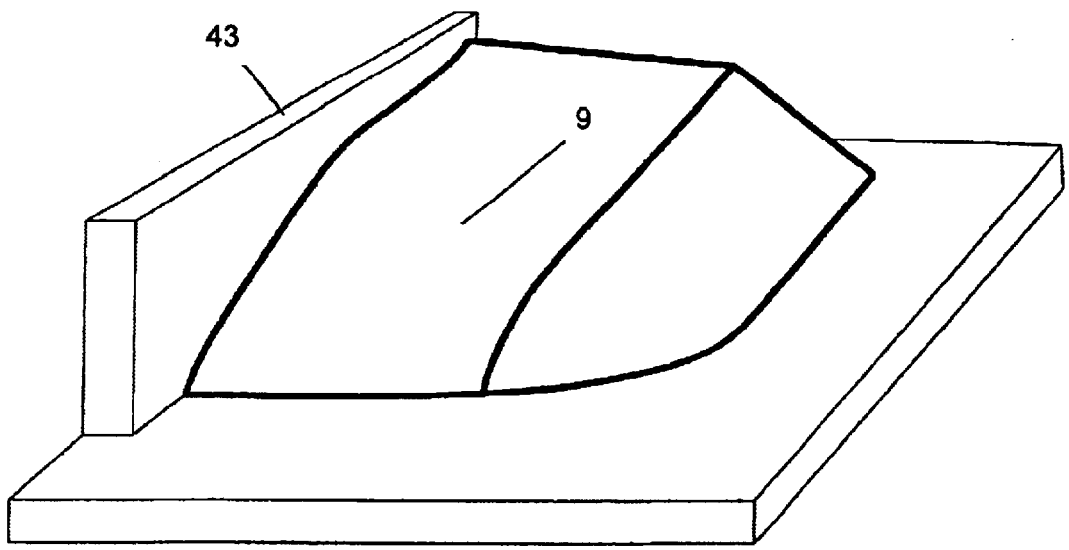
F I G. 49
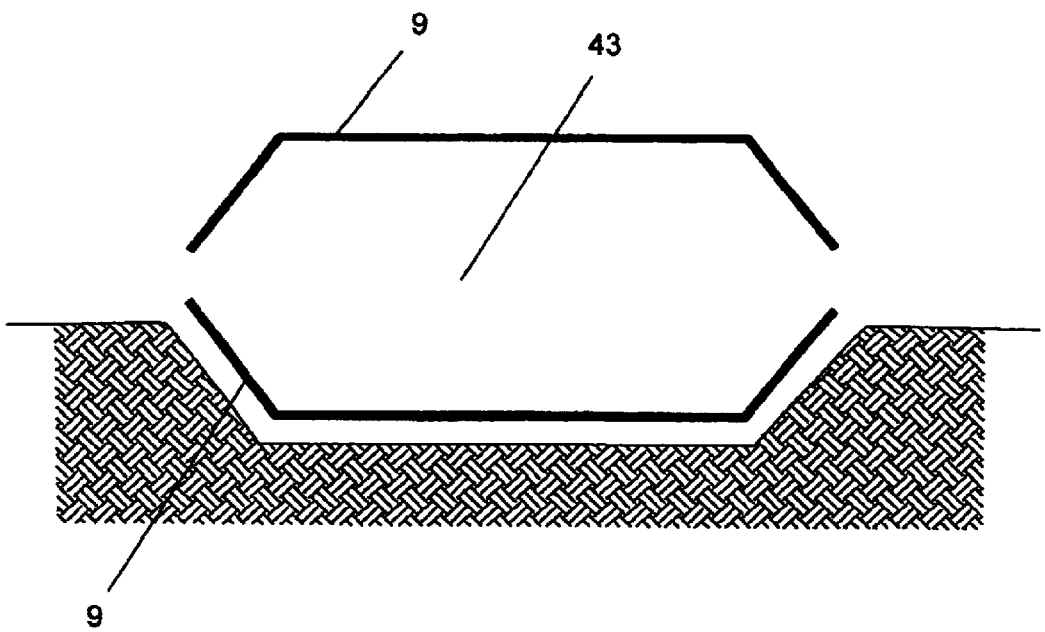
F I G. 50

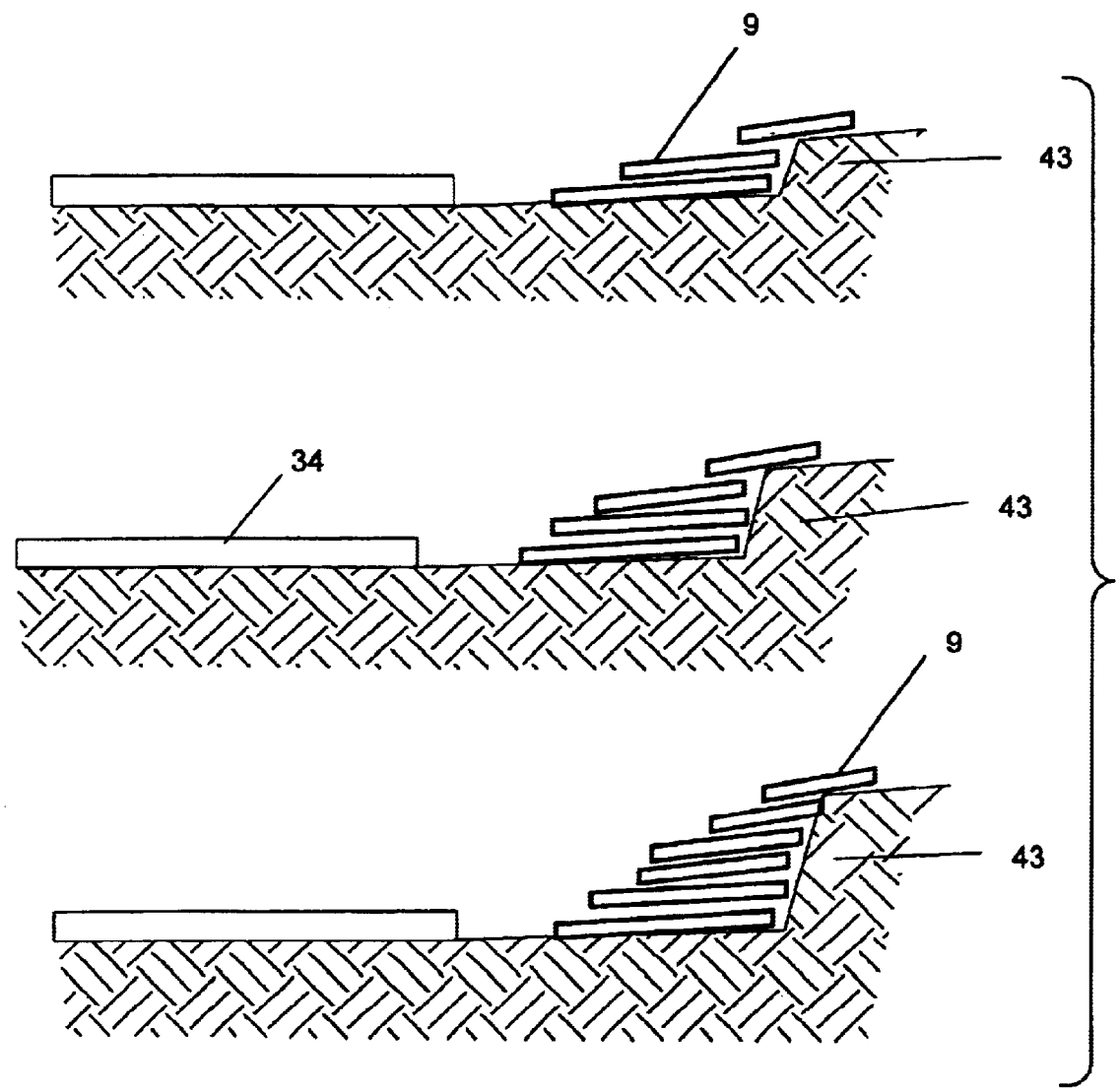
F I G. 51

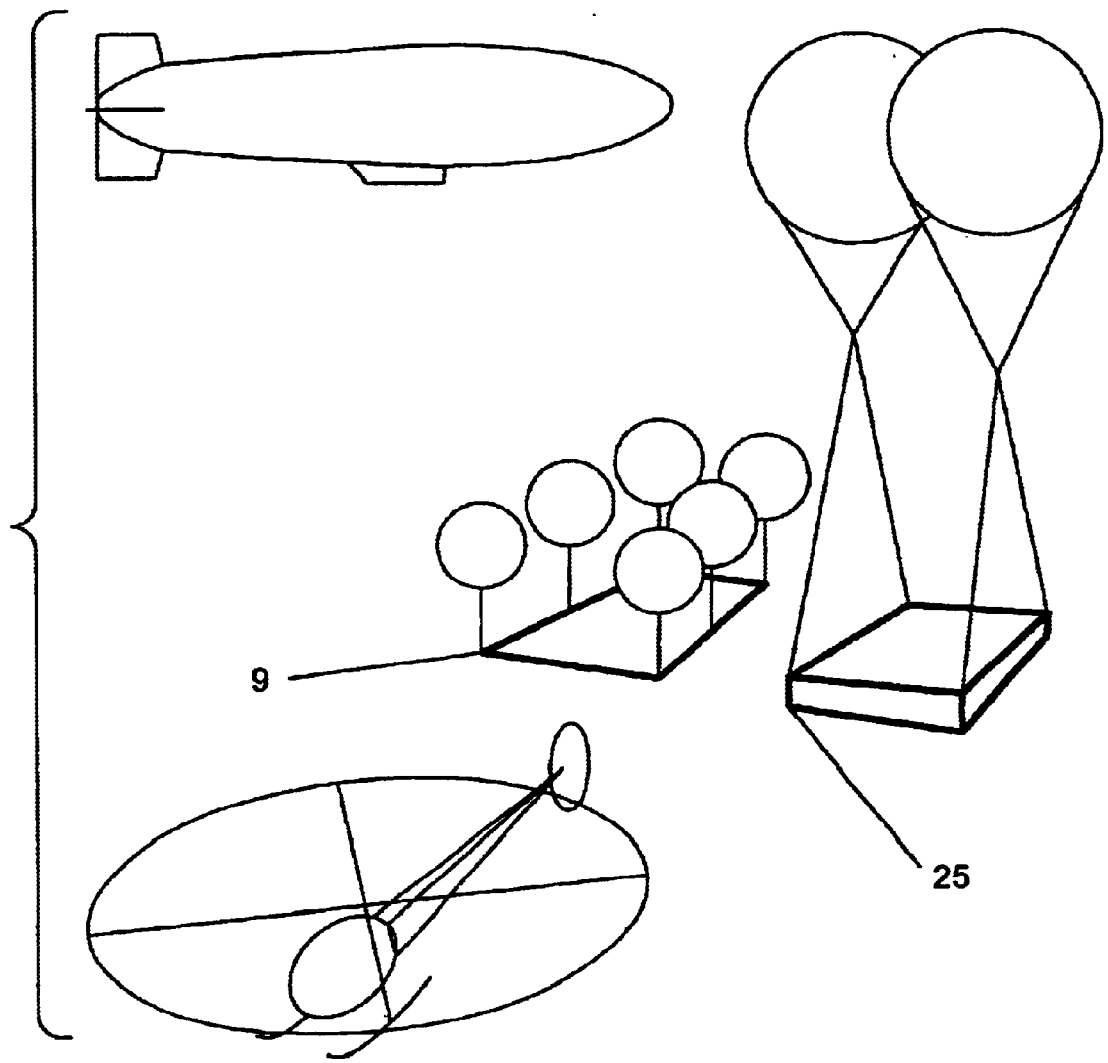
F I G. 56

METHOD AND DEVICE FOR PROCESSING TIRES

BACKGROUND OF THE INVENTION

The objective of the invention relates to a method for the processing of tires and for the manufacture of products comprised of the tire material, to a device for cutting up tires as well as construction of interwoven mesh structures or bodies such as blocks, hollow bodies, mats or aligned units manufactured from the cut-up tires.

The invention is particularly applicable to the conversion of used tires, non-recyclable for traffic purposes, arising from motor cars, road haulage trucks and aircraft, into a new basic construction element which can be used for the manufacture of a wide scope of commercial products. Intermediates for the manufacture of new end-products are rings cut out of the tires.

Comminution of tires no longer permissible for use as such, by means of shredders for example, with subsequent use of the fragments as aggregate material, in cement production or as fillers in road construction substrates for example, is well known. Further application possibilities for discarded tires are incineration and thus the production of heat energy, chemical decomposition into raw products or deposition on dumping grounds.

SUMMARY OF THE INVENTION

Of disadvantage in the known application possibilities is that the said possibilities only permit recycling after loss of quality, raw material or characteristic properties. Centralization of the application can only proceed via transportation of the tires without reduction of their volume.

Patent No. DE 39 33 729 A1 describes a process for recycling discarded tires wherein the tires are cut up to form endless ribbons. The array of utilities of such endless ribbons is relatively limited.

In Patent No. DE 33 086 51 A1 a network of tire shaped bodies is described wherein the tires are not cut into narrower slices or are arranged in cut form into rings or strips.

The disadvantage of this solution is that additional fastening elements such as rivets, clasps or pins are necessary for the interconnection of rings produced from tires.

In patent No. DE 42 009 49 A1 a method and device for the dismemberment of discarded tires is described wherein a fixed rotationally driven tire is cut into slices by means of adjustably arranged cutters on the outside face, resulting in production of the running tread of the tire, two tire walls and two wheel rim beads.

The invention is thus based on the objective of creating a method and a device by means of which effective reprocessing of a wide variety of tires is possible and intermediates of new end products with high user quality can be manufactured in simple ways at attractive prices.

A further objective of the invention is to demonstrate a new range of applications and utilization of the end products.

The said objective is achieved according to the invention by the features defined in sections of claims 1, 9 and 18 in conjunction with the features generic to the independent claims in each case.

Appropriate embodiments of the invention are to be found in the subordinate claims.

A particular advantage of the invention is that the conversion of the tires into intermediate product rings is a fully environmentally friendly production method, in the process of which no waste accrues and no pollutants are discharged, and wherein the tires are dismembered by a sequence of cuts in such a way that the two side walls are separated from the running tread and the rings arising from the side walls and/or running tread are combined together to form new products. The rubber-cased metal ring ensuring firm seating of the tire on the wheel rim can also be recycled.

All tires which cannot be fully remolded, are not deformed and have not been cut open transverse to the tread can be used for the method in terms of the invention. The method enables conversion of tires wherever they accumulate.

A further advantage of the invention exists in the fact that the elasticity of the rings retains its proportional share of the strength associated with the tire, production of the rings being such that the tire is fixed to a holding facility and rotated by a drive roller which produces an internal swelling and is aligned with a shaft possessing at least one cutting blade which cuts through the running tread of the tire from the inside.

The surface area and volume of the mass to be transported is reduced to material volume or unit weight respectively by the ring form created. In its new form, i.e. as rings, the tire is transportable without occupying the former volume of a complete tire. The rings created can be compressed to any desired two and three dimensional form permitted by the ring created.

The rings in suitable form can be stacked and transported. If the rings are to be transported to permanently installed cutting facilities or another recycling facility, it is advantageous for the purpose of saving transport space to slit the tires parallel to the middle of the running tread in such a way that two U-shaped parts result which can be stacked inside each other.

BRIEF DESCRIPTION OF THE DRAWINGS

The invention is explained hereinafter as several exemplary embodiments, part of which at least is shown in the Figures.

FIG. 3M shows a woven tubular hollow body with a bottom, FIG. 3N shows a cutout of a second interwoven mat, FIG. 3O shows a cutout of a third interwoven mat, FIGS. 3P to 3U show further variants of interweaving for construction elements such as aligned units, mats and three-dimensional bodies for example, FIG. 4 The arrangement of bodies for the construction of dikes FIG. 5 shows the arrangement of mats as river bank protection, FIG. 6 shows the arrangement of mats on the bed of a body of water, FIG. 7 shows the arrangement of hollow bodies filled with bulk material for the construction of artificial dams, FIG. 8 shows the arrangement of hollow bodies filled with water for the construction of artificial dams, FIG. 18 shows the arrangement of mats for protection against the breakthrough of ice sheets, FIG. 19 shows the arrangement of mats in pools, FIG. 20 shows the arrangement of mats in rivets, FIG. 21 shows the arrangement of mats as breakwaters, FIG. 22 shows the arrangement of interwoven bodies as breakwaters, FIG. 23 shows the arrangement of interwoven bodies as absorbers of undercurrents, FIG. 24 shows the arrangement of interwoven bodies for quay protection, FIG. 25 shows the arrangement of interwoven bodies for the protection of structures/buildings, FIG. 26 shows the arrangement of interwoven bodies or mats for the protection of bridge piers, FIG. 29 shows the deployment of mats or interwoven bodies as filters, FIG. 33 shows the deployment of mats for plant protection, FIG. 34 shows the deployment of mats for the construction of reservoir dams, FIG. 36 shows the deployment of mats or bodies in the foundations of buildings, FIG. 40 shows the deployment of mats for the prevention of falling rocks, FIG. 42 shows the deployment of mats for the protection of bunkers, FIG. 43 shows the deployment of mats in connection with protective barriers, FIG. 44 shows the deployment of mats as traffic guidance and crash protection in road traffic, FIG. 45 shows the deployment of mats for drainage purposes, FIG. 48 shows the deployment of mats for tree protection, FIG. 49 shows the deployment of mats for silage coverage, FIG. 50 shows the deployment of mats for landfill demarcation, FIG. 51 shows the deployment of mats for raised access routes, FIG. 56 shows transportation possibilities for mats and/or bodies respectively.

DESCRIPTION OF THE PREFERRED EMBODIMENT

Figure 1:
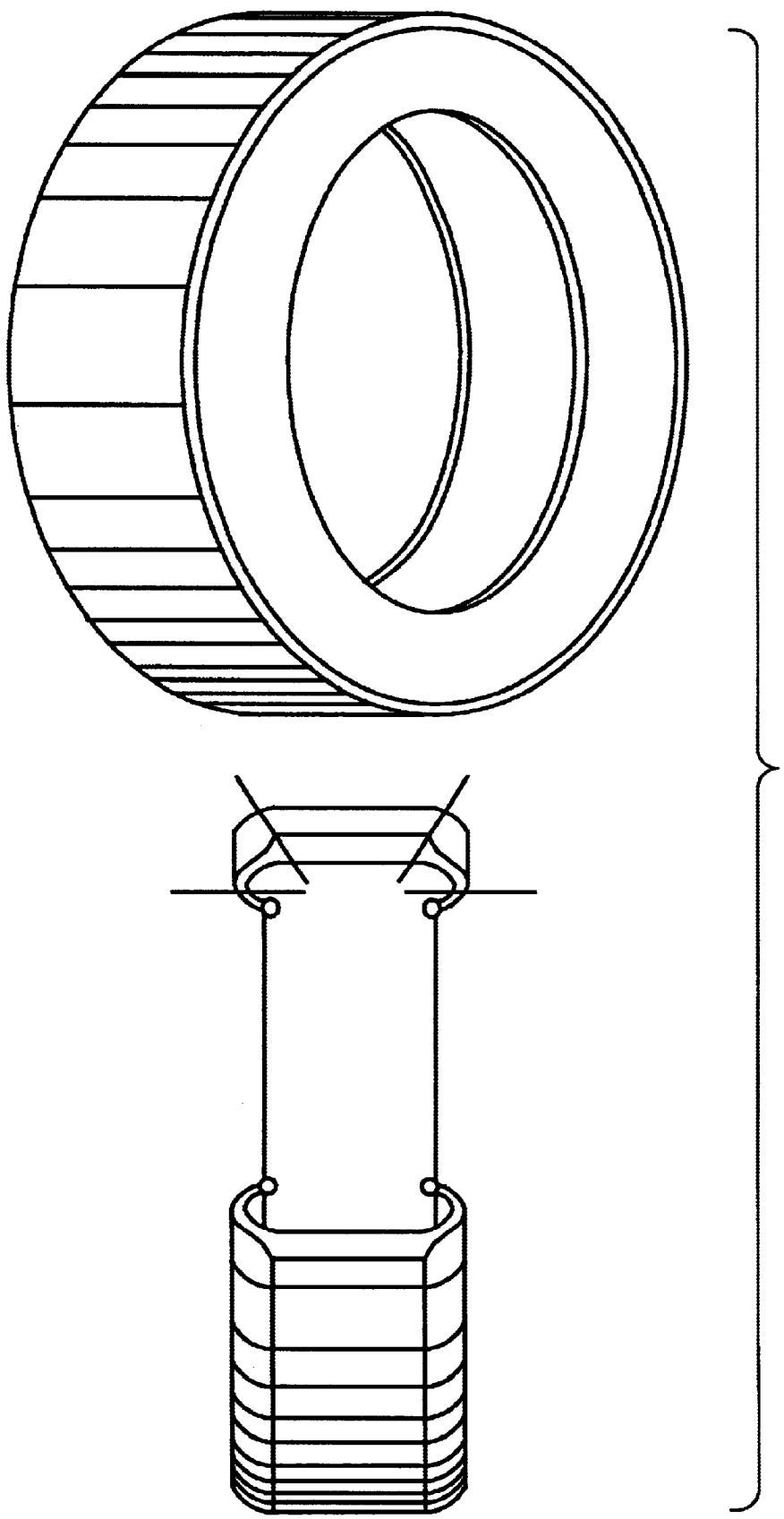
FIG. 1 shows a stylized view of the steering of the cut in a tire represented as a half.
Figure 2:
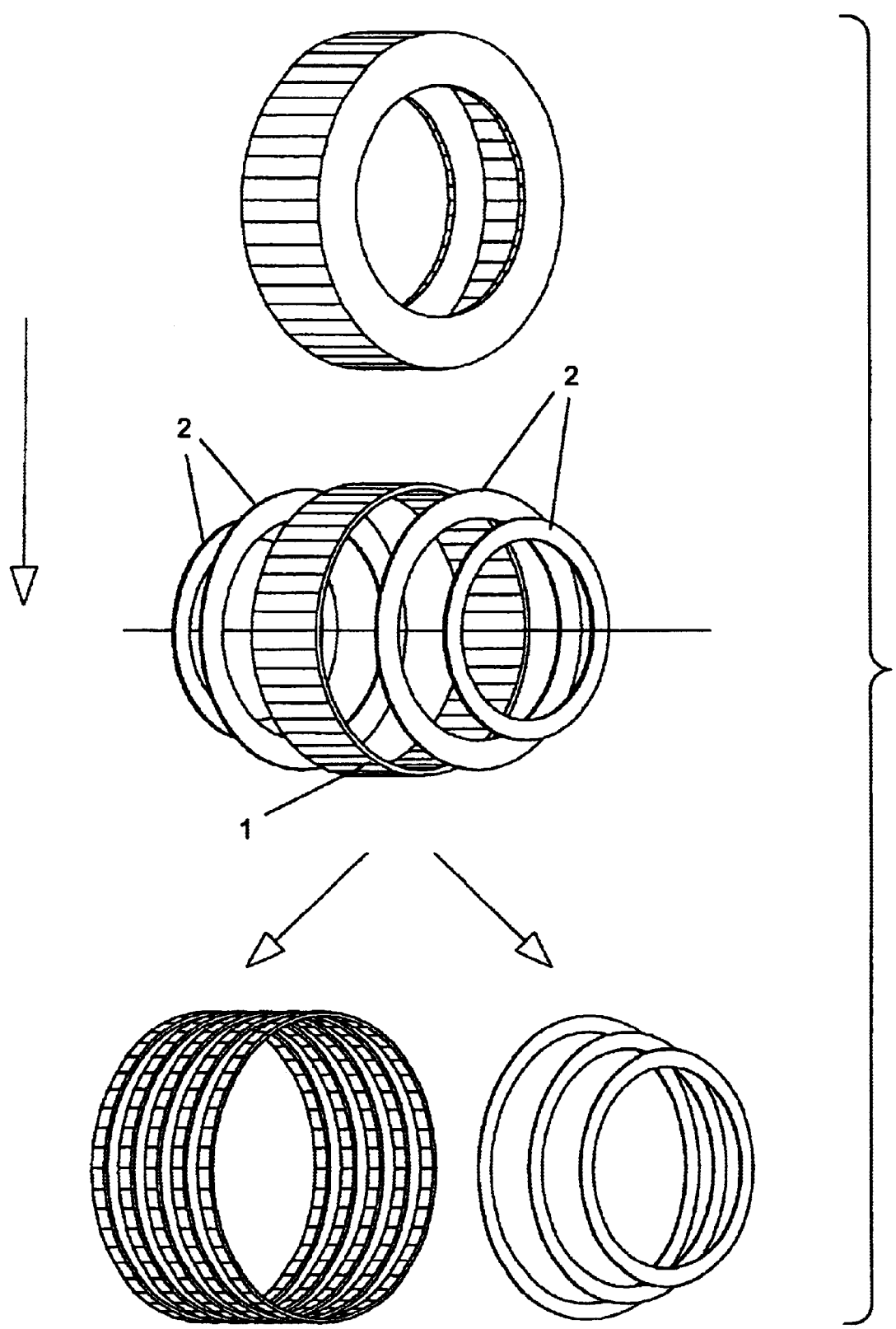
FIG. 2 shows the products of the cut steering as represented in FIG. 1, FIGS. 2A to 2C show variants of the cutting devices.

As shown in FIG. 1, a tire is cut in such a way that a running tread ring 1 and two side wall rings 2, are obtained. The running tread ring 1 and side wall rings 2 are shown in FIG. 2.

Figure 2A:
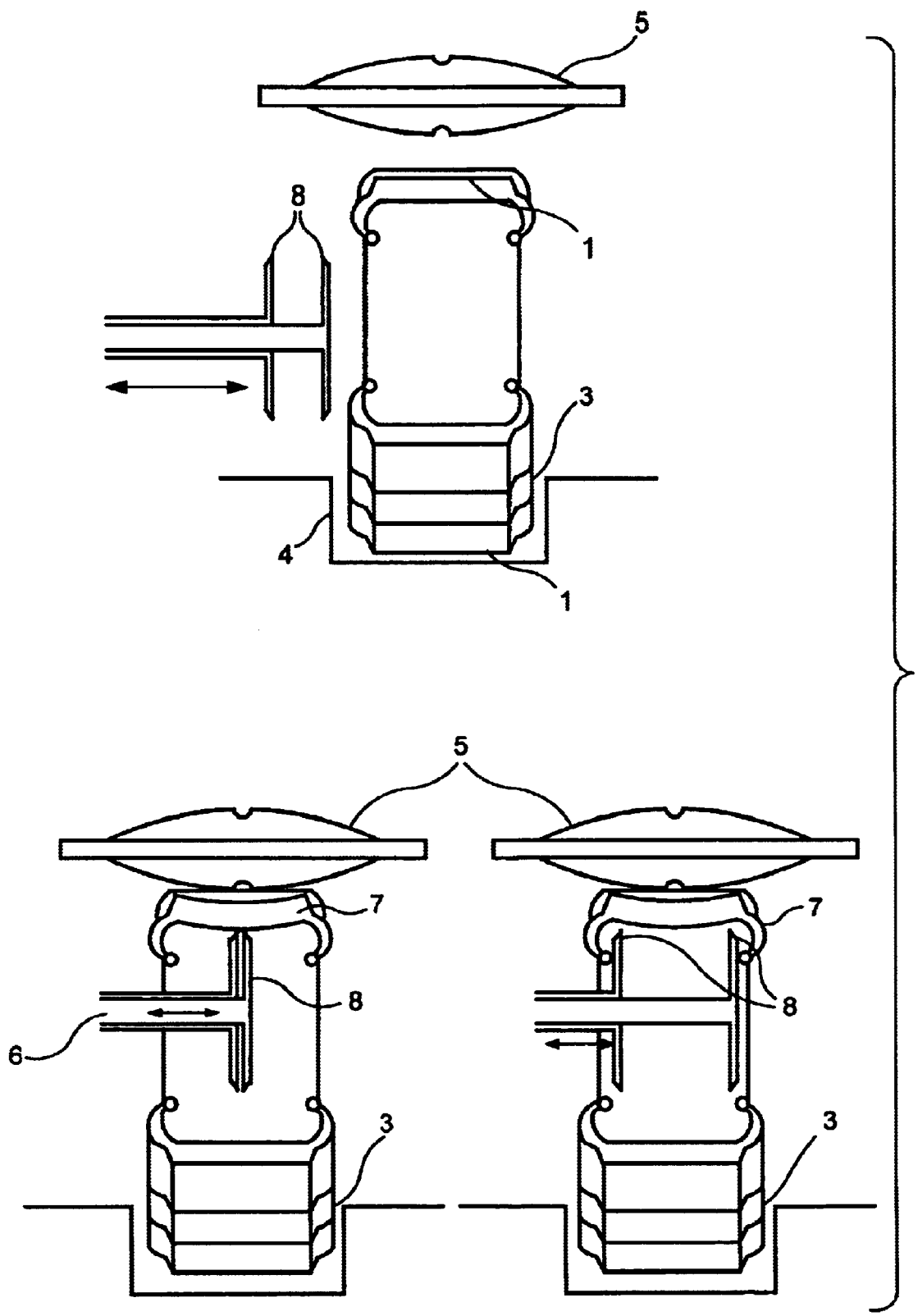
Figure 2B:
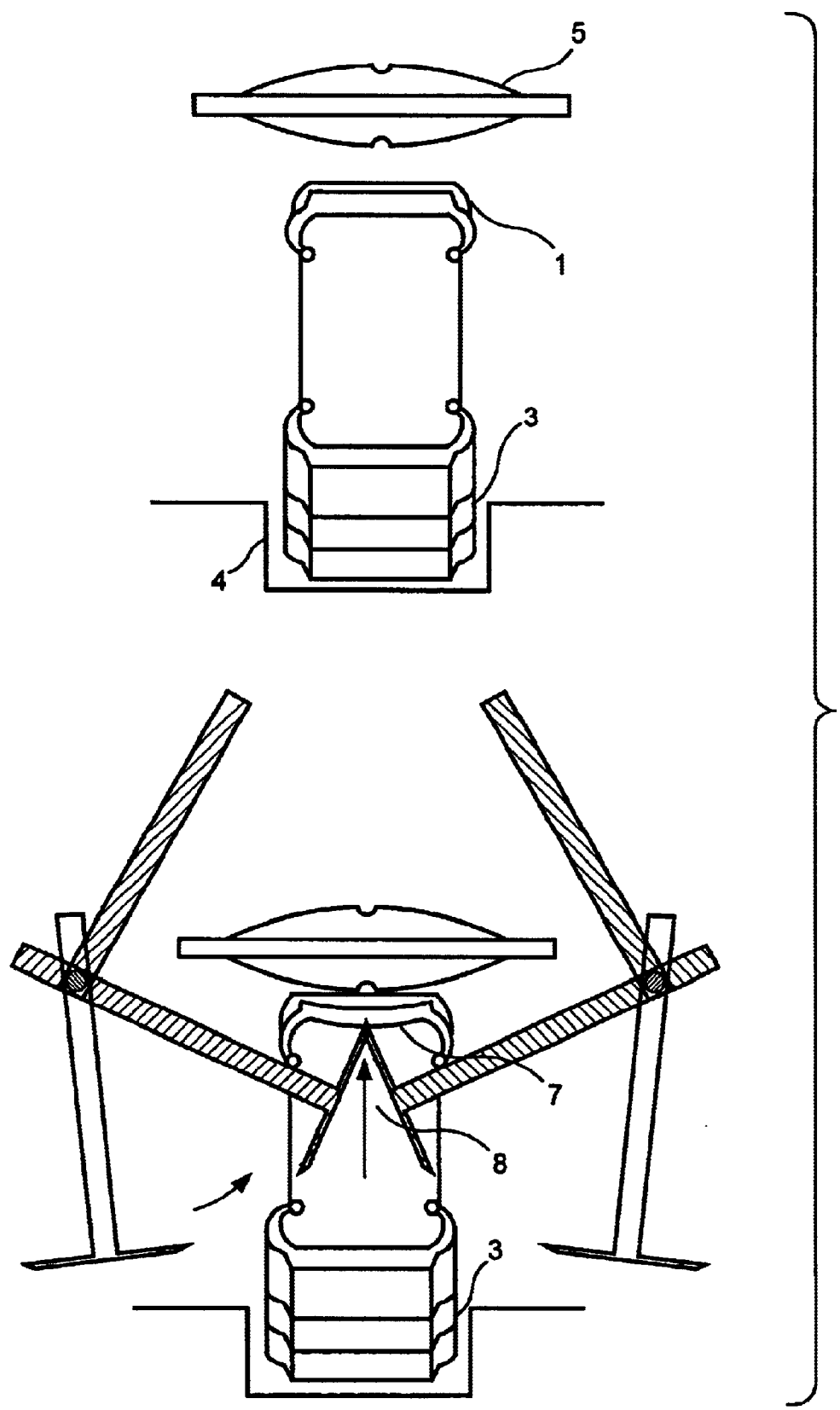
Figure 2C:
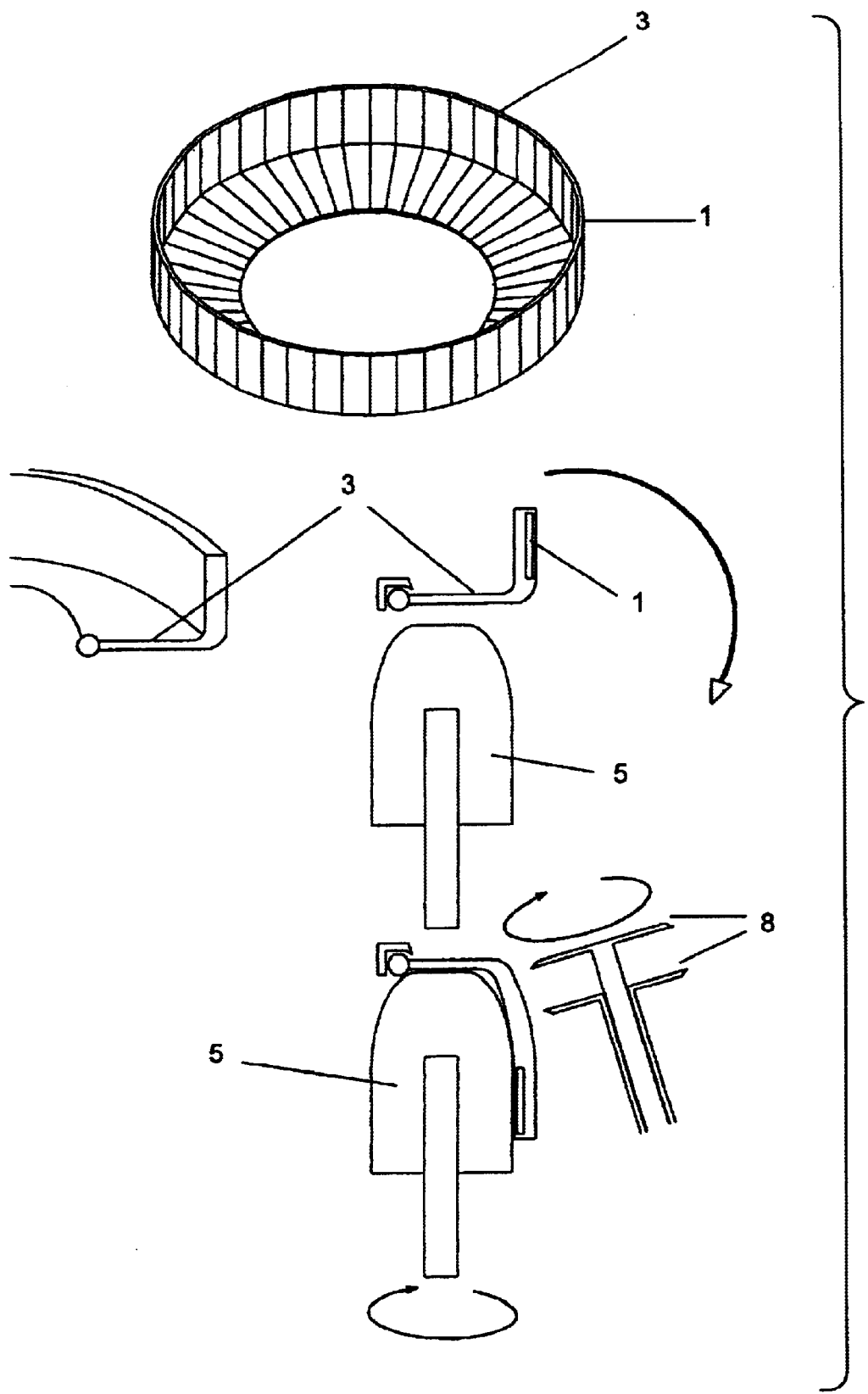

The running tread ring 1 can be dismembered into narrower rings by further cuts, just as can the side wall rings 2. FIGS. 2A to 2C show variants of the cutting devices.

The tire 3 is fixed in a holding facility or guide 4 or unsupported and rotated by a transversally arranged drive roller 5 and is laterally guided. The cutting blade 8 swings inside against the swelling 7 induced by the drive roller and cuts the tire 3 into at least 2 annular parts. The cutting edges are arranged in such a way that the rubber is tensioned against them during the process of cutting. Deposition of the halves of the tire as shown in FIG. 2C occurs on both sides, on top of each other and held together by suitable means. By using multiple cutter systems, several cutters 8 are variably adjustable on the shaft 6 in terms of their distance apart. Several rings of the same or different widths can be prepared from the running tread 1 of the tire 3 by this means. Removal of the rings from the cutting system into the stacking unit is effected by grasping elements. Stabilization of the cutting process is achieved by clamping the wheel rim beading in a receptive device. Any mechanical procedures as well as computer aided positioning techniques can be used. Cutting up the tires using a cutter 8 from the outside is also possible.

Creation of interwoven mesh structures or three-dimensional bodies is performed by joining the rings up by hand or by means of handling manipulators or clamping/gripping elements. Combination of the rings by hand is performed by gripping a ring and pressing it together in such a way that equivalent sized loops are formed to the left and right. Passage of a folded further ring through the two loops or openings makes it possible to grasp the loops of the second ring. Opening of the starting ring is prevented by fixation with the result that a new ring can be passed through the newly created loops. The weaving process described can be supported by devices diverting the weave created away from the amenity such that a continuous production process proceeds with the weaving equipment.

Several embodiments of the interwoven mesh structures and bodies obtainable from weaving are shown in FIGS. 3A to 3H. Mats which can be used for the reinforcement of dikes against the influence of swollen waters for example are very effectively produced interwoven patterns.

Figure 3A:
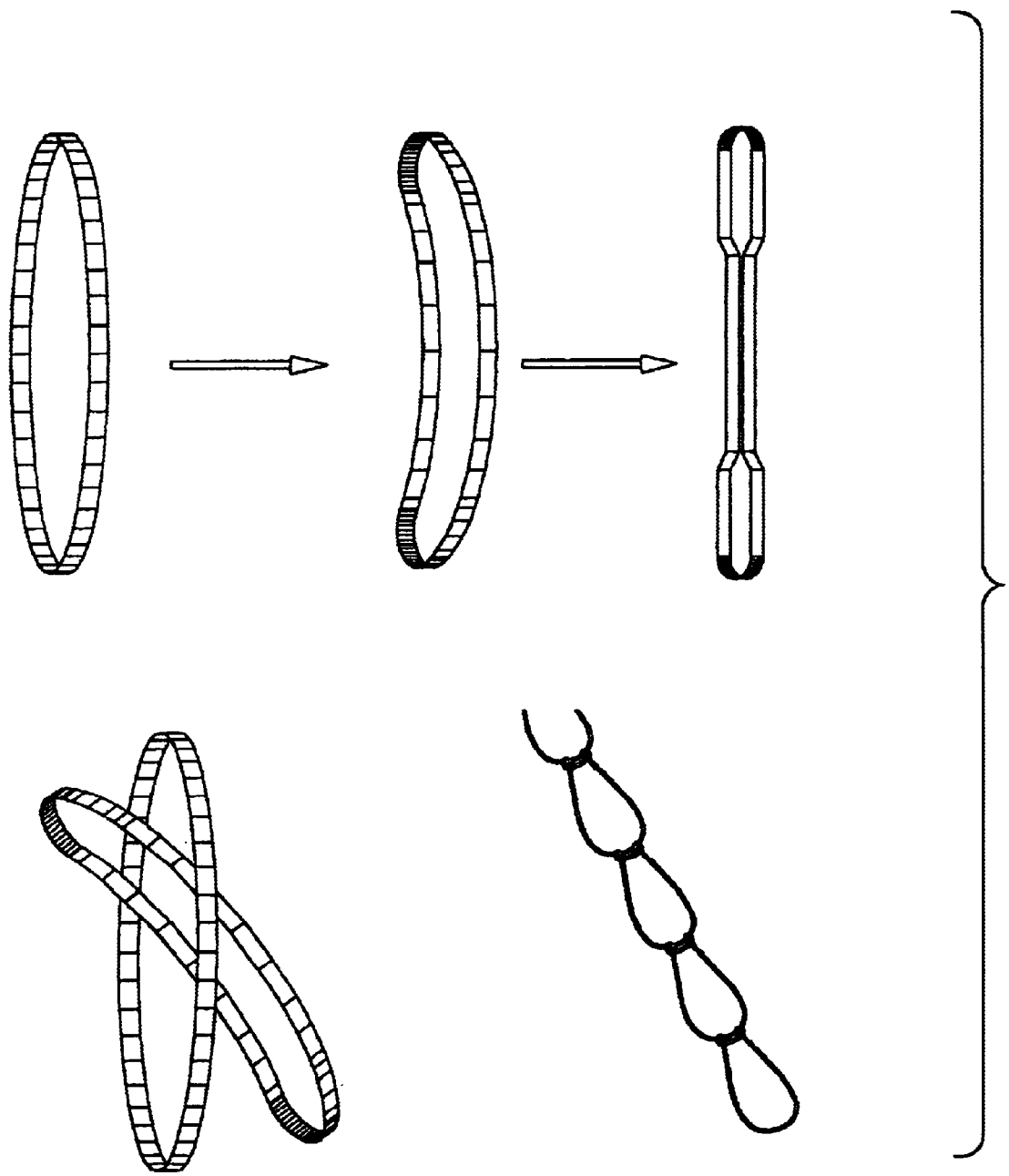
FIG. 3A shows the formation of a ring chain.
Figure 3B:
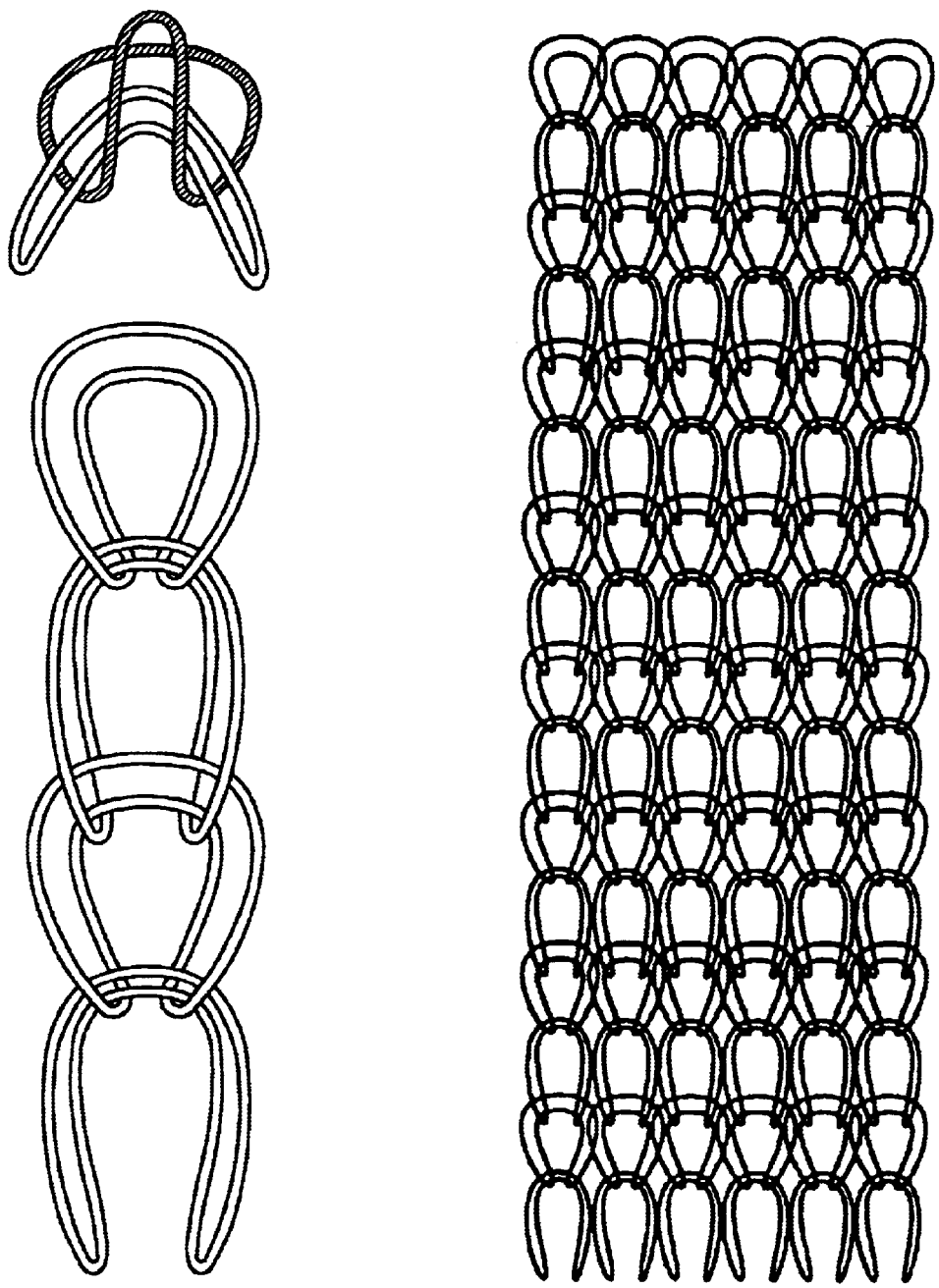
FIG. 3B shows the formation of a interwoven material
Figure 3C:
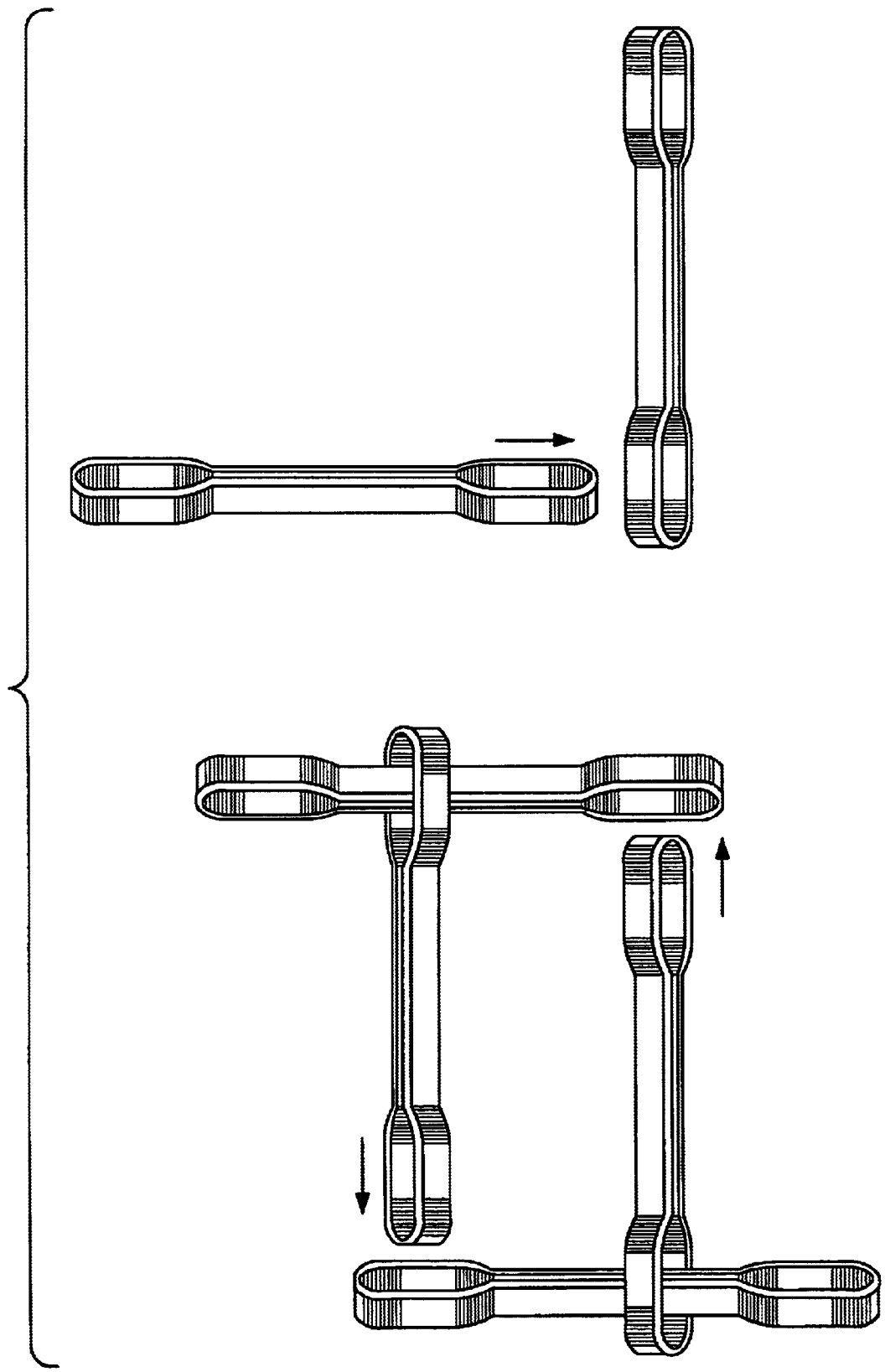
FIG. 3C shows the construction of a basic element (four-component element)
Figure 3D:
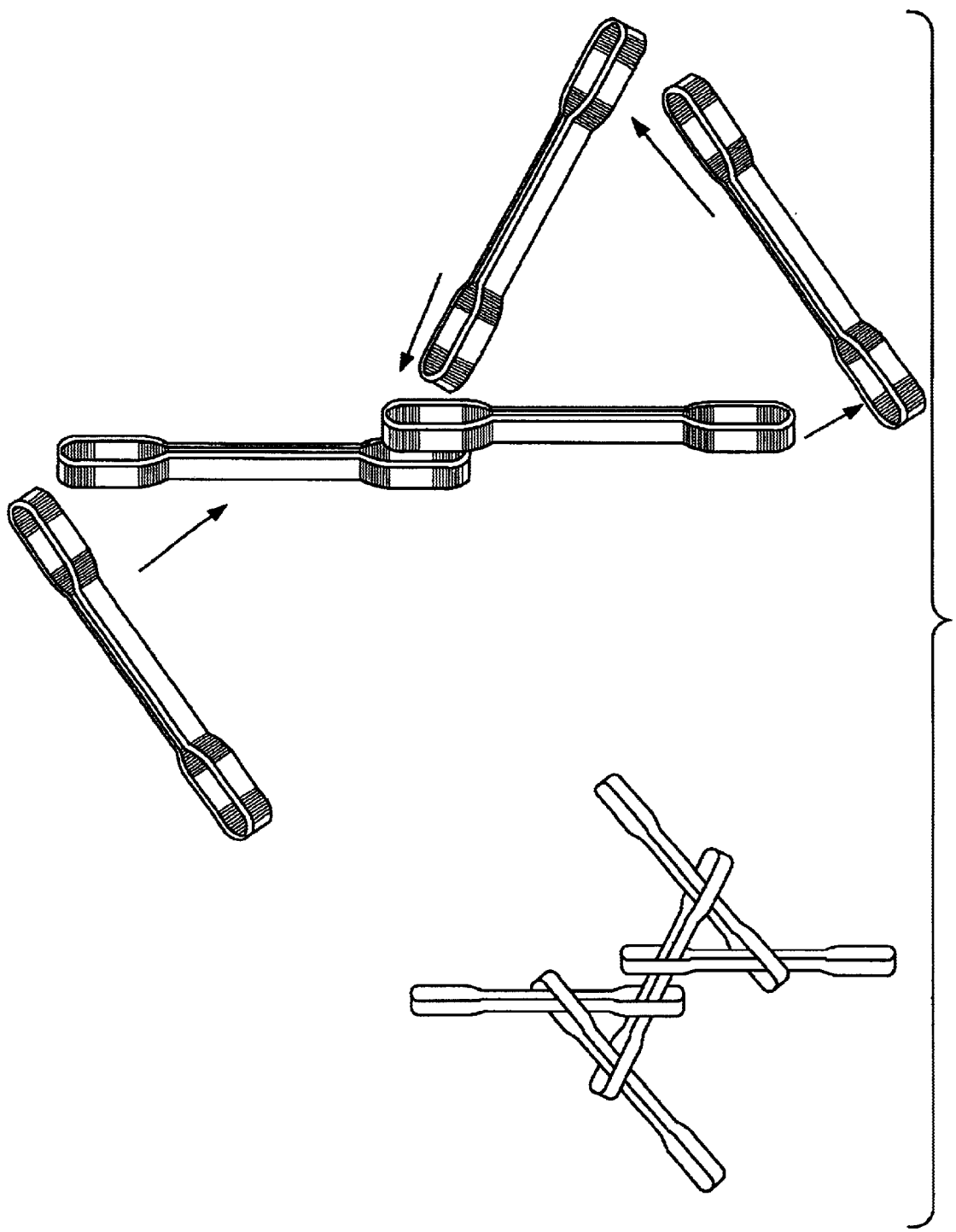
FIG. 3D shows the construction of a basic element (three-component element)
Figure 3E:
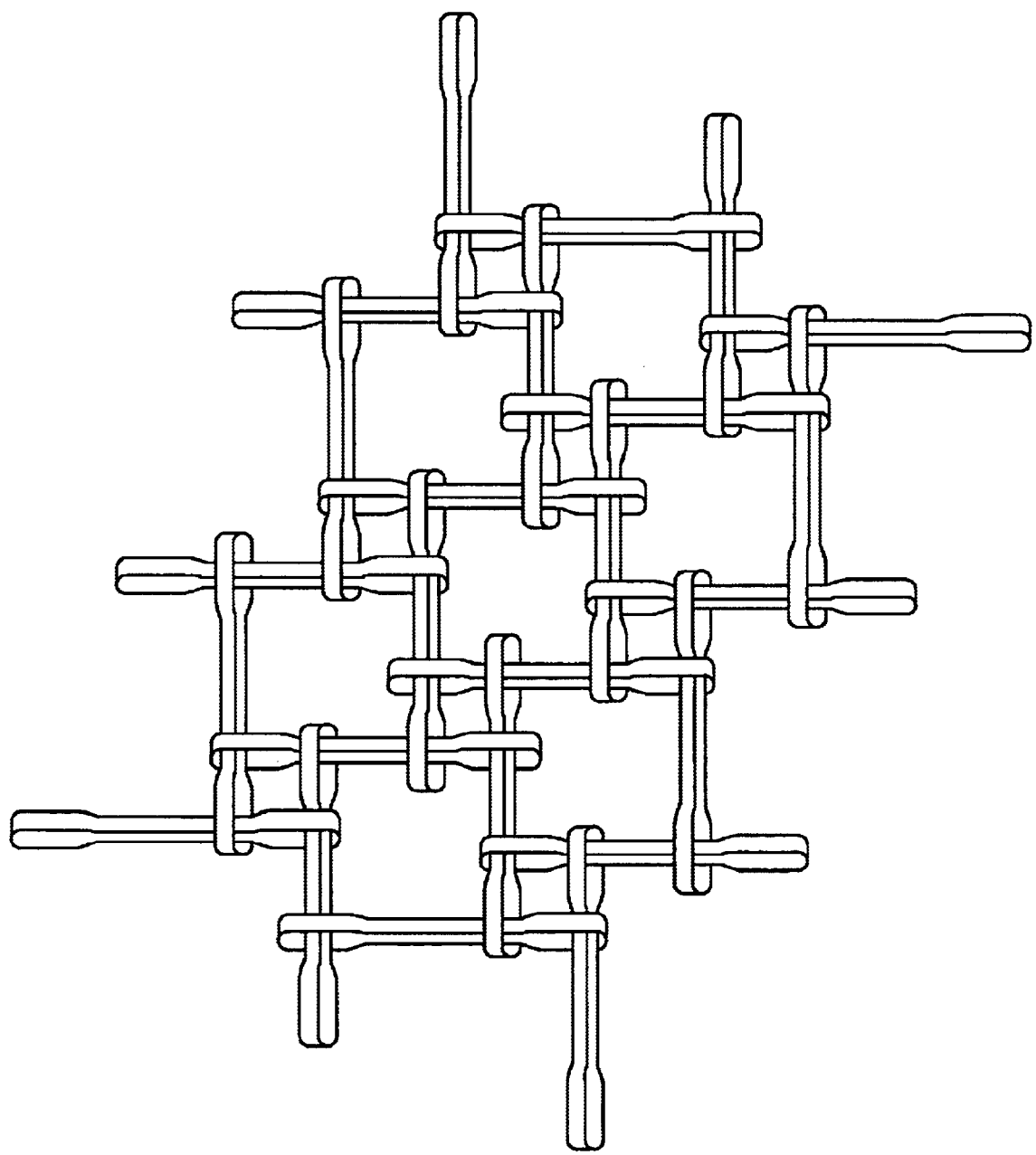
FIG. 3E shows the formation of a mesh from basic elements according to FIG. 3C.
Figure 3F:
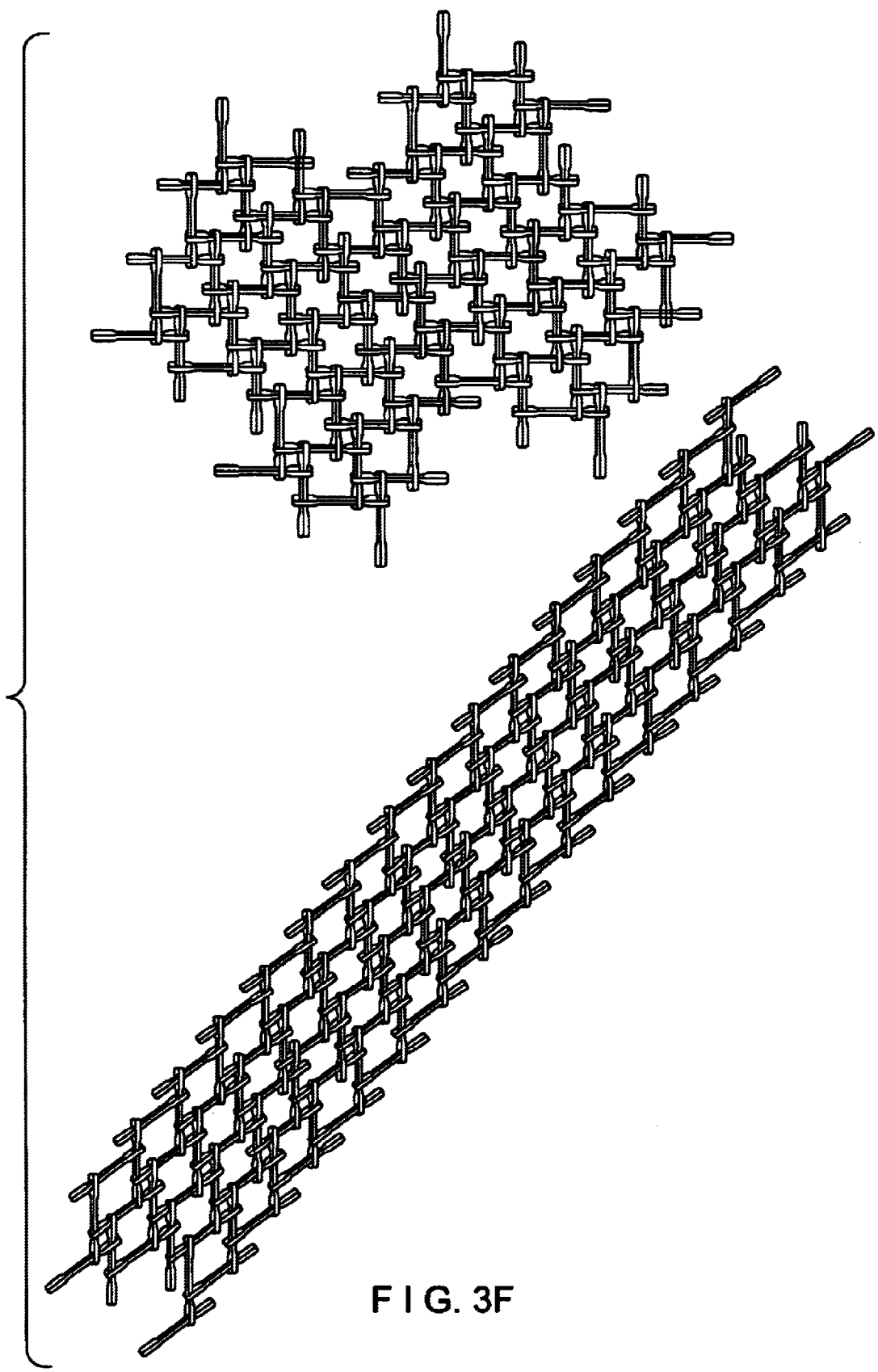
FIG. 3F shows the formation of a mat from basic elements according to FIG. 3C.
Figure 3G:
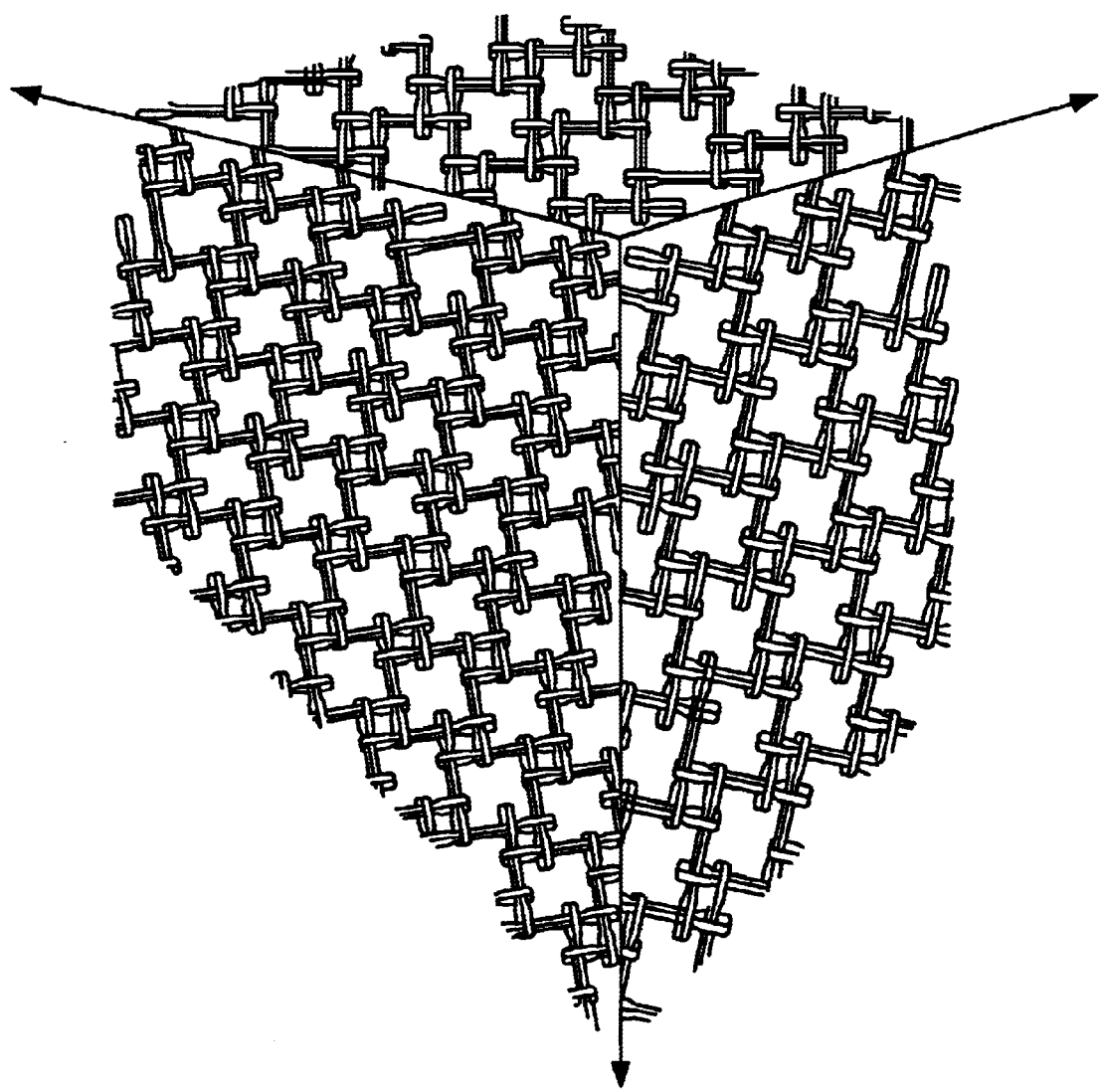
FIG. 3G shows the formation of a three-dimensional body from basic elements according to FIG. 3C.
Figure 3H:
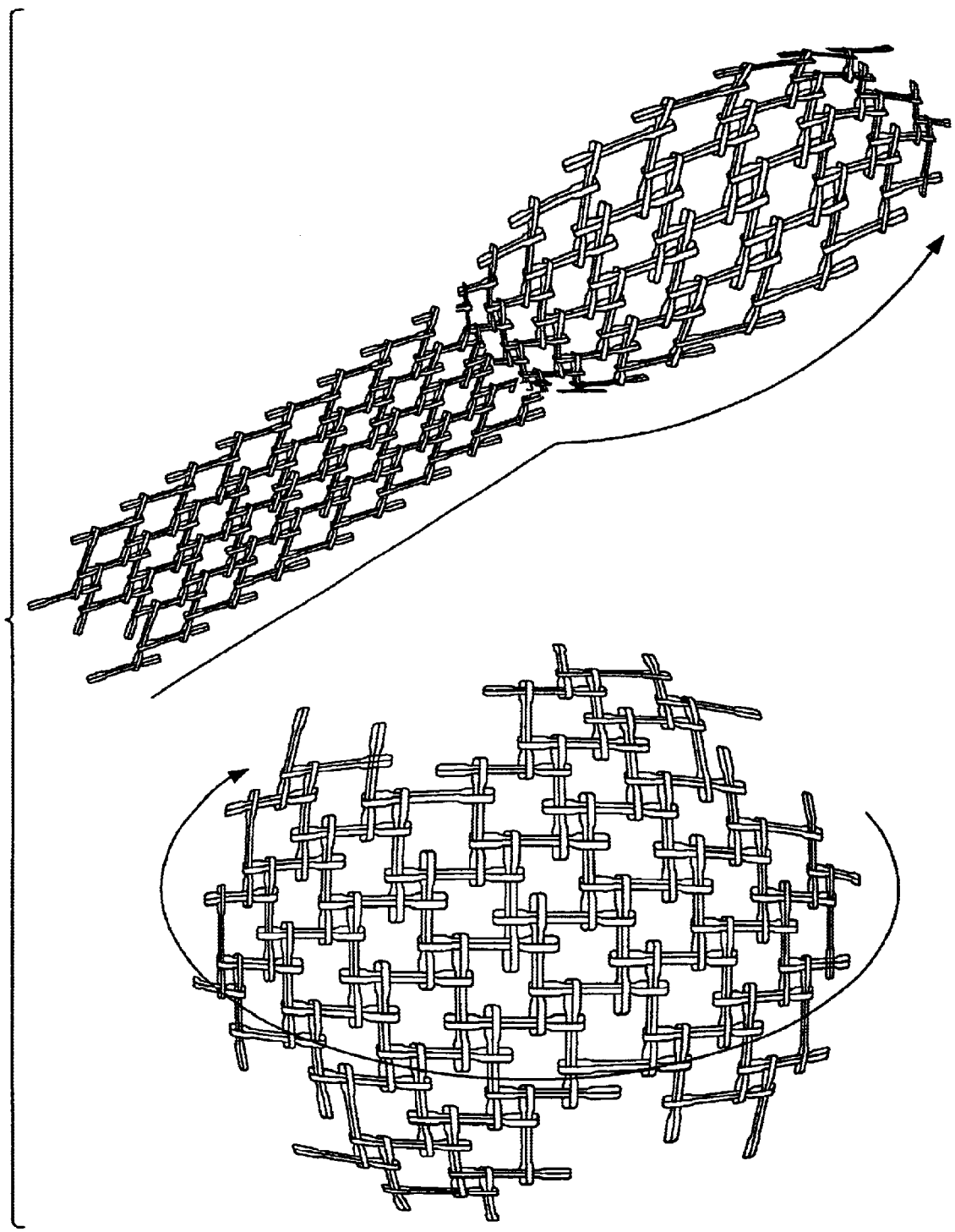
FIG. 3H shows the formation of a rounded body from basic elements according to FIG. 3C.
Figure 3K:
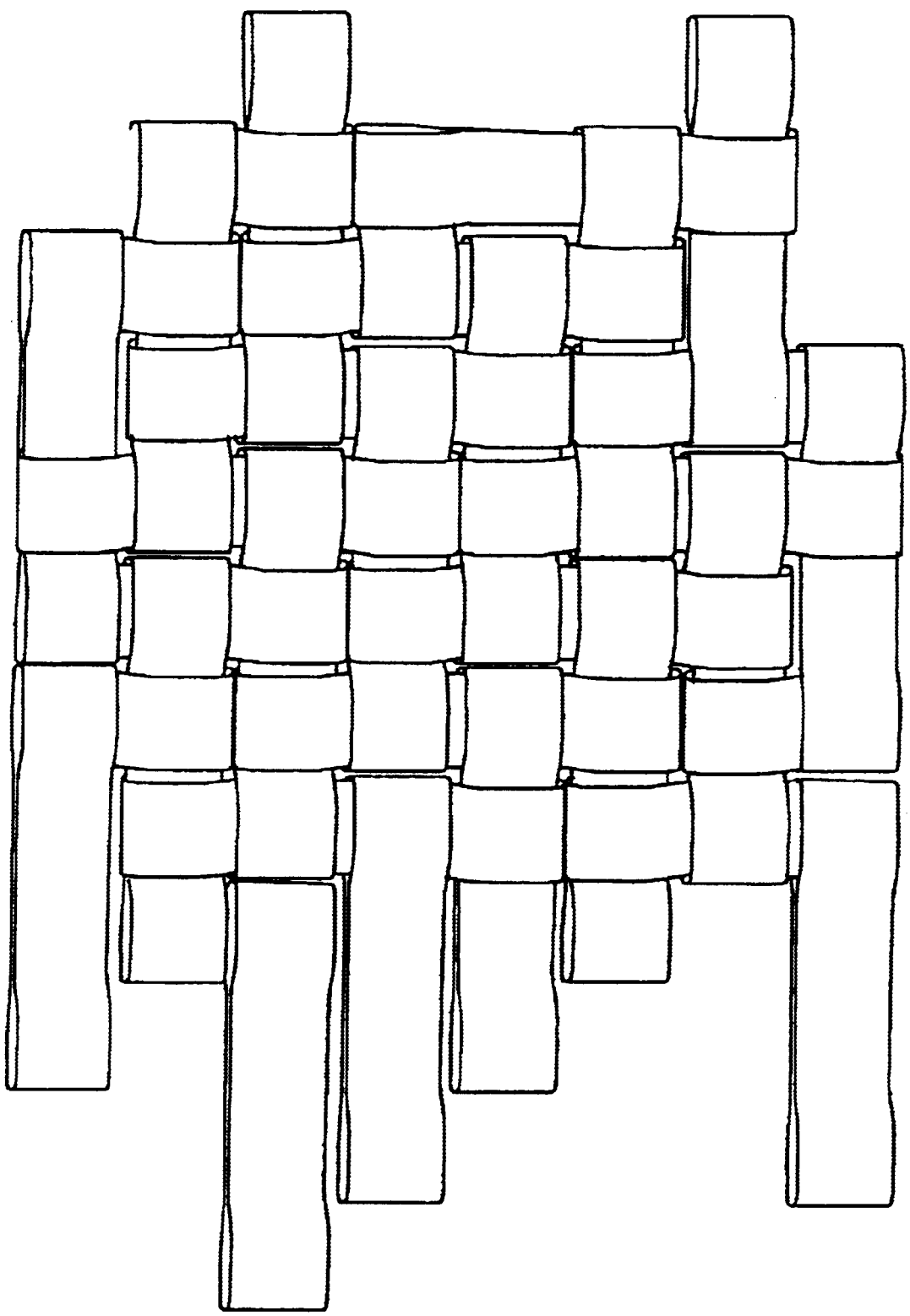
FIG. 3K shows a cutout of initially interwoven mat.
Figure 3L:
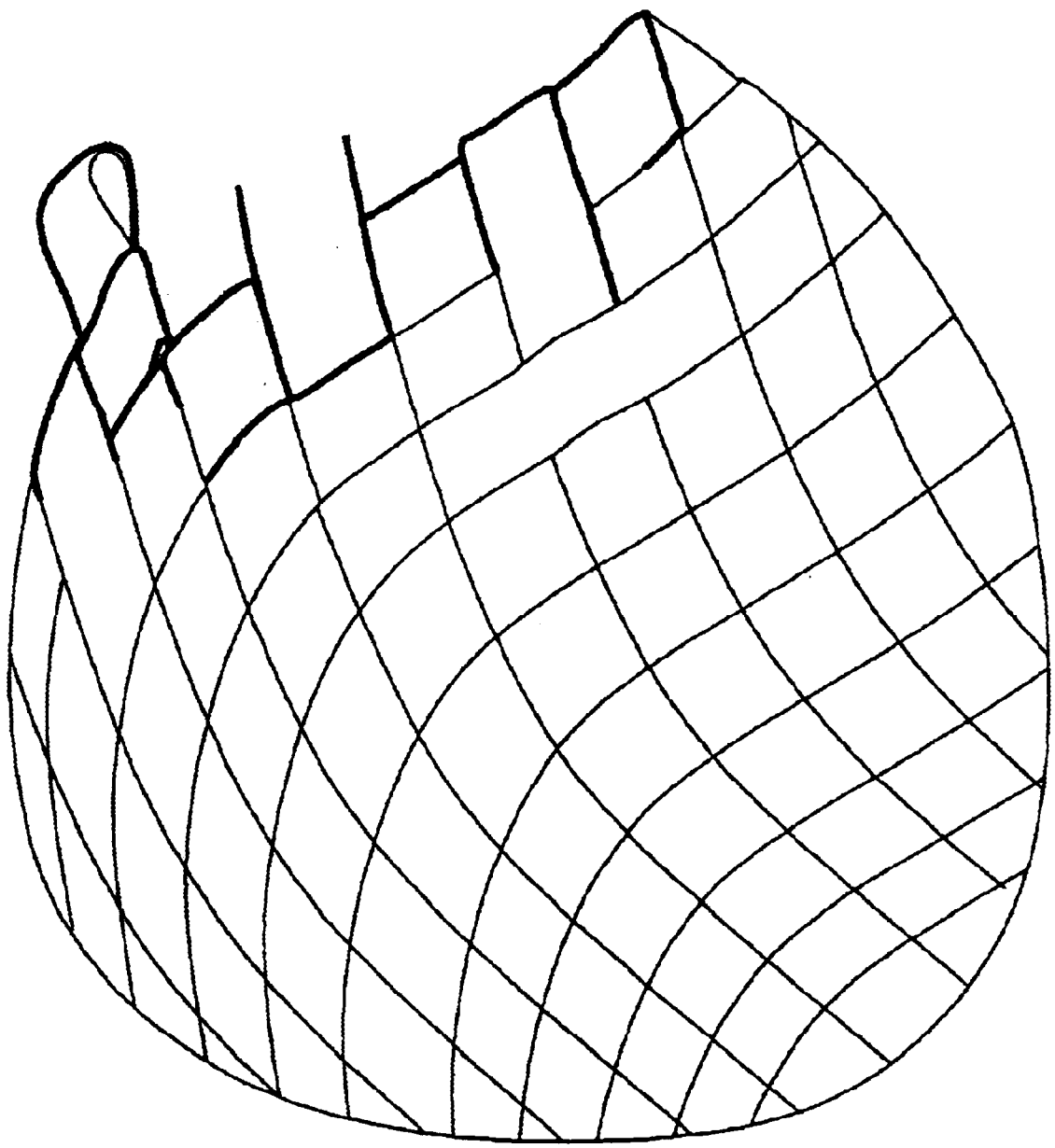
FIG. 3L shows a woven bag.

FIG. 3A shows the creation of a ring chain where the individual rings are knotted together. FIG. 3B shows the creation of an interwoven mesh. FIG. 3C represents the construction of a four-component basic element, FIG. 3D that of a three-component basic element. FIG. 3E shows the creation of a mesh structure out of basic elements of type 3C. FIG. 3F shows the construction of a mat, FIG. 3G the construction of a rectangular three-dimensional body, and FIG. 3H that of rounded bodies. FIG. 3K represents a cutout of an interwoven mat. FIG. 3L shows a woven bag which can serve as a container for hardcore for example. FIG. 3M represents a tubular hollow body closed at one end by a rounded bottom. FIG. 3N shows a cutout of a second interwoven mat and FIG. 3O a cutout of a third interwoven mat. FIGS. 3P–3U show further weaving variants providing construction elements for roping, mats and three-dimensional bodies for example.

Figure 4:
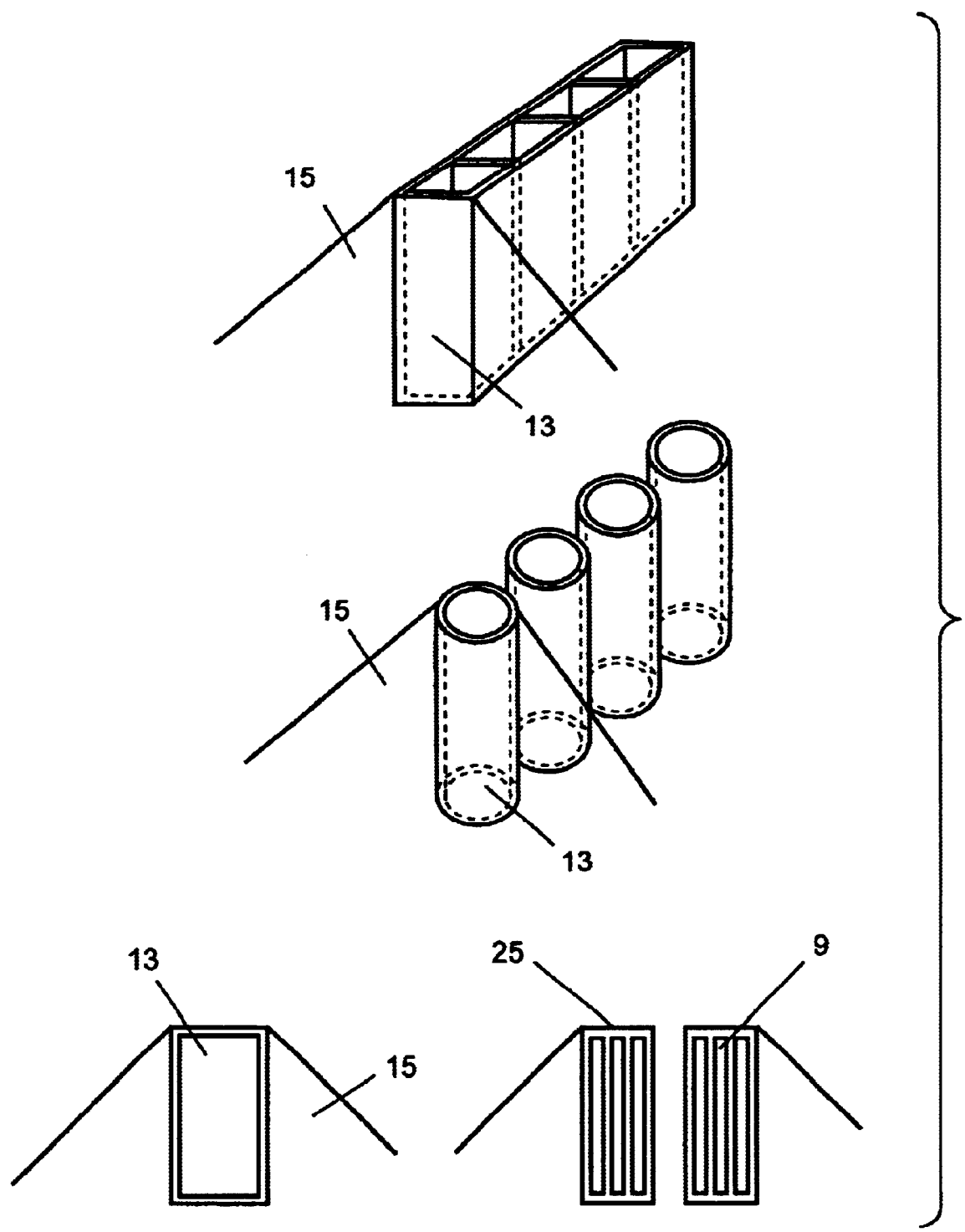

A variety of different applications for new products manufactured by interweaving a series of closed rings is described hereinafter. FIG. 4 shows the construction of dams exhibiting filled hollow bodies 13 or interwoven bodies 25 in their interior. Stabilization of the dam structure results from hollow bodies 13, interwoven bodies 25 or the incorporation of mats 9, with the effect that the dam can stand up to greater loads than if merely constructed of earth 15.

FIG. 5 shows the incorporation of mats as bank protective measures, where two overlapping mats 9 are arranged in the present embodiment. The mats 9 are let into the bank 10, redistributing the pressure generated by the water 11 over the mats 9 and protecting the bank 10 against alluvial deposition and undermining erosion. This protective measure can be applied both for canals and natural banks.

FIG. 6 shows the arrangement of mats 9 on the bed of a body of water 12 preventing the scouring away of sand for example and the generation of underwater potholes/channels in the bedding. FIG. 7 represents hollow bodies filled with bulk material such as sand which can be installed as artificial dams of any desired length, height and width in the water 11. A further construction form of hollow bodies 13 is shown in FIG. 8 where the hollow bodies 13 are filled with water 11. To avoid the water escaping through the interstices of the woven structure the hollow bodies are lined with a waterproof sheeting 14.

Figure 9:
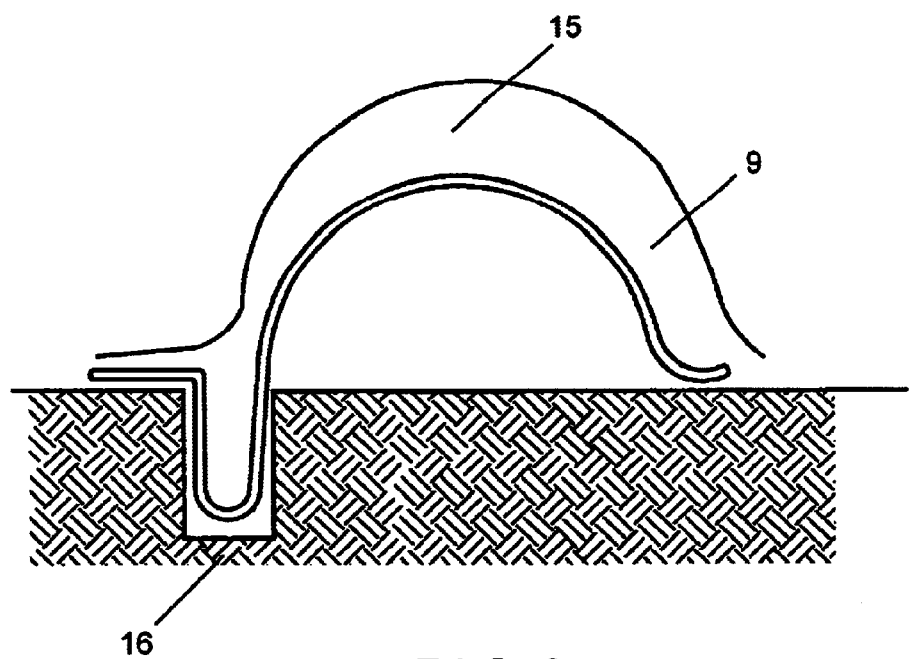
FIG. 9 shows the lining of a dam with interwoven mats.
Figure 10:
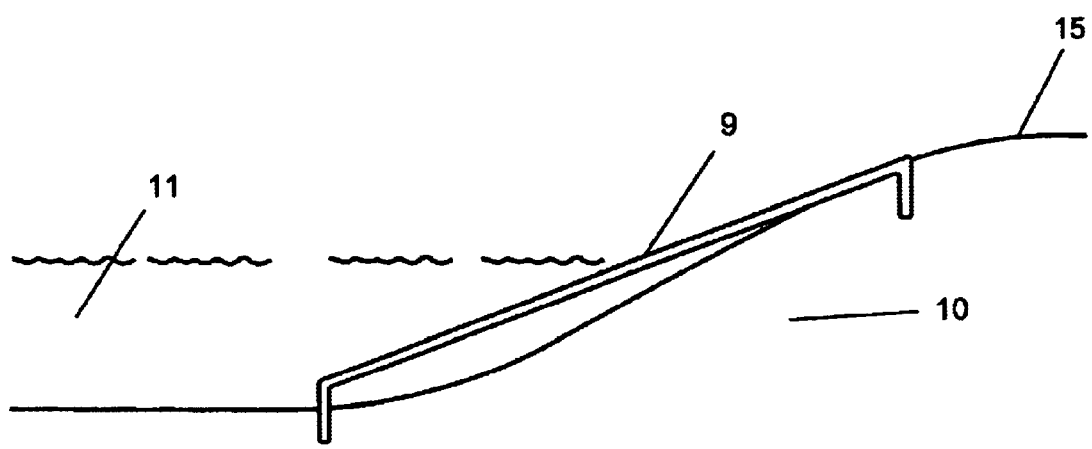
FIG. 10 shows the reinforcement of a bank with interwoven mats.
Figure 11:
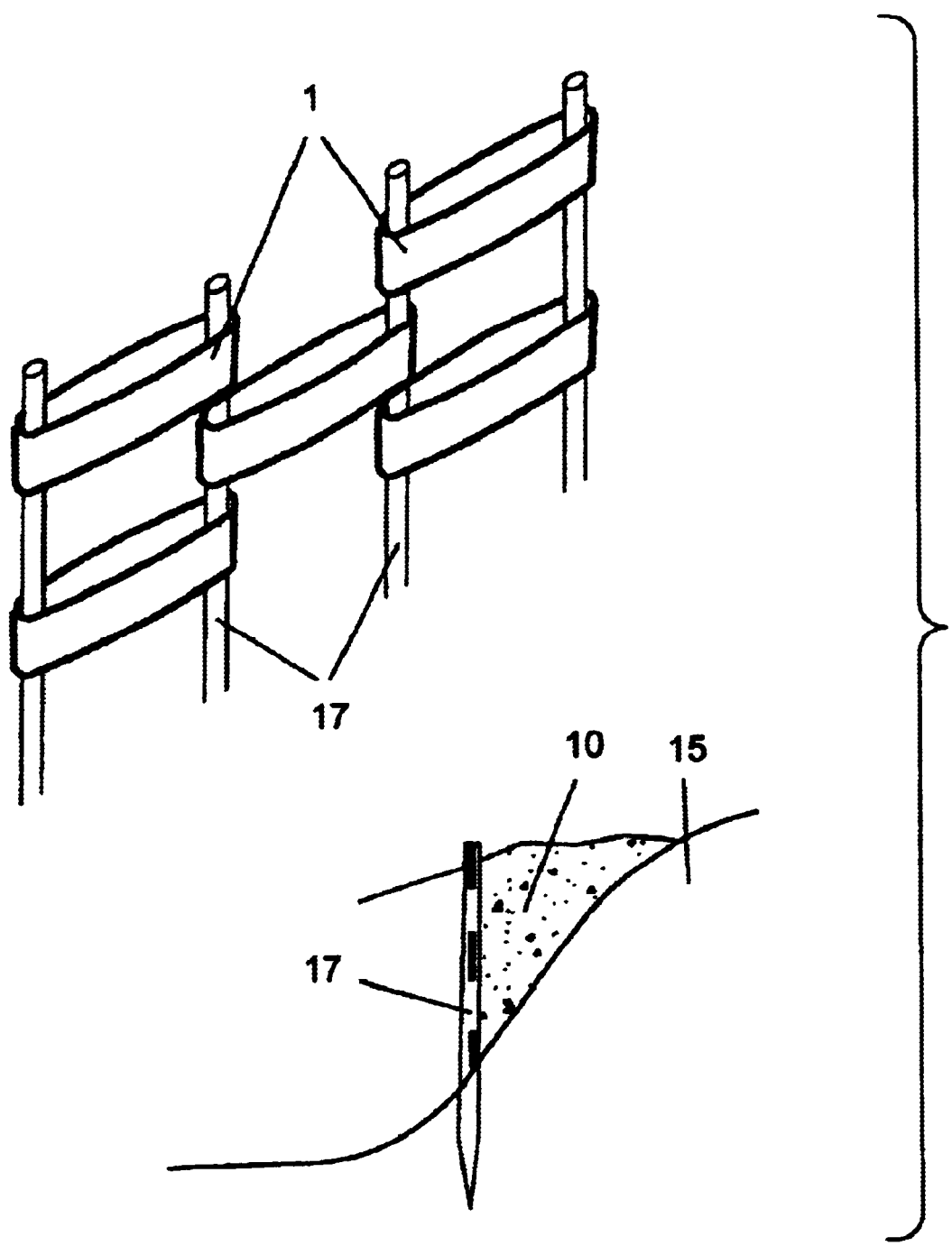
FIG. 11 shows the construction of fascines for bank protection.
Figure 12:
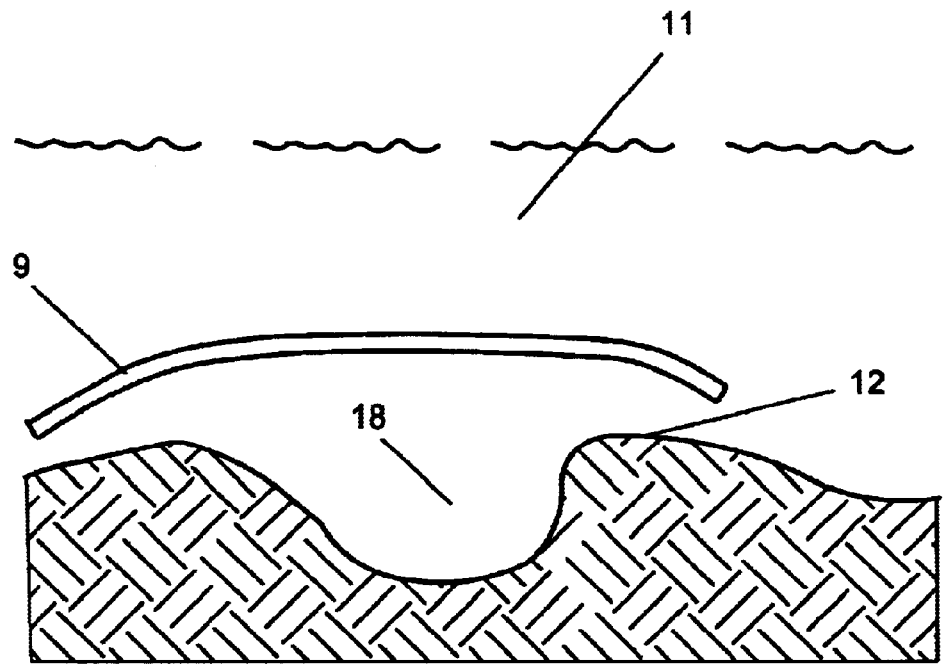
FIG. 12 shows the offsetting of depressions on the bed of a body of water by covering with a mat.
Figure 13:
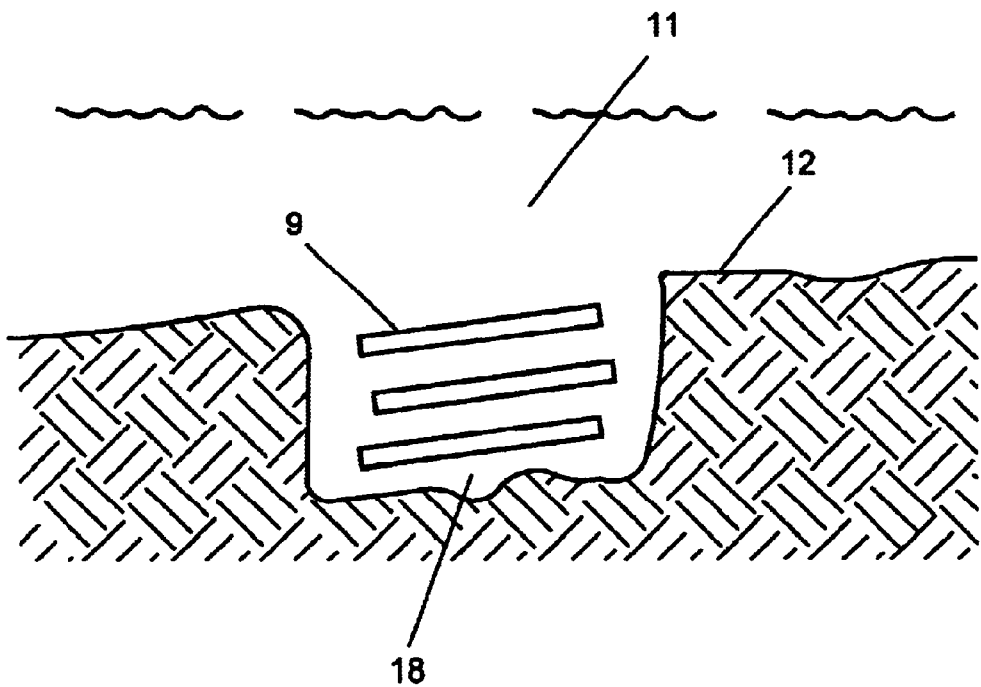
FIG. 13 shows the offsetting of depressions on the bed of a body of water by filling out with mats.
Figure 14:
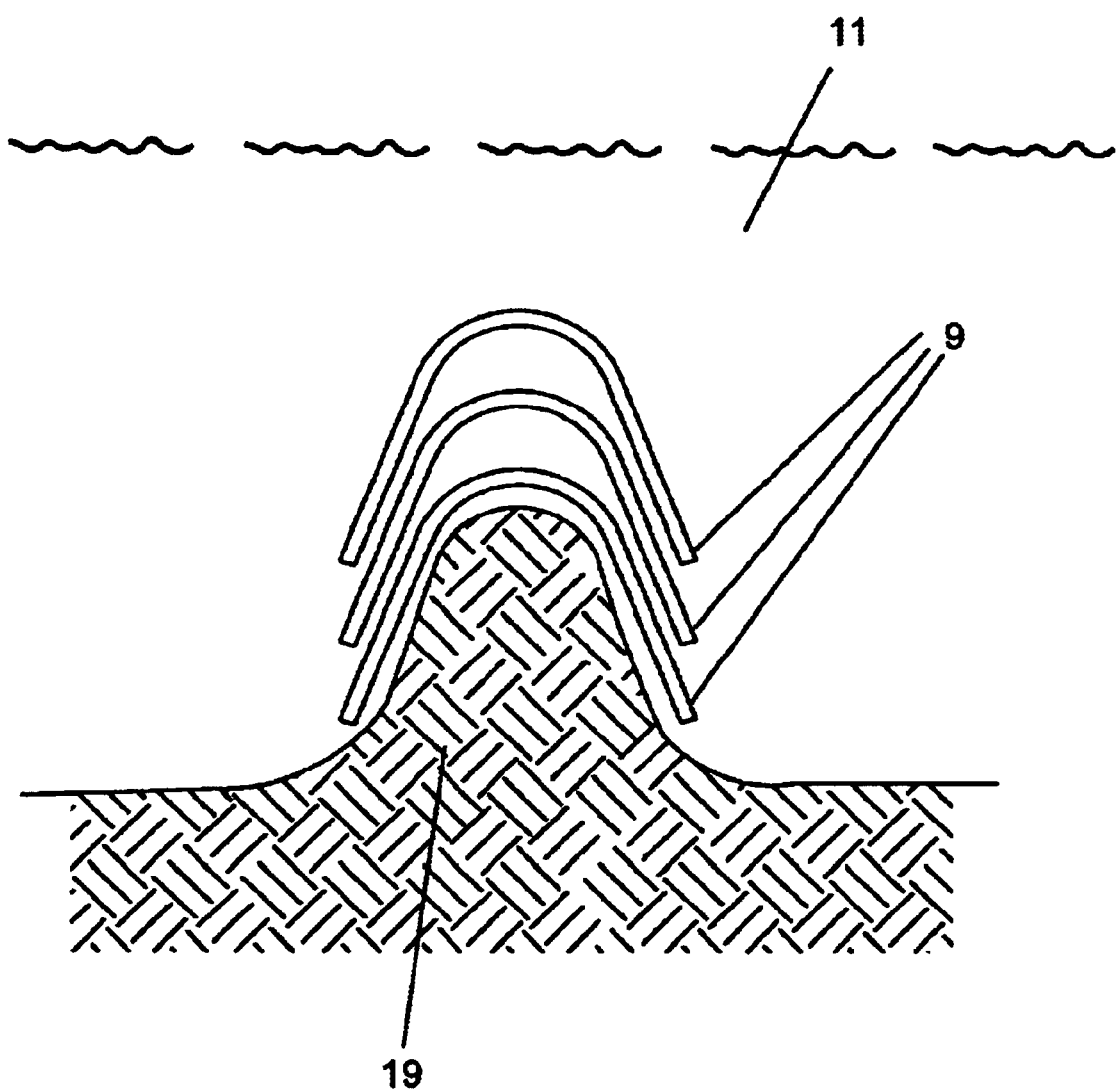
FIG. 14 shows the covering of underwater reefs with mats.

FIG. 9 shows the lining of a dam with woven mats 9 where the dam lining is covered with earth 15 and the dam exhibits a counter-shaft 16 which is also lined by the mats 9. FIG. 10 represents a simplified form of bank reinforcement consisting of woven mats 9 where the mats 9 are partially let into the earth both in the water and on the bank. FIG. 11 shows the construction of fascines for bank protection where the rings 1 act in conjunction with stakes 17. FIGS. 12 and 13 show the offsetting of depressions on the bed of a body of water by covering with a mat. With regard to the embodiment exemplified in FIG. 12, the depression 18 is covered over with a mat 9, whereas in the embodiment exemplified in FIG. 13 the depression is filled out with mats 9. FIG. 14 represents the covering over of underwater reefs 19 with mats 9. This measure serves to protect watercraft against collision.

Figure 15:
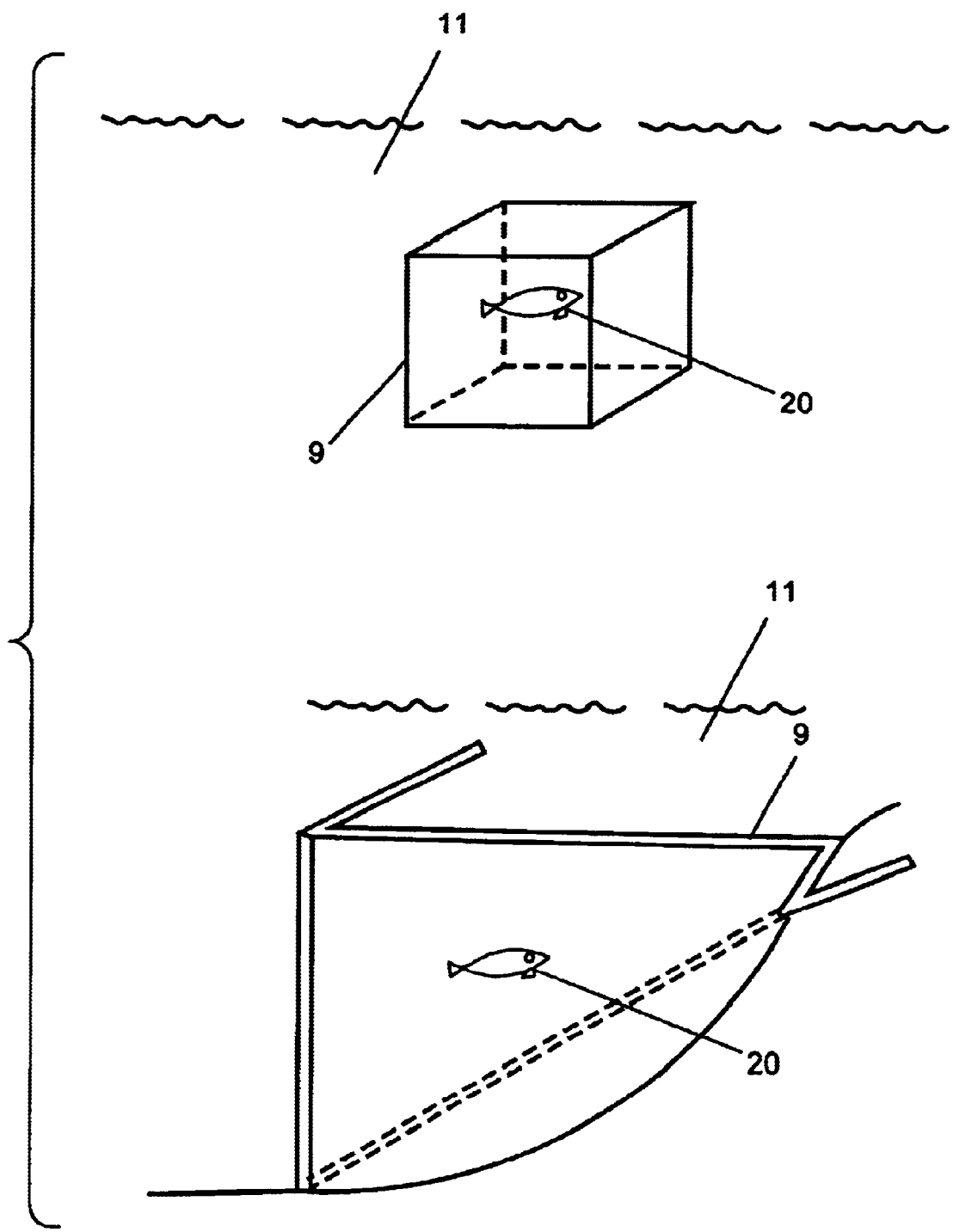
FIG. 15 shows the demarcation of fishery areas constructed with mats.
Figure 16:
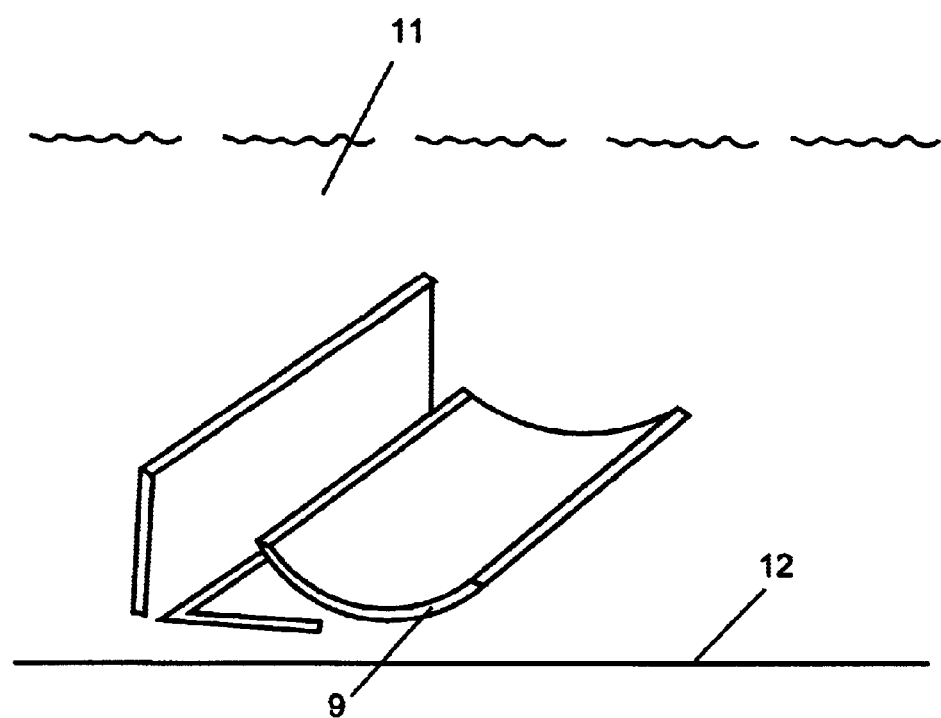
FIG. 16 shows the arrangement of mats for the protection of coral banks.

FIG. 15 shows practical implementation of the demarcation of fishery areas where mats 9 provide the said demarcation of the bodies of water. Fish can be effectively reared within the confines of the body of water separated by the mats 9. FIG. 16 shows the arrangement of mats 9 for the protection of coral banks.

Figure 17:
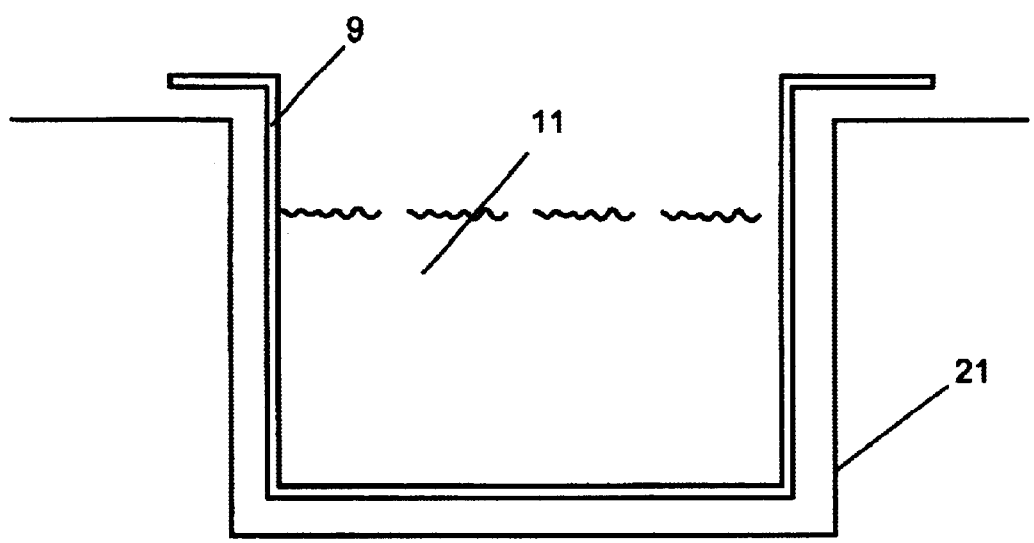
FIG. 17 shows the arrangement of mats for protection in lock flooding basins.

FIG. 17 represents an exemplary application where the internal space of lock flooding basins is lined with mats 9. The mat 9 may serve for the recovery and security of vessels such as sports boats for example. FIG. 18 represents the application of mats as protection against the breakthrough of ice sheets. The mats 9 are attached to buoys 22 anchored below the surface of the water. If the water freezes over with an ice sheet 23, the protective system of mats 9 and buoys 22 is situated below the surface of the ice. If a person should break through the ice 23, the said person will be protected against submersion and/or drowning by the mats 9.

The arrangement of mats according to FIG. 19 serves the purpose of removing refuse from ponds, for example fire deartment reservoir-pools by means of raising the mats 9. FIG. 20 represents the application of mats 9 in rivers 24 in which the mats are incorporated as linings on the bed of the river. The said lining prevents any erosion of the bedding and deposition of sediment.

Figure 30:
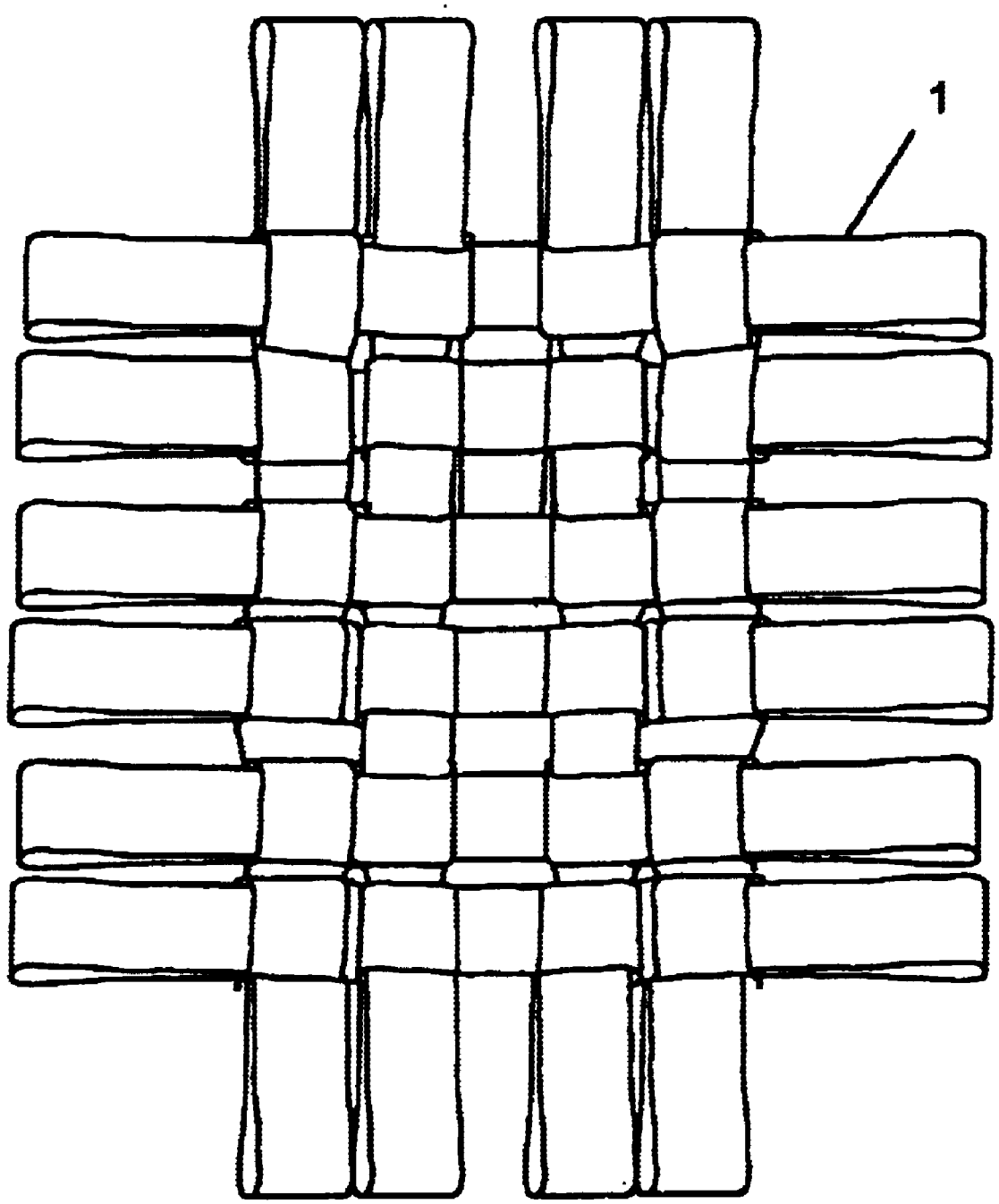
FIG. 30 shows the deployment of mats or interwoven bodies as protection against falls over the edge.
Figure 3R:
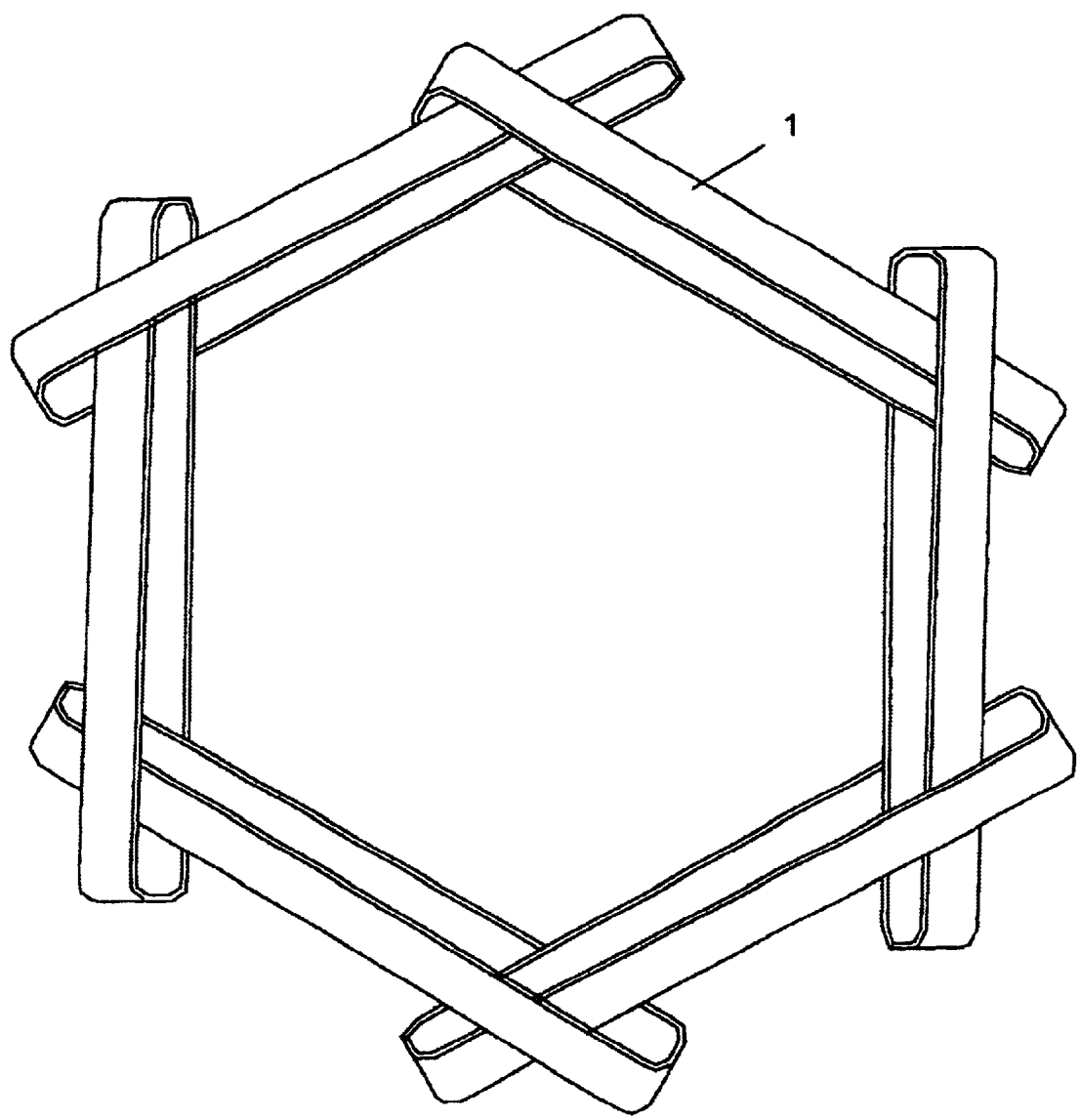
Figure 3S:
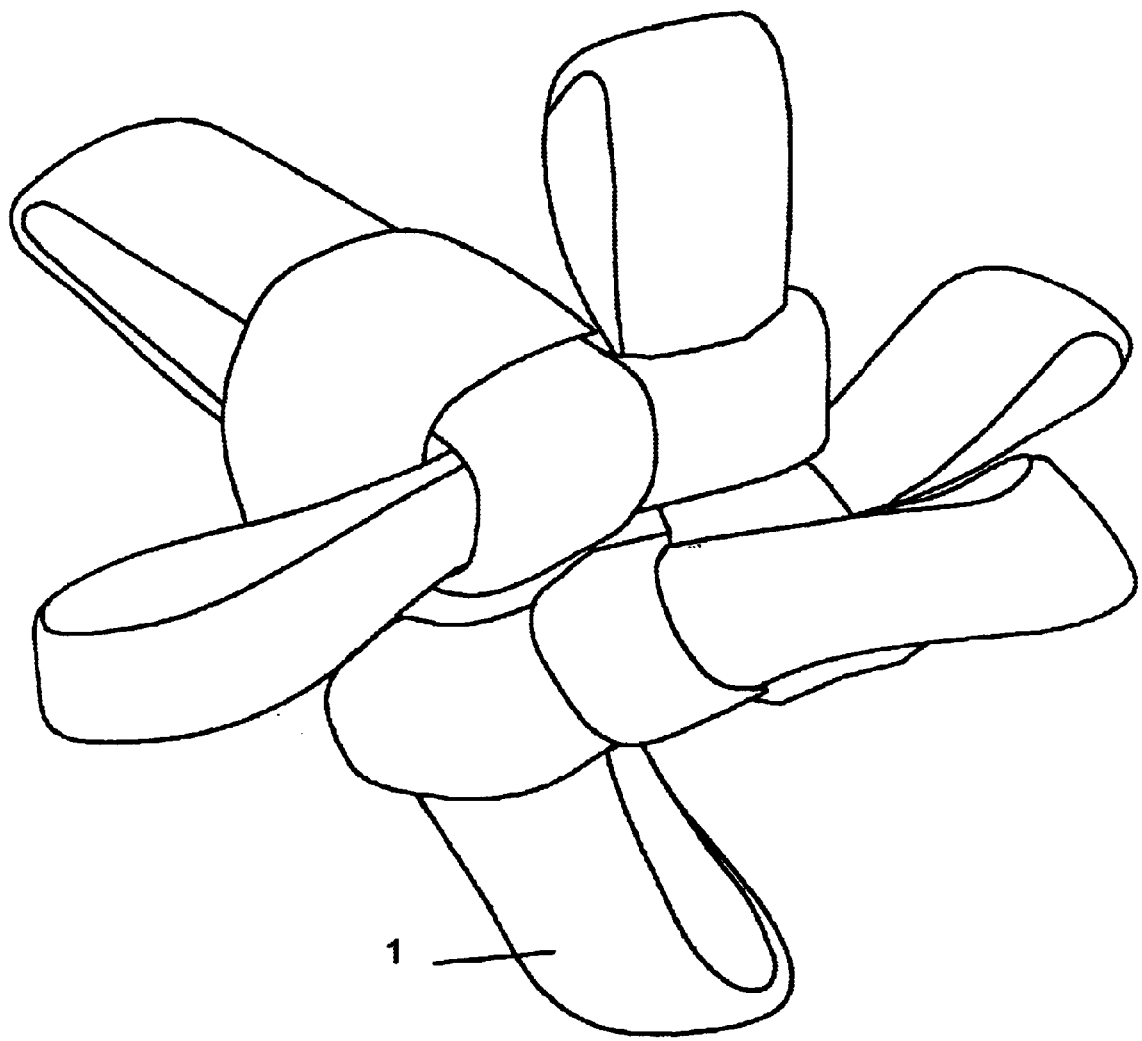
Figure 3T:
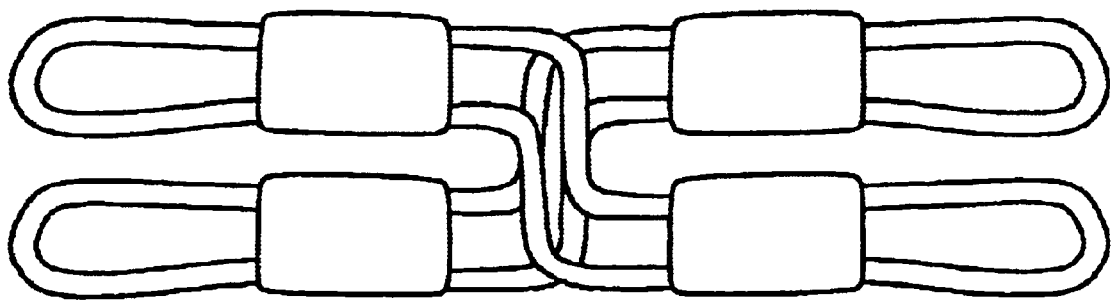
Figure 3U:
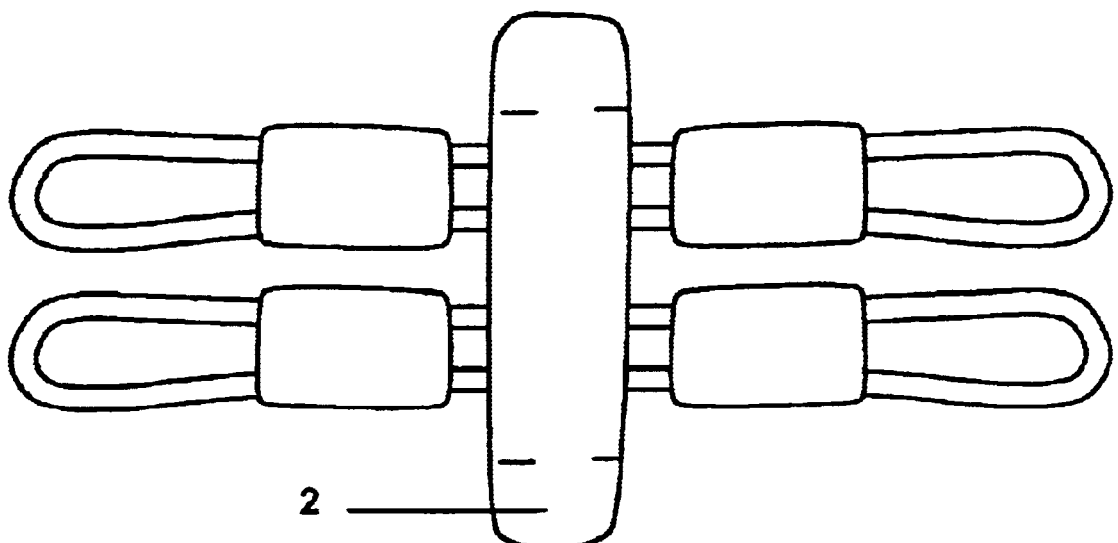
Figure 27:
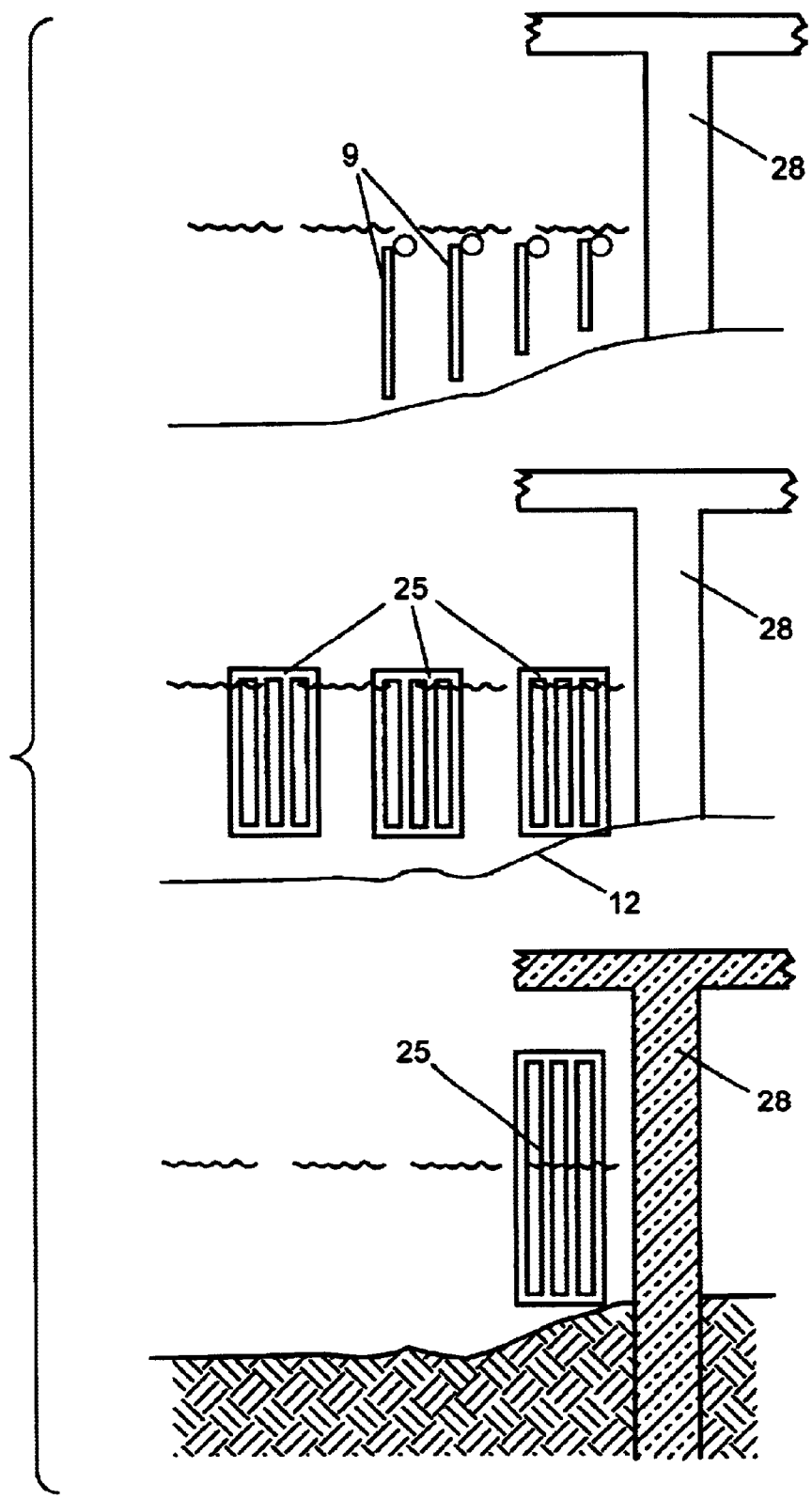
FIG. 27 shows the arrangement of interwoven bodies or mats for the protection of bridge piers and similar structures.
Figure 28:
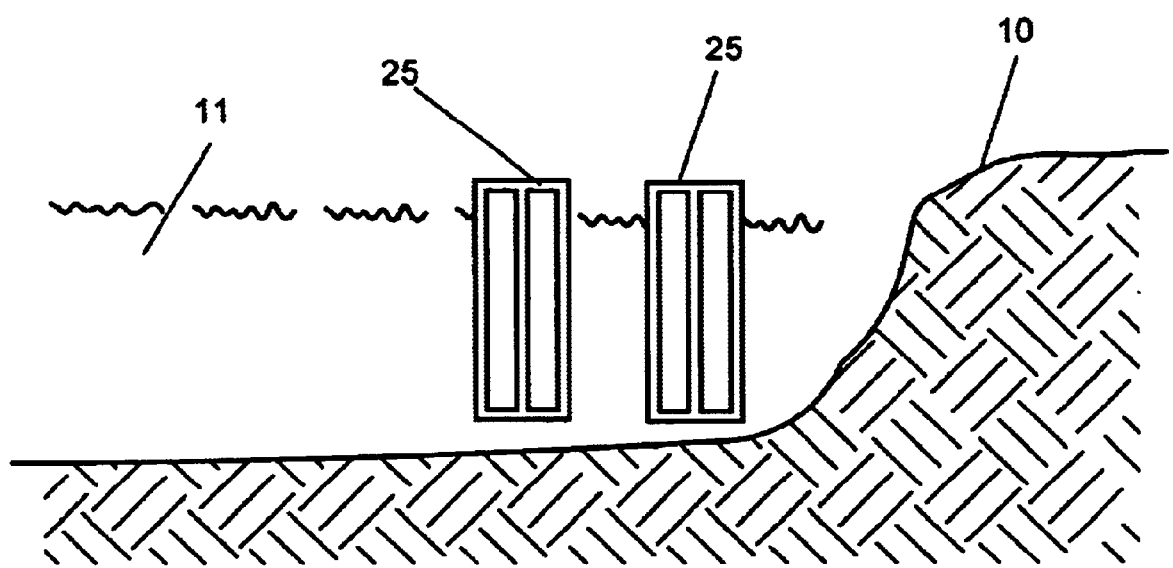
FIG. 28 shows the arrangement of interwoven bodies as protection against shifting ice.
Figure 30:
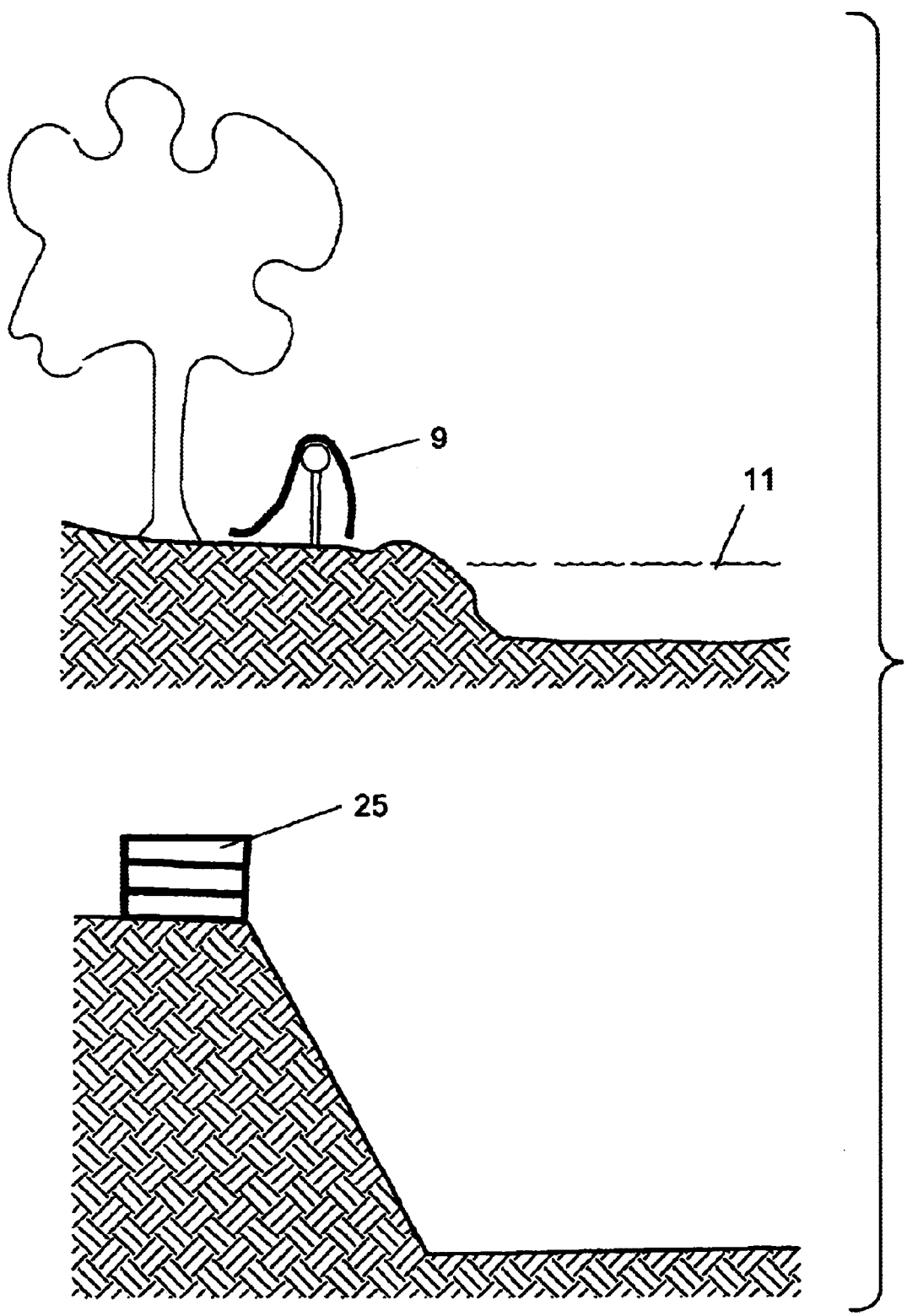
Figure 31:
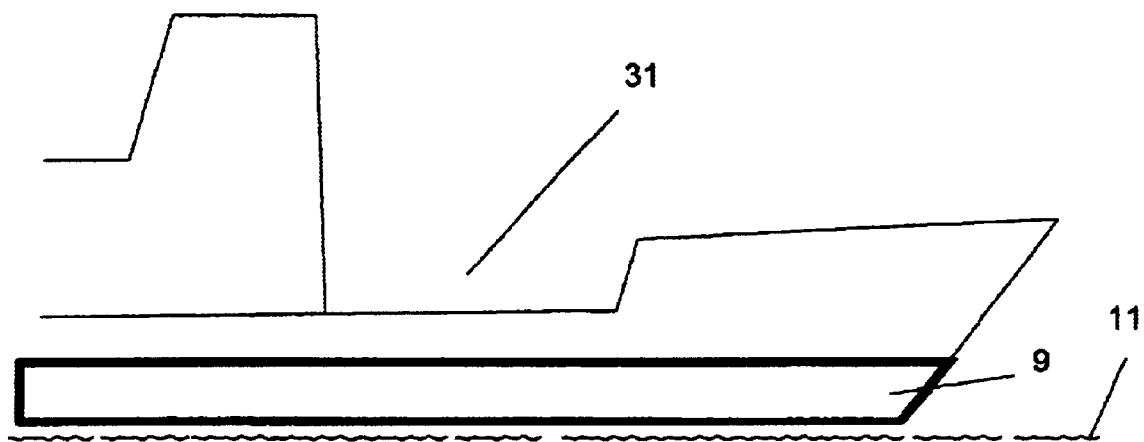
FIG. 31 shows the deployment of mats or interwoven bodies as protection of the outside hull of ships.
Figure 32:
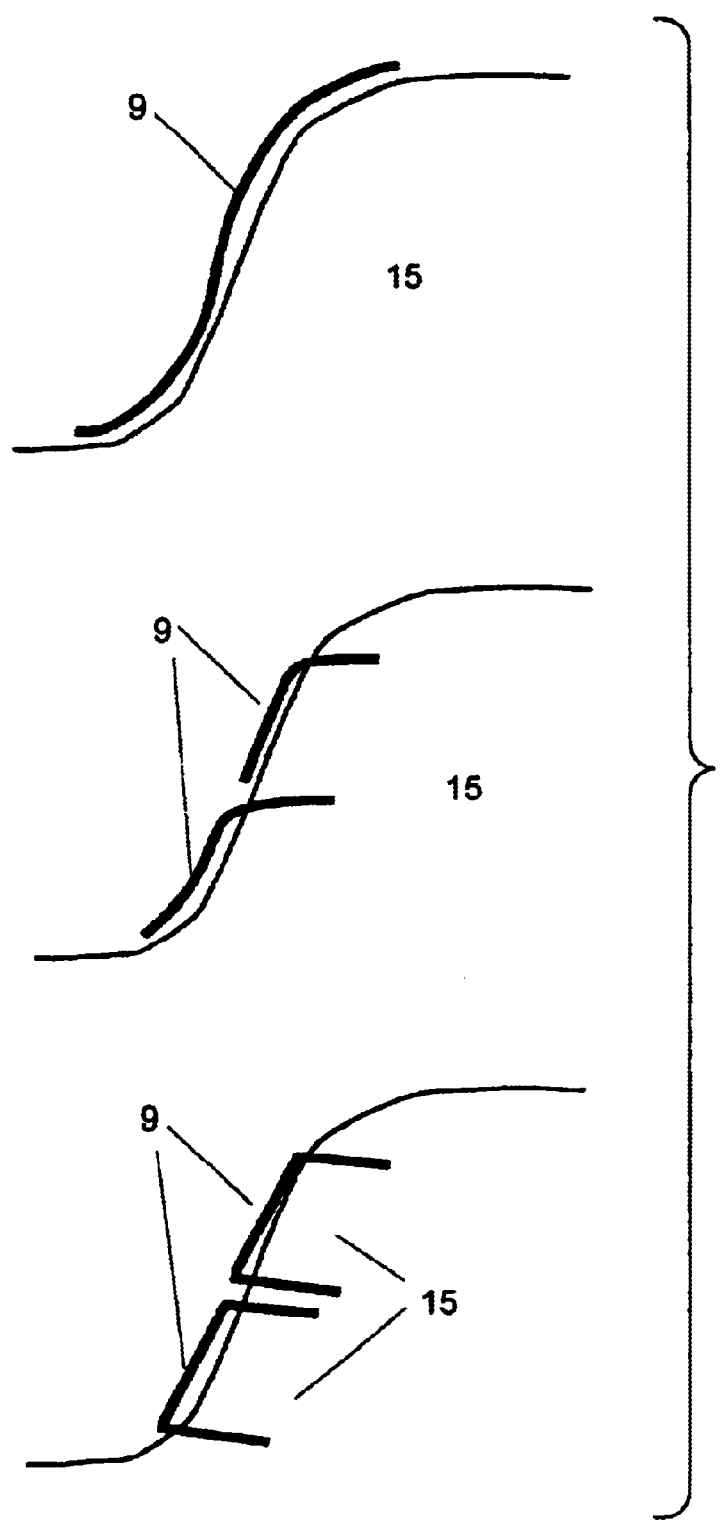
FIG. 32 shows the deployment of mats for earth stabilization.
Figure 35:
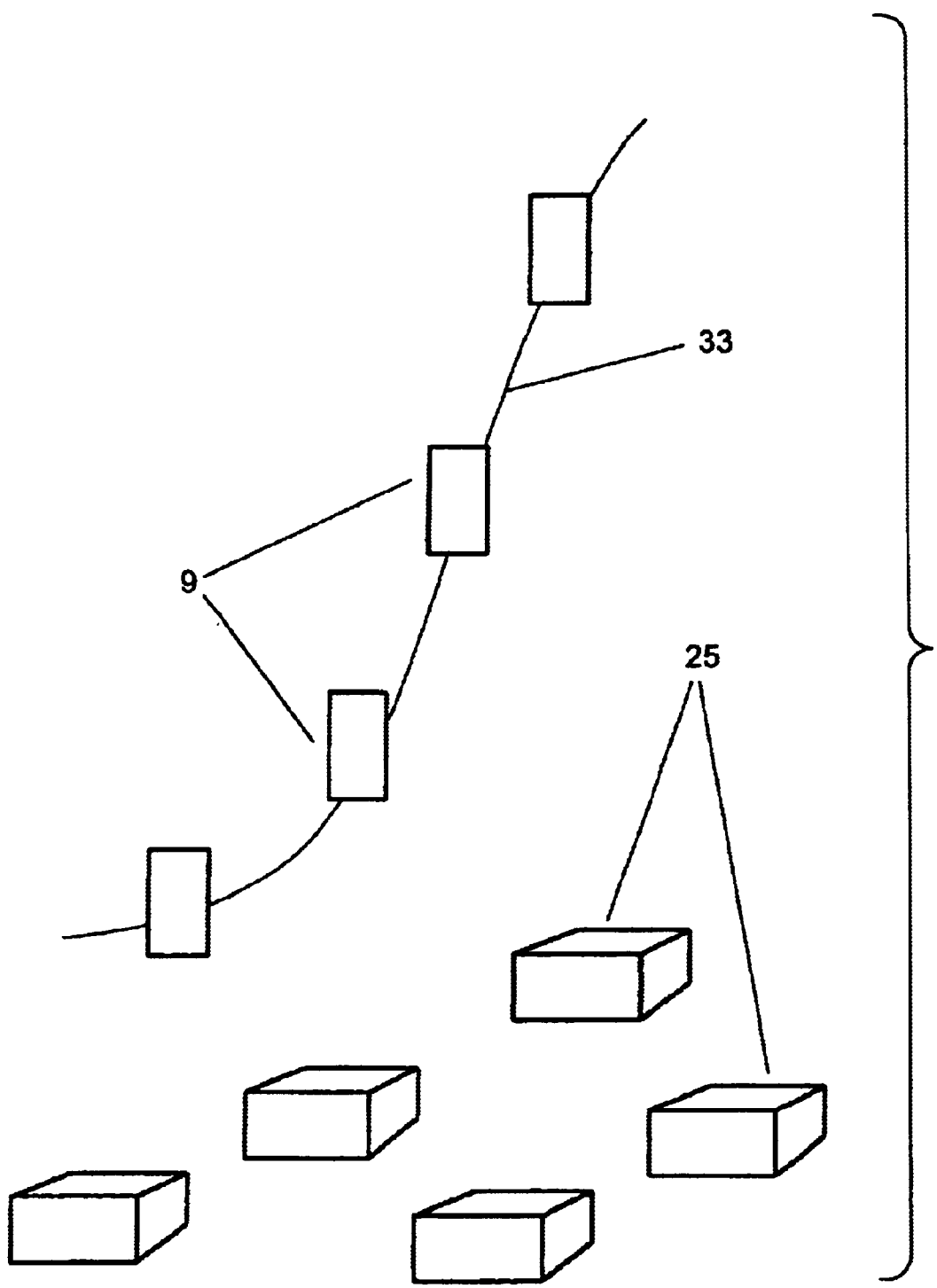
FIG. 35 shows the deployment of mats or bodies as avalanche protection.
Figure 37:
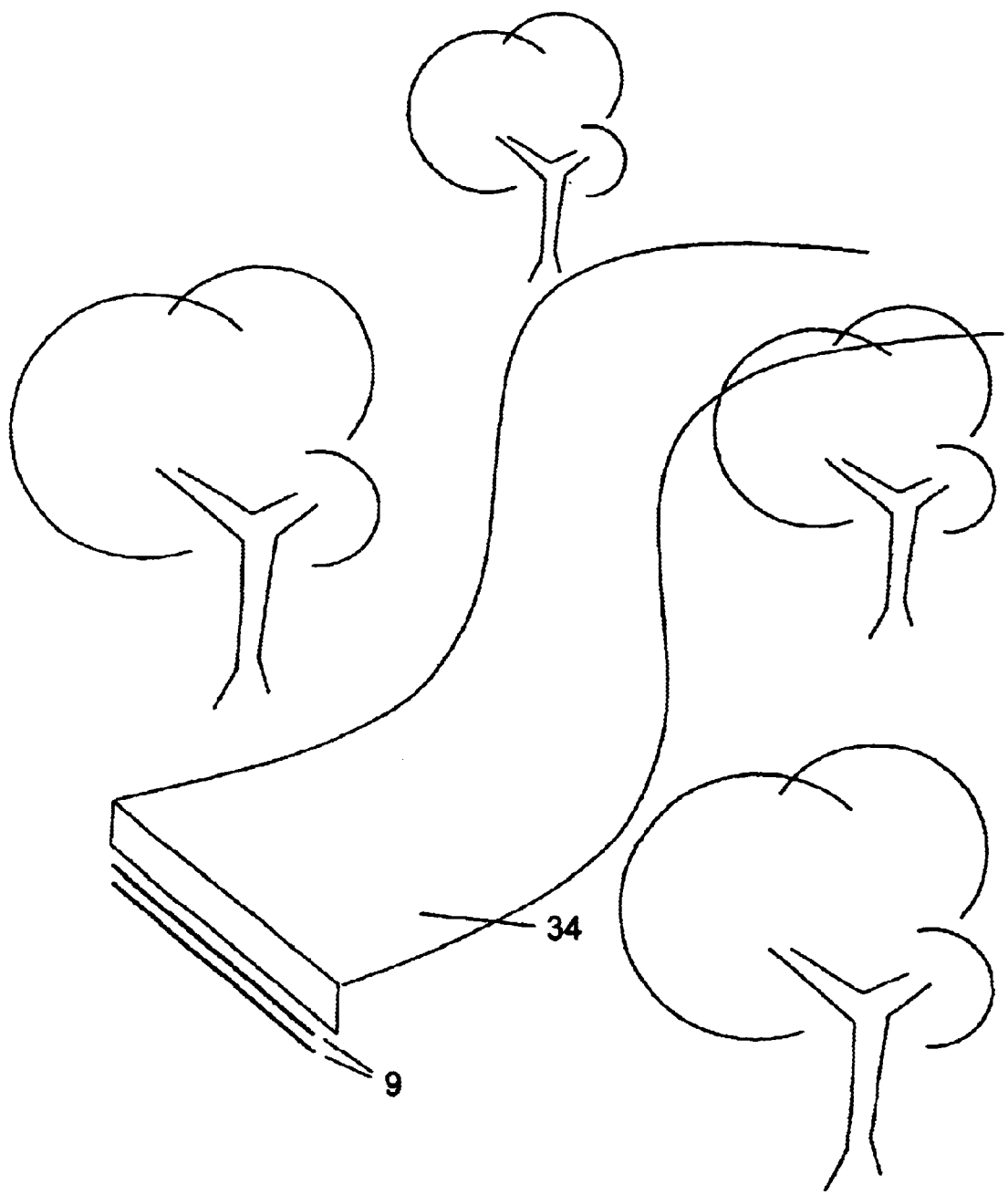
FIG. 37 shows the deployment of mats for the construction of reservoir dams or bodies as road substrata.
Figure 38:
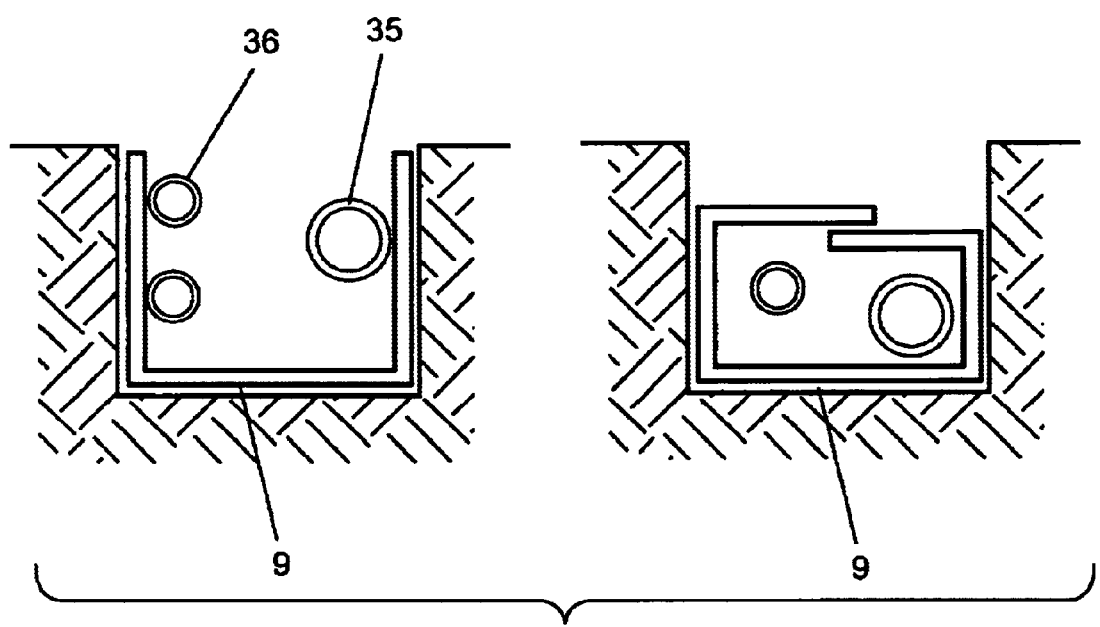
FIG. 38 shows the deployment of mats for lining pipe or cable shafts.
Figure 39:
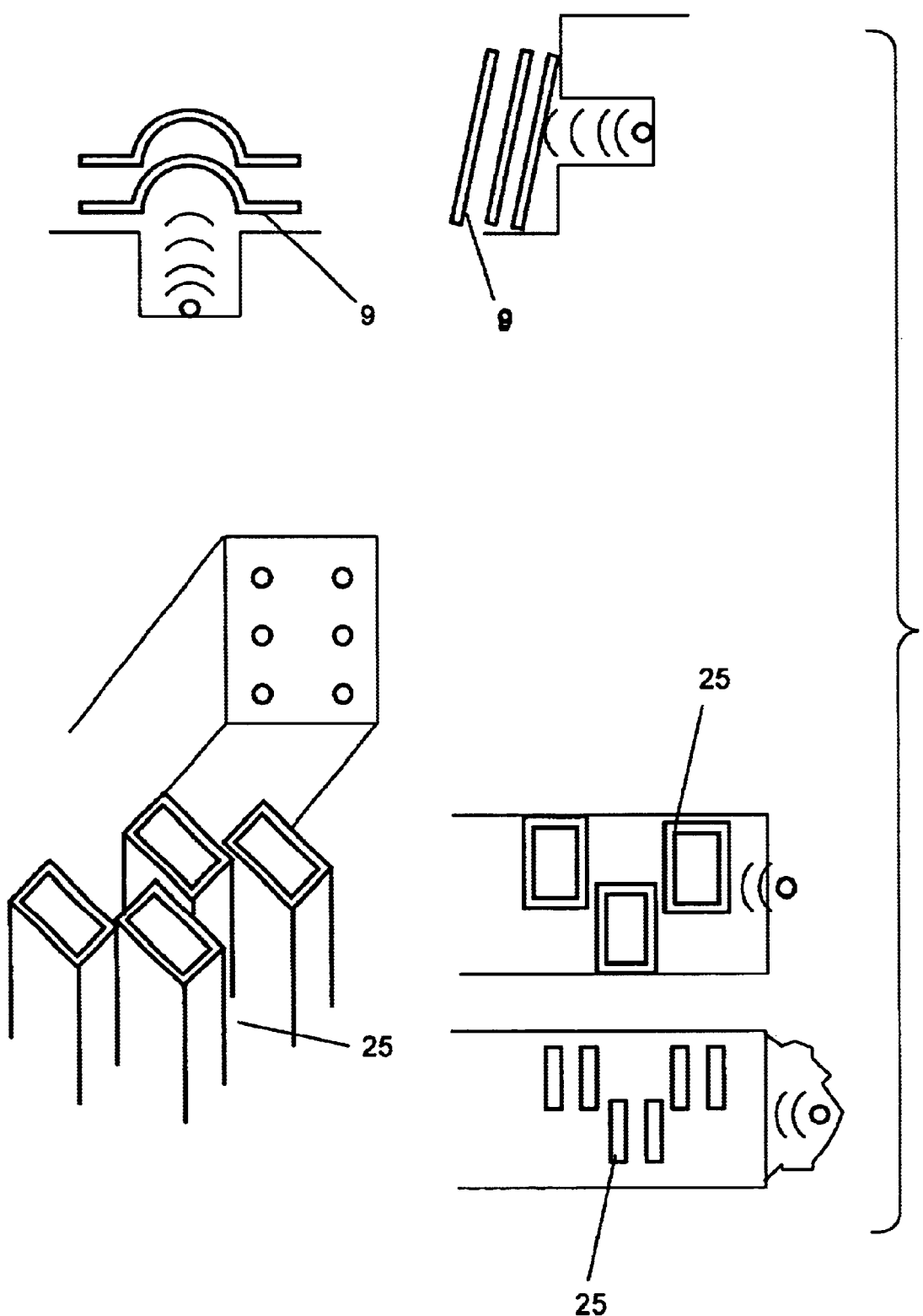
FIG. 39 shows the deployment of mats or bodies as protective elements during explosions.

FIGS. 21–23 show the arrangement of mats 9 or interwoven bodies 25 respectively as wave absorbers or breakwaters. The mats 9 or interwoven bodies 25 respectively are arranged entirely or partly underwater. FIG. 24 represents an exemplary embodiment in which the interwoven bodies are arranged for the protection of quay facilities. The interwoven bodies can act in conjunction with buoys 22, be anchored on the bed 12 of the body of water or be permanently fixed in the bed 12. FIG. 25 is a general representation of the protection of structures/buildings by interwoven bodies 25. Mats 9 may also be used instead of the interwoven bodies 25. Selected structures in the present embodiment are buildings which are to be protected from contact with an excavator, or water engineering facilities such as harbors or bridges. The special protection of bridge piers 28 is represented in FIG. 26 where the bridge pier 28 is encased by mats 9 in this case. A further exemplary embodiment for the protection of bridge piers 28, arches and dams against damage is represented in FIG. 27. The application is achieved either by mats 9 in conjunction with buoys, or by interwoven bodies 25. The interwoven bodies 25 or mats 9 respectively are arranged in front of the bridge piers 28. FIG. 28 shows the arrangement of interwoven bodies 25 in water for protection against ice shifting during breakup on rivers, lakes and the sea. The masses of ice are intercepted by interwoven bodies so that damage can be avoided. The use of mats 9 or interwoven bodies 25 as filters is represented in FIG. 29. For example, the mats 9 can be drawn through the water 11 by a boat 31 in order to pick up waste matter in the net structure of the mats 9. It is equally possible to introduce mats 9 into sewage treatment tanks 29 to pick up waste matter. A further possible application of the mats 9 consists in arranging the said mats in front of the entry into the collecting basins so that waste matter is filtered out. An arrangement of mats 9 or interwoven bodies 25 as active protection of persons or animals is represented in FIG. 30. The mats 9 or interwoven bodies 25 prevent possible falls over the edge. The arrangement of mats 9 on the outside hull of a ship protects the outer hull from mechanical damage. The use of mats 9 for earth stabilization is represented in FIG. 32. A special field of application is the securing of slopes, where either a single mat 9 or several mats 9 arranged over one another can be deployed. FIG. 33 represents the use of mats 9 for plant protection. The earth surface is laid out with mats 9 and the plants/shoots located in the interstices of the woven structure. FIG. 34 shows the use of mats 9 for constructing dams and overflow basins for water arising from swollen rivers. The mat 9 is laid out in a trench and stabilizes the dike of the overflow basin. As an alternative to the construction of overflow basins the dams stabilized by means of the mats 9 can also be used to construct saline recovery basins. FIG. 35 shows the application of mats 9 or interwoven bodies 25 as avalanche protection. The mats 9 and/or interwoven bodies 25 are arranged on the slope 33 and serve to intercept avalanches. FIG. 36 shows the use of mats 9 or interwoven bodies in the foundations of buildings. It is possible to stabilize both strip foundations and full surface foundations by the use of mats 9 or interwoven bodies 25. FIG. 37 represents the arrangement of mats 9 as road construction substrate. The mats 9 are arranged under the road 34. Instead of roads 34, pathways and open spaces, particularly playing fields, can also be stabilized by use of mats under the ground. FIG. 38 shows the application of mats 9 for lining pipe or cable shafts. The pipes 35 or cables 36 respectively are bedded into the mats 9 and covered by overlaps if required. The application of mats 9 or interwoven bodies 25 as protective elements during explosions is represented in FIG. 39. Thus, the mats 9 can be deployed as bomb protection mats or arranged for use during the detonation of ammunition findings. It is also possible to deploy staggered arrangements of interwoven bodies 25 as protective elements during blasting operations. In order to limit the evacuation radius during defusing/removal of unexploded bombs or minimize the effect of shrapnel on detonation, the said bombs or other explosive ammunition findings can be covered by mats 9 or interwoven bodies 25.

Figure 41:
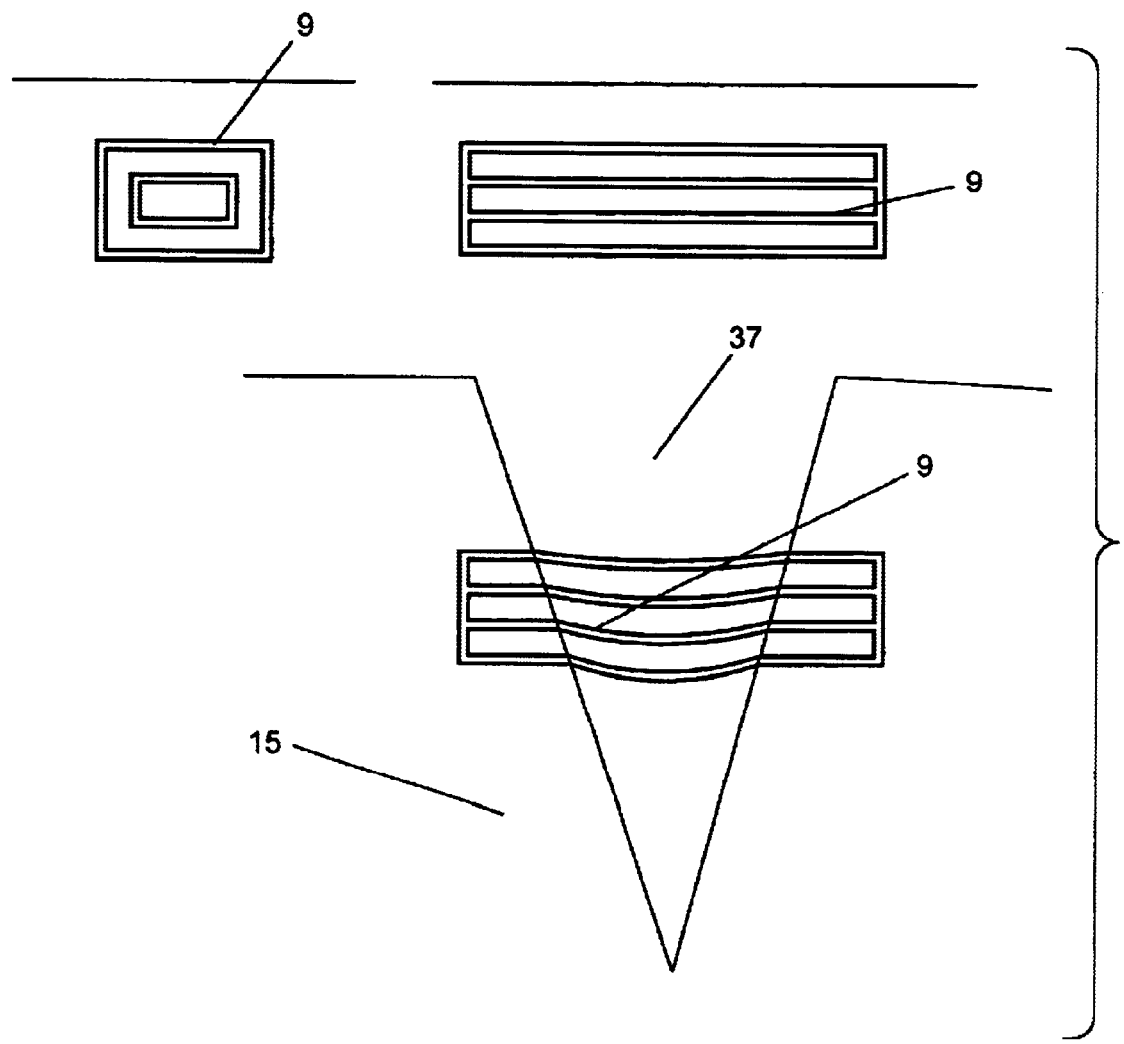
FIG. 41 shows the deployment of mats or bodies for the construction of shelters in earthquake zones.

Prevention of falling rocks is served by the arrangement of mats 9 as represented in FIG. 40. The use of mats 9 or interwoven bodies 25 for the construction of shelters, in earthquake zones for example, is represented in FIG. 41. Dugout shelters or bunkers as shown in FIG. 42 can be constructed using mats 9 or interwoven bodies 25. The external surfaces of bunkers 38 can be dammed by mats 9. Dugout shelters in mountainous regions can be constructed as before using mats 9 and/or interwoven bodies 25, which also offer protection against lightning. The aforementioned results from the Faraday cage effect of metallic components of the weave.

Figure 46:
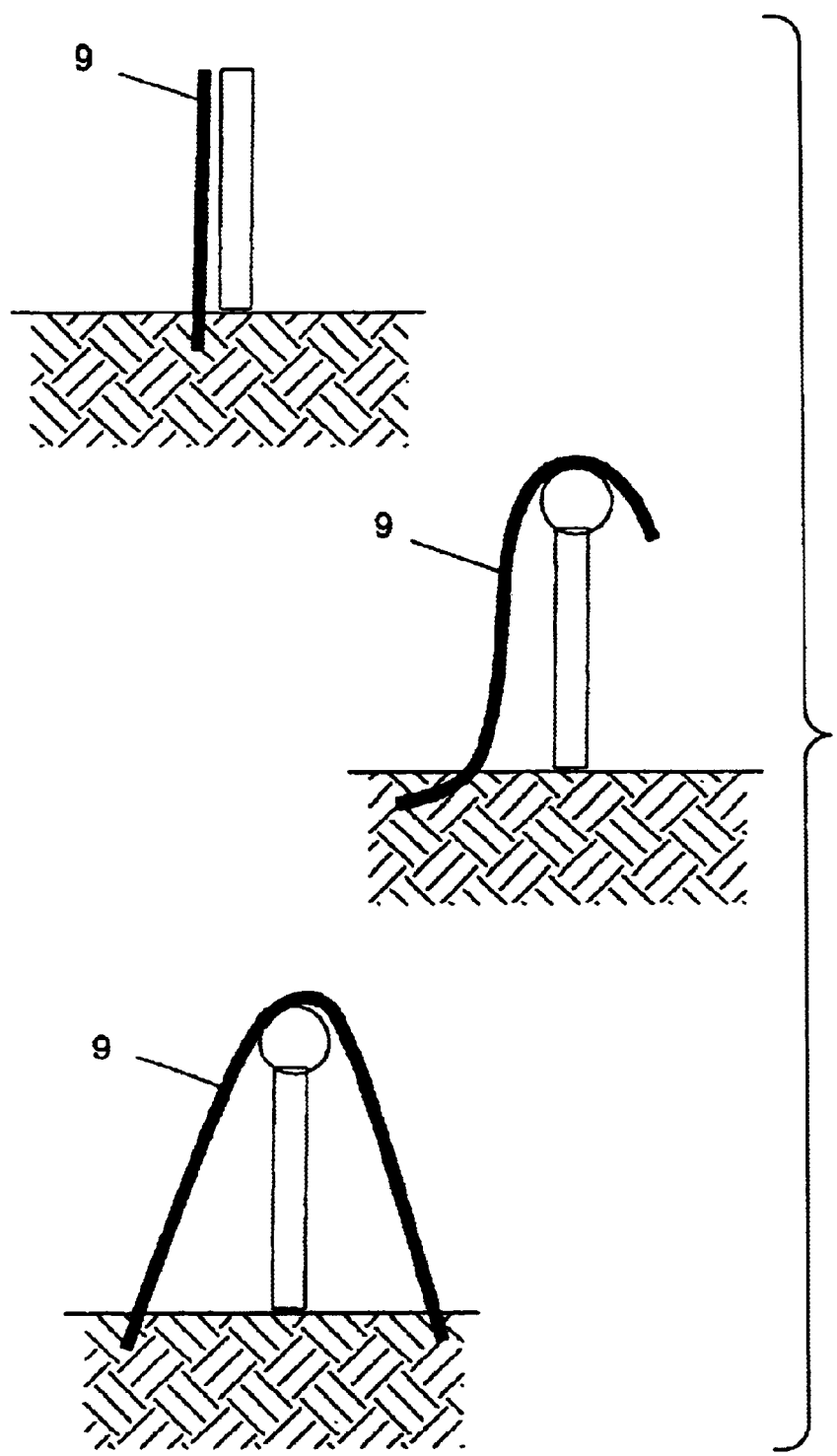
FIG. 46 shows the deployment of mats for fencing purposes.
Figure 47:
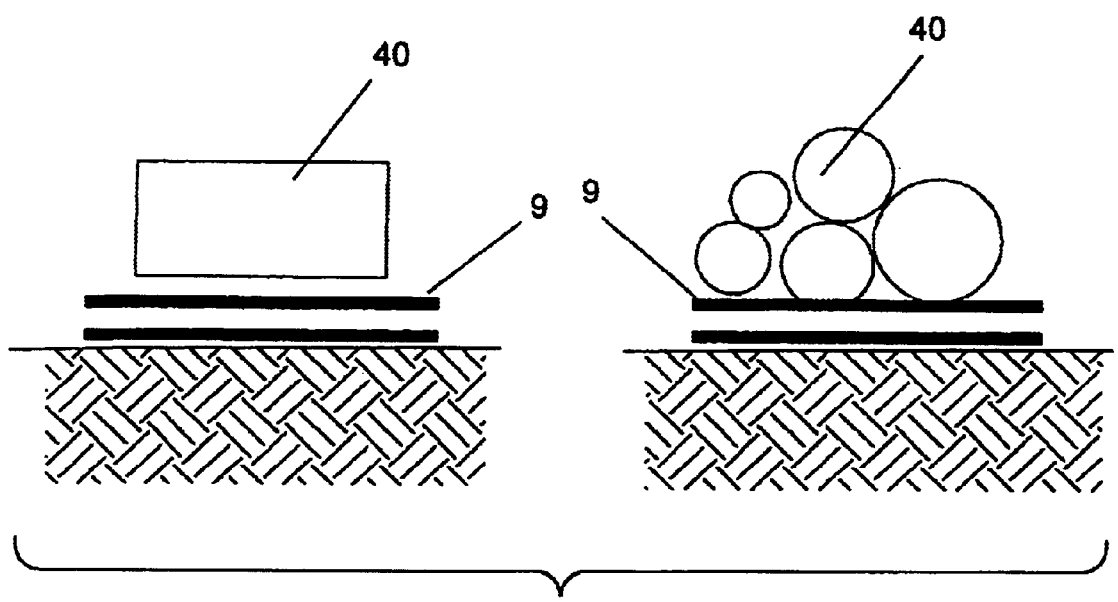
FIG. 47 shows the deployment of mats as load distribution elements.
Figure 52:
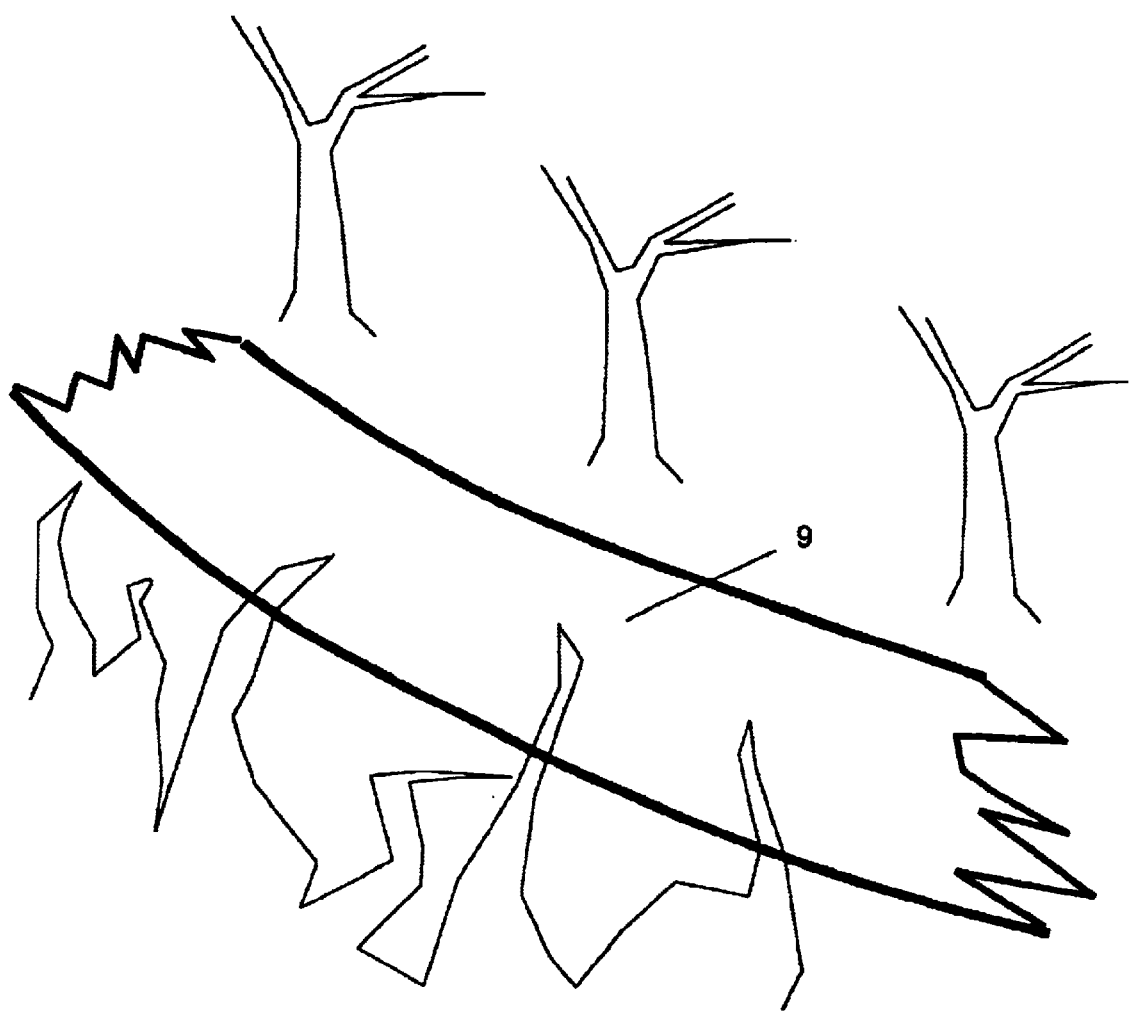
FIG. 52 shows the deployment of fire mats for burnt aisle counteraction against fires.
Figure 53:
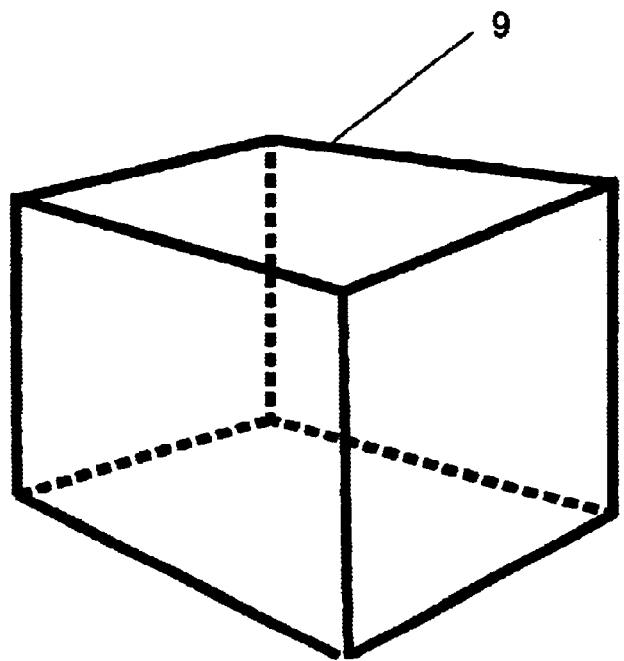
FIG. 53 shows the deployment of mats for lightning protectors and vehicle shelters.
Figure 54:
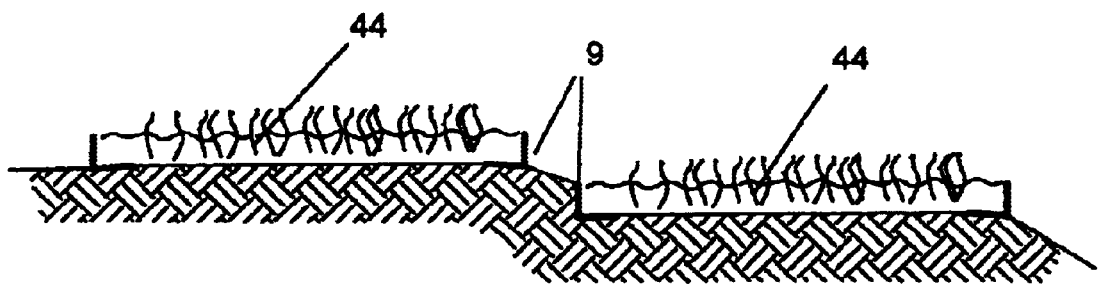
FIG. 54 shows the deployment of mats for laying out paddy fields.
Figure 55:
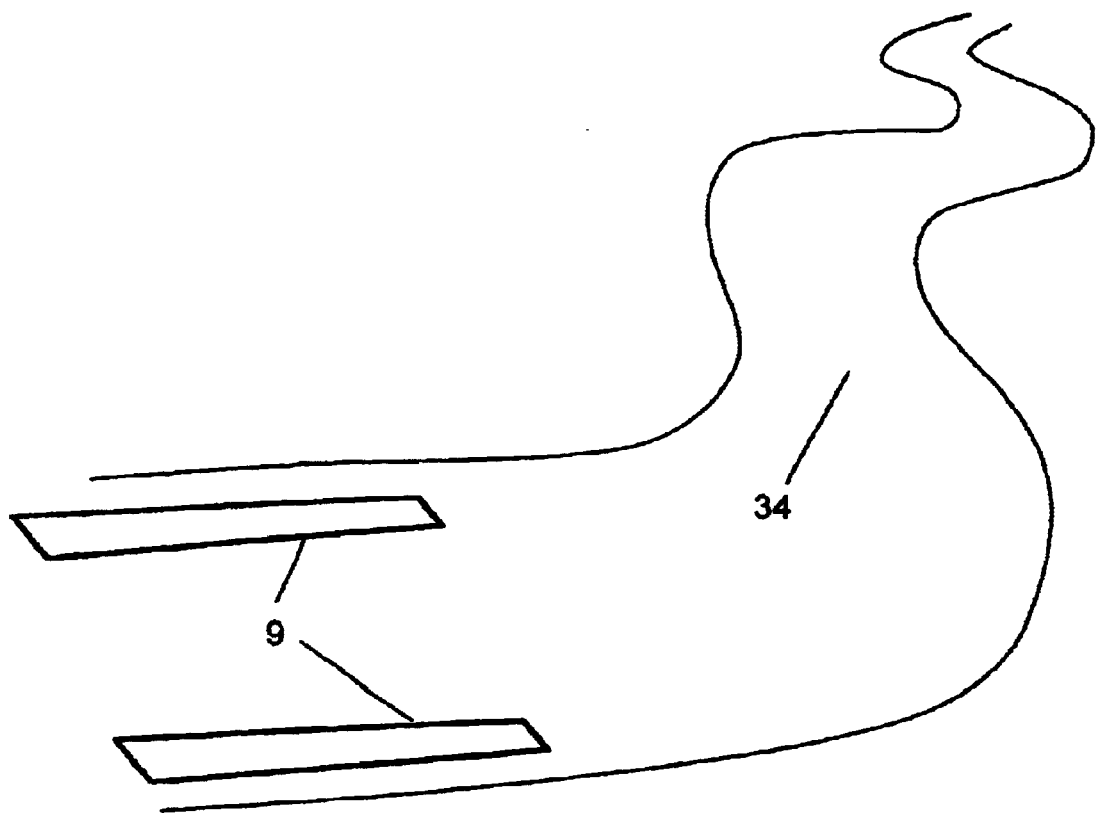
FIG. 55 shows the deployment of mats for road marking.
Figure 57:
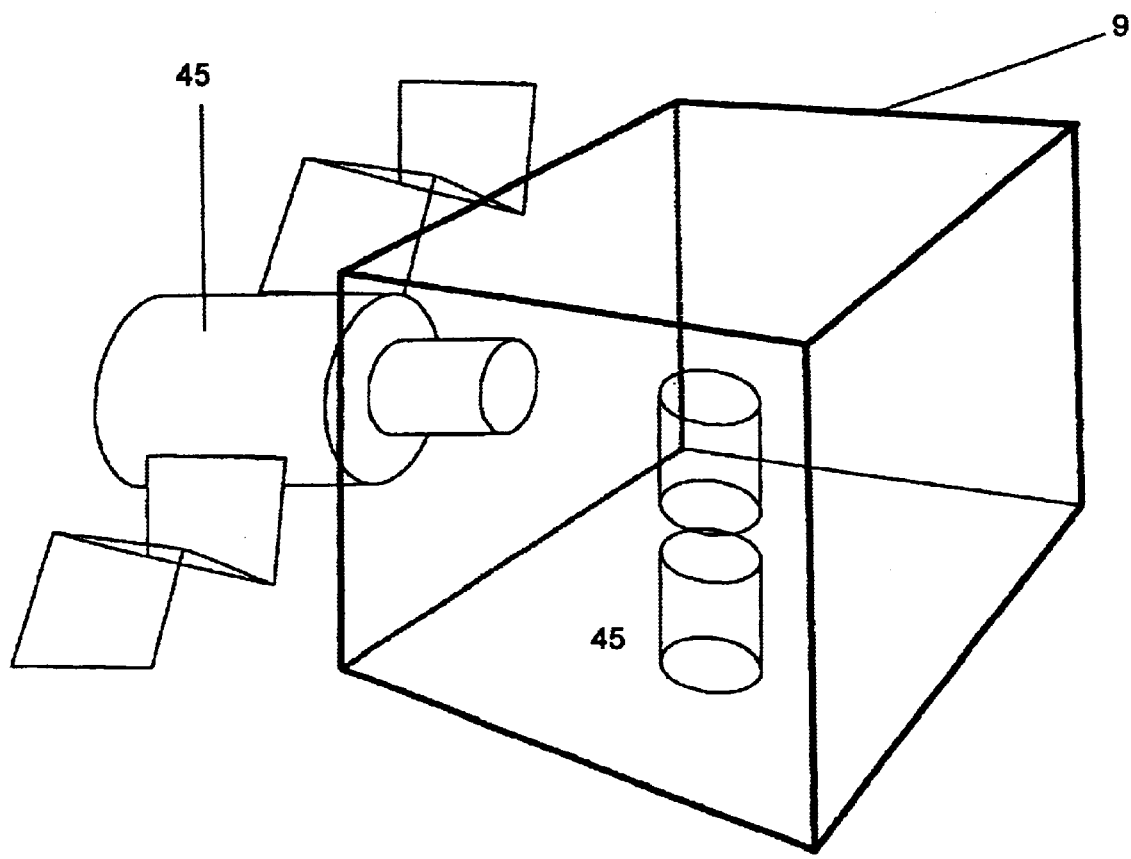
FIG. 57 shows the deployment of mats for the construction of safety cages in space.

FIG. 43 shows the deployment of mats 9 in conjunction with protective barriers. The mats 9 are arranged in such a way that they form an interceptive possibility for vehicles coming off the road. Damage to the vehicles is minimized by the elasticity of the mats 9. FIG. 44 shows the deployment of interwoven bodies 25 or mats 9 as traffic guidance elements and crash protection in road traffic. The said elements are primarily arranged parallel to the road 34 in the region of curves. FIG. 45 represents the use of mats for drainage purposes next to the road 34. The mats are rolled up in the present embodiment and thus achieve the drainage function. In FIG. 46, the mats 9 are used as fences and serve to separate areas from humans and animals. Fences of this kind are also applicable against snowdrifts or accumulations of other material, in the proximity of landfills for example. FIG. 47 shows an application variant as load redistribution elements. Use of the mats 9 effects a redistribution of the loading and reduction of the pressure on the ground when freight is set down. The application of mats 9 as shown in FIG. 48 is suitable for the protection of trees. Thus on the one hand, the trunks of the trees can be protected by envelopment in mats 9, and on the other hand, the root area by laying out mats 9. The use of mats 9 for covering silage heaps is as shown in FIG. 49. The contents of the silage heap is covered over with mats 9, resulting in protective coverage on the one hand and weighting on the other hand. The deployment of mats 9 for landfill demarcation is represented in FIG. 50. Mats 9 are arranged both underneath and above the body of the waste 43, on the one hand covering the body of the waste 43, and on the other hand delimiting the said waste 43 against the surrounding earth. The arrangement of mats 9 according to FIG. 51 is suitable for the construction of chronologically raised access routes. As the body of the landfill 43 increases in height mats are laid out in a staggered arrangement on top of one another. The use of mats 9 as burnt aisle fire mats is represented in FIG. 52. The mats are laid out and set on fire in order to produce a counteracting fire. The spread of fire is thus effectively prevented during forest fires for example. The arrangement of mats 9 according to FIG. 54 serves the laying out of paddy fields for example. The use of mats in arid regions is represented in FIG. 55, where mats 9 are incorporated in the road or trail 34. If the roadway is covered by sand drifts a metal detector reacting to the metal parts woven into the mat can be used to locate the original route 34. Mats and interwoven bodies can be transported or put in place with the aid of carrier units such as gas-filled balloons, helicopters or airships. Transportation can be either in horizontal or vertical position, as can be seen in FIG. 56. The use of mats 9 and interwoven bodies (25) in space is indicated in FIG. 57, where aerospace technology (45) can be set up in a safety cage constructed from mats 9 or interwoven bodies 25.

The invention is not restricted to the exemplary embodiments represented here. On the contrary, it is possible to implement other embodiment variants by combination and modification of the means and features explained without abandoning the terms of reference of the invention.

List of reference codes

1 Running tread
2 Side rings

3 Tire
4 Guide
5 Drive roller
6 Shaft
7 Swelling
8 Cutting blade
9 Mat
10 Bank
11 Water
12 Bed of body of water
13 Hollow body
14 Waterproof sheeting
15 Earth
16 Counter shaft
17 Pole
18 Depression
19 Reef
20 Fish
21 Lock flooding basin
22 Buoy
23 Ice sheet
24 River
25 Interwoven body
26 Waves
27 Quay facilities
28 Bridge pier
29 Sewage treatment tank
30 Entry into tanks
31 Ship
32 Plants
33 Slope
34 Road
35 Pipe
36 Cable
37 Ground opening
38 Bunker
39 Crash barrier
40 Load
41 Tree
42 Silage heap
43 Body of landfill
44 Paddy fields
45 Aerospace technology

What is claimed is:

1. A method for processing tires and providing a product composed of tire material, comprising the steps of dismembering each tire by a sequence of cuts to form two side walls and a plurality of tire rings of running tread, separating the two side walls from the plurality of tire rings of running tread, combining the plurality of tire rings together to form the product by looping a first of the plurality of tire rings directly to a second of the plurality of tire rings, the second of the plurality of tire rings is looped directly to the third of the plurality of tire rings until the n−1 of the plurality of tire rings is looped to the n-th of the plurality of tire rings to form an interwoven mesh product.

2. The method according to claim 1, wherein the product is an interwoven mat.

3. The method according to claim 1, wherein the interwoven product is a three-dimensional body.

4. The method according to claim 1, wherein the sequence of cuts of is carried out by one of a permanently installed cutting facility or by a mobile cutting facility.

5. The method according to claim 4, wherein the sequence of cuts is a single cut along the middle of the running tread in such a way that two U-shaped tire parts result which are stackable inside each other.

6. The method according to claim 1, wherein the tire material is kept under tension during the process of cutting.

7. An interwoven mesh product made of tire material comprising a plurality of tire rings cut from a running tread of a tire, wherein each of the plurality of tire rings are directly interwoven by looping a first of the plurality of tire rings directly to a second of the plurality of tire rings, the second of the plurality of tire rings is looped directly to the third of the plurality of tire rings until the n−1 of the plurality of tire rings is looped to the n-th of the plurality of tire rings to form the interwoven mesh product.

8. A method of interweaving a mesh product made of tire material comprising the steps of providing a plurality of tire rings cut from the running thread of the tire;

flattening a first of the plurality of the tire rings forming two substantially equal openings on each end;

looping directly through each opening on each end a second of the plurality of tire rings such that the second of the plurality of tire rings forms two substantially equal openings on each side.

9. The method according to claim 8, further providing interweaving a mesh product made of tire material comprising the steps of continuing looping directly through each opening on each end a third of the plurality of tire rings such that the third of the plurality of tire rings forms two substantially equal openings on each side to continue the looping step until the n-th of the plurality of tire rings forms two substantially equal openings on each side;

closing the n-th loop.

10. The method according to claim 8, wherein the method is carried out by machine.

11. The method according to claim 8, wherein the method is carried out at the place of deployment.

* * * * *